(12) United States Patent
Ogawa et al.

(10) Patent No.: US 11,030,424 B2
(45) Date of Patent: Jun. 8, 2021

(54) APPARATUS FOR DETECTING TAG MOVEMENTS AND WIRELESS TAG READER

(71) Applicant: DENSO WAVE INCORPORATED, Chita-gun (JP)

(72) Inventors: Masayuki Ogawa, Chita-gun (JP); Kohei Enomoto, Chita-gun (JP); Yusuke Masuda, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/352,408

(22) Filed: Mar. 13, 2019

(65) Prior Publication Data

US 2019/0303631 A1 Oct. 3, 2019

(30) Foreign Application Priority Data

| Mar. 13, 2018 | (JP) | JP2018-044912 |
| Mar. 14, 2018 | (JP) | JP2018-046224 |
| Jul. 11, 2018 | (JP) | JP2018-131763 |
| Sep. 26, 2018 | (JP) | JP2018-180223 |

(51) Int. Cl.
*G06K 7/10* (2006.01)
*G01S 13/84* (2006.01)
*H04W 4/33* (2018.01)

(52) U.S. Cl.
CPC ......... *G06K 7/10099* (2013.01); *G01S 13/84* (2013.01); *G06K 7/10108* (2013.01); *G06K 7/10128* (2013.01); *H04W 4/33* (2018.02)

(58) Field of Classification Search
CPC .......... G06K 7/10099; G06K 7/10108; G06K 7/10128
See application file for complete search history.

(56) References Cited

U.S. PATENT DOCUMENTS

| 8,994,504 | B1 | 3/2015 | Schatz et al. | |
| 2006/0220861 | A1 | 10/2006 | Stobbe et al. | |
| 2010/0156651 | A1 | 6/2010 | Broer | |
| 2014/0167920 | A1 | 6/2014 | Kamiya | |
| 2018/0004991 | A1* | 1/2018 | Jacobsen | G05B 19/05 |

FOREIGN PATENT DOCUMENTS

| JP | 2006-072672 A | 3/2006 |
| JP | 2014-190857 A | 10/2014 |
| JP | 2016-170046 A | 9/2016 |

* cited by examiner

*Primary Examiner* — Daniell L Negron
(74) *Attorney, Agent, or Firm* — Oliff PLC

(57) ABSTRACT

A configuration which can easily discriminate a moving wireless (radio) tag from a stationary wireless (radio) tag. The configuration uses an antenna to measure phases of response waves received from a wireless tag. Based on the measurements, the configuration measures changes in distance from the wireless tag to the antenna and detects travel of the wireless tag. Based on the measurements, the configuration measures changes in velocity of the wireless tag relative to the antenna. A wireless tag having a rate of changes in signs of the velocity, of not less than a predetermined value in the measured velocity changes, is detected as being a stationary tag.

18 Claims, 48 Drawing Sheets

FIG.6
(A)
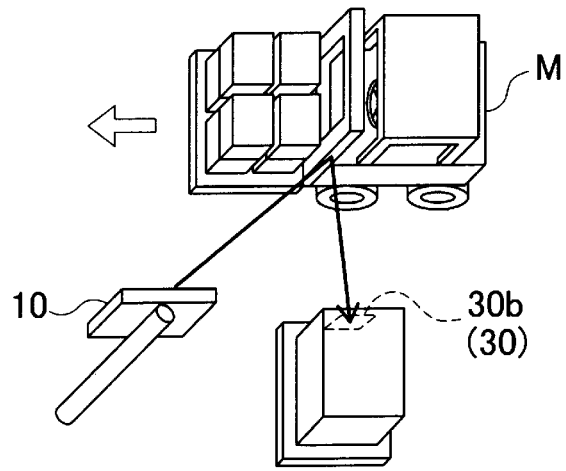
(B)
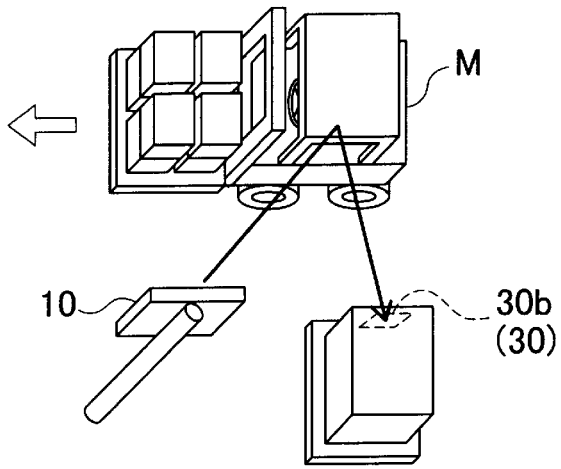
(C)
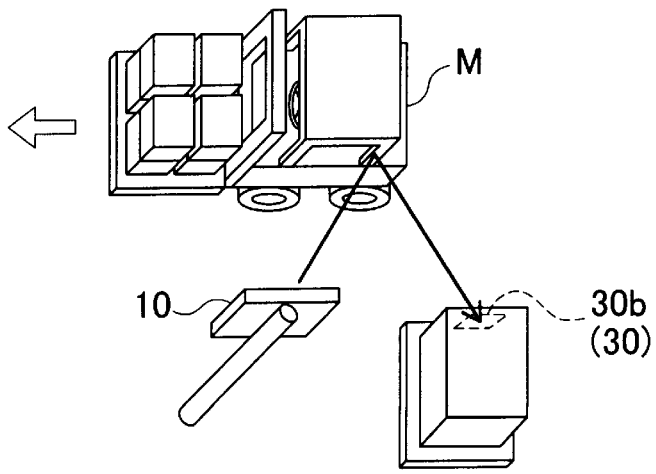

FIG.7
(A)
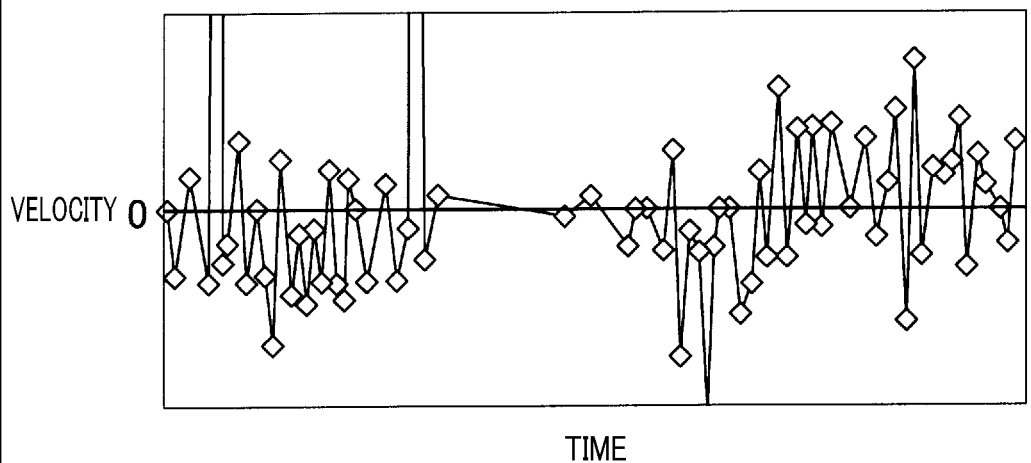
(B)
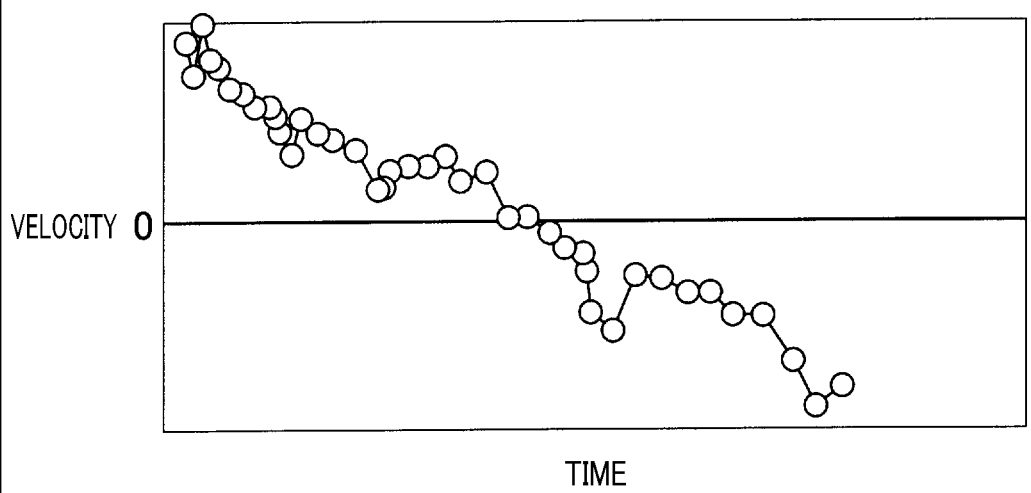

FIG.8
(A)
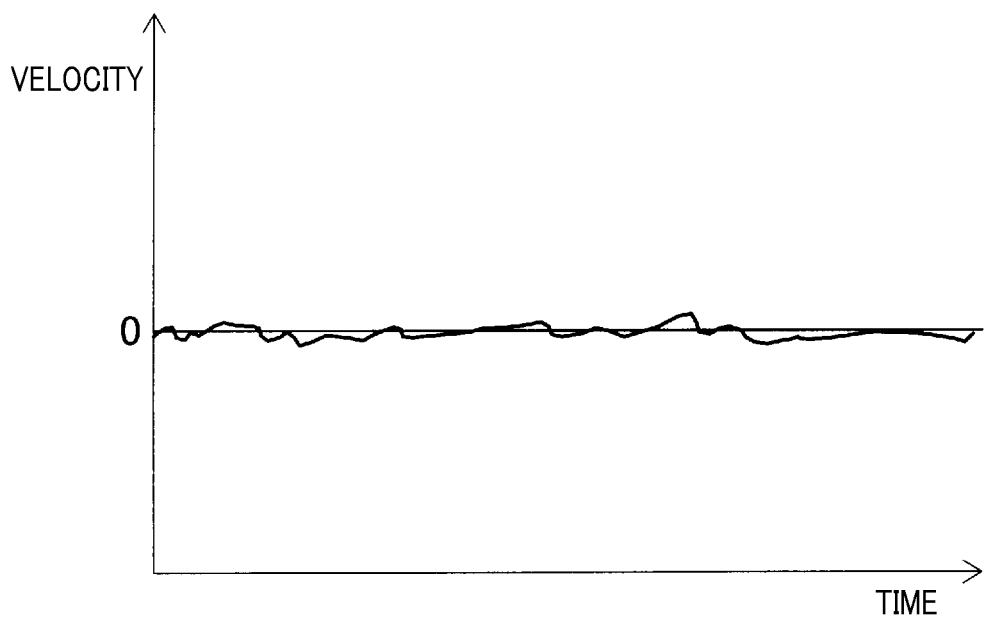
(B)
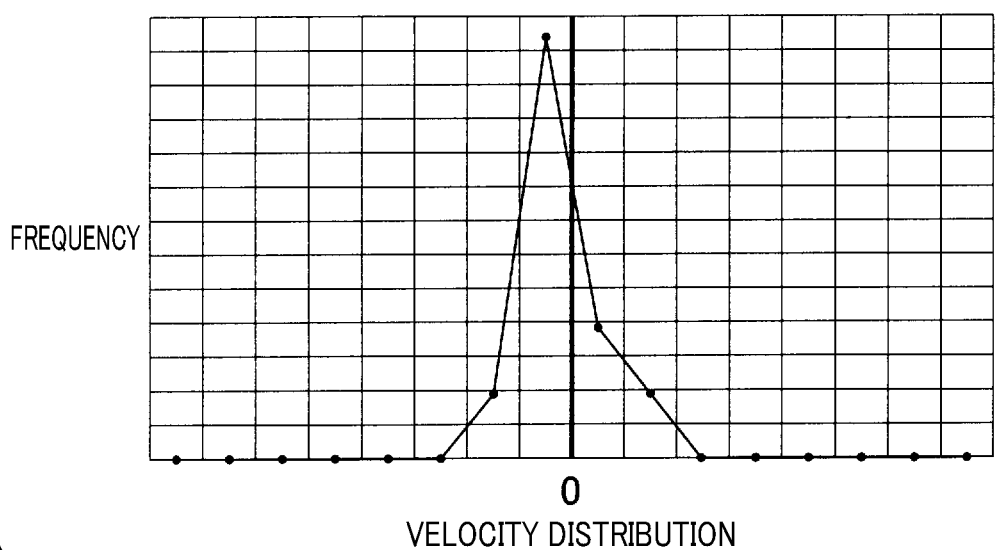

FIG.9
(A)
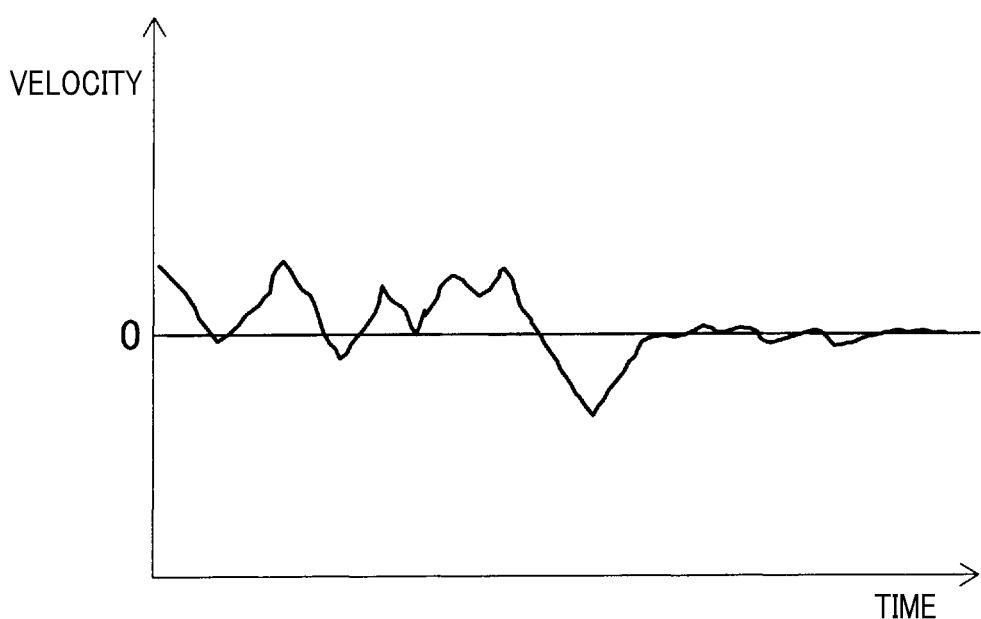
(B)
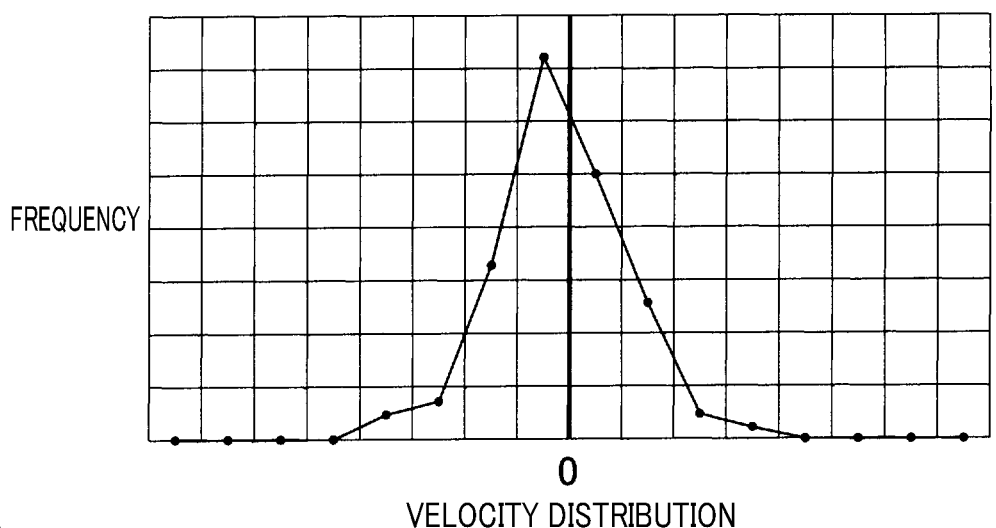

FIG.10
(A)
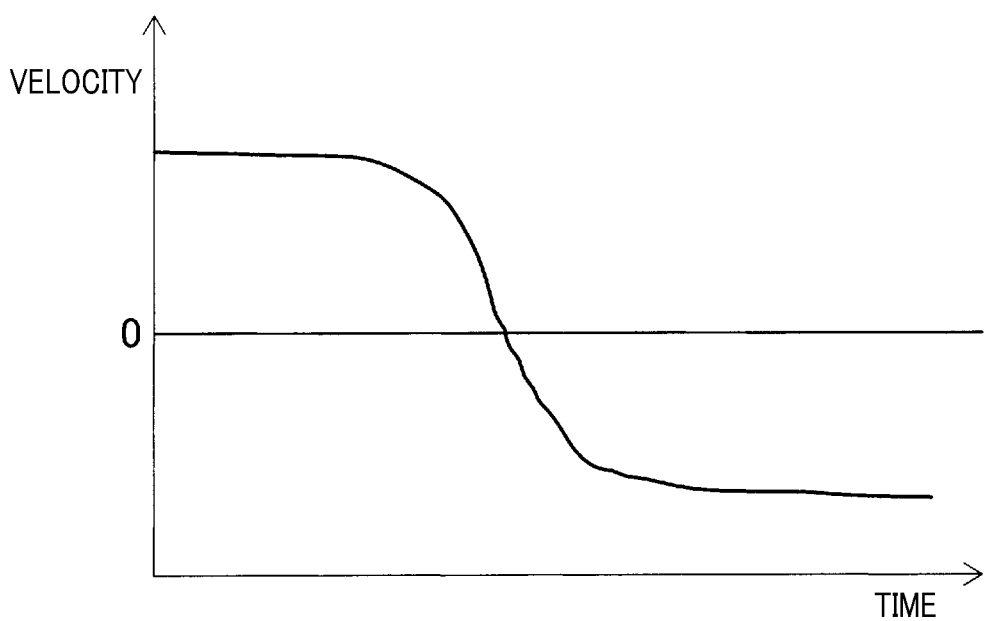
(B)
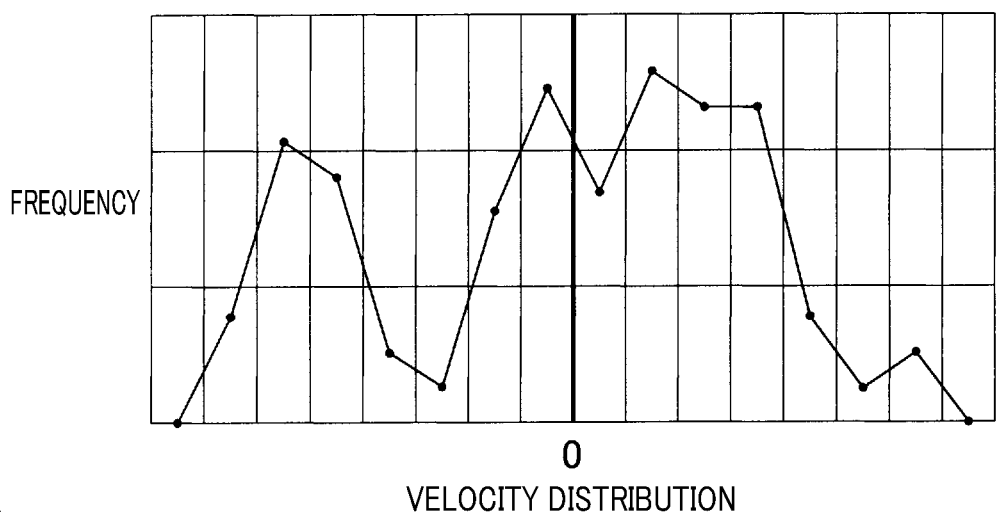

FIG.11
(A)
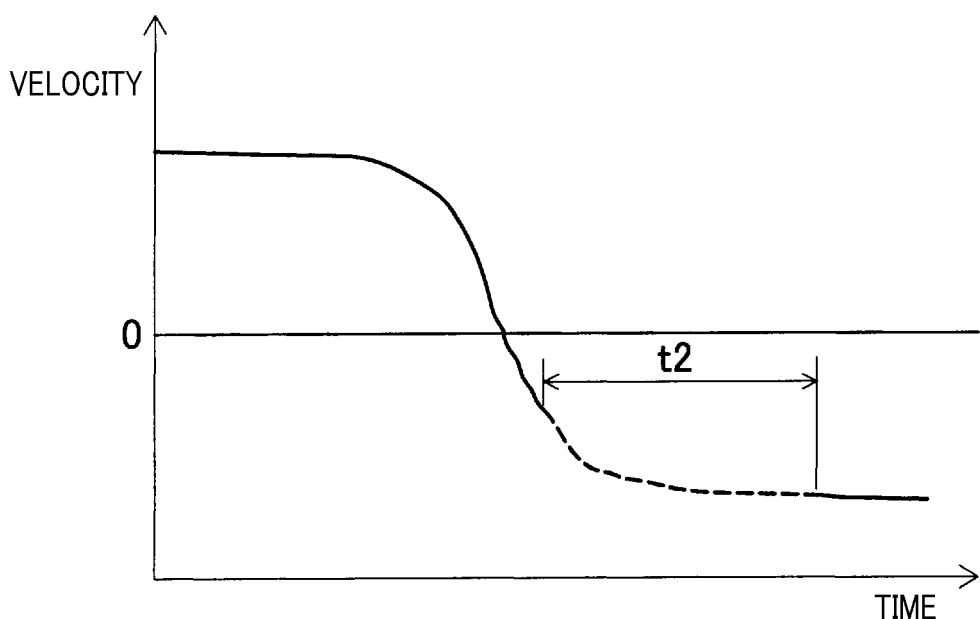
(B)
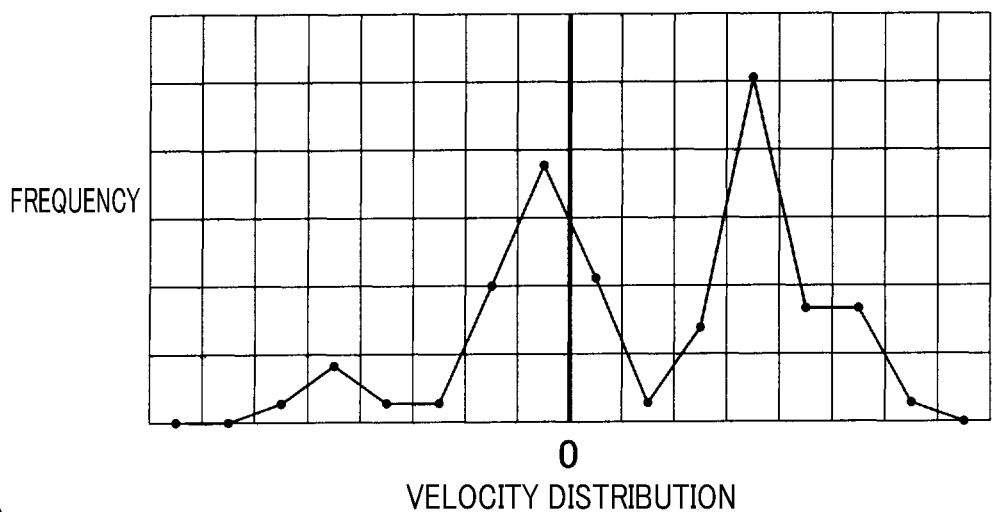

FIG.16
(A)
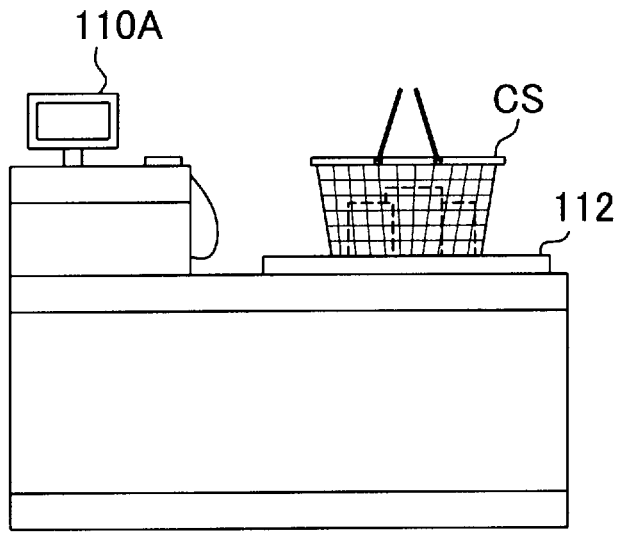
(B)
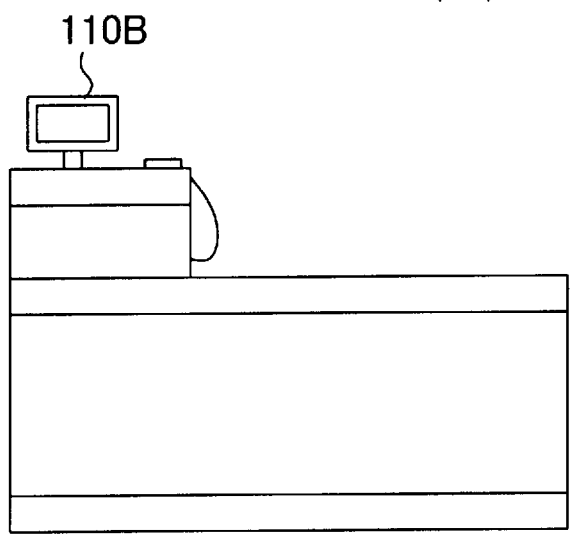

FIG.21
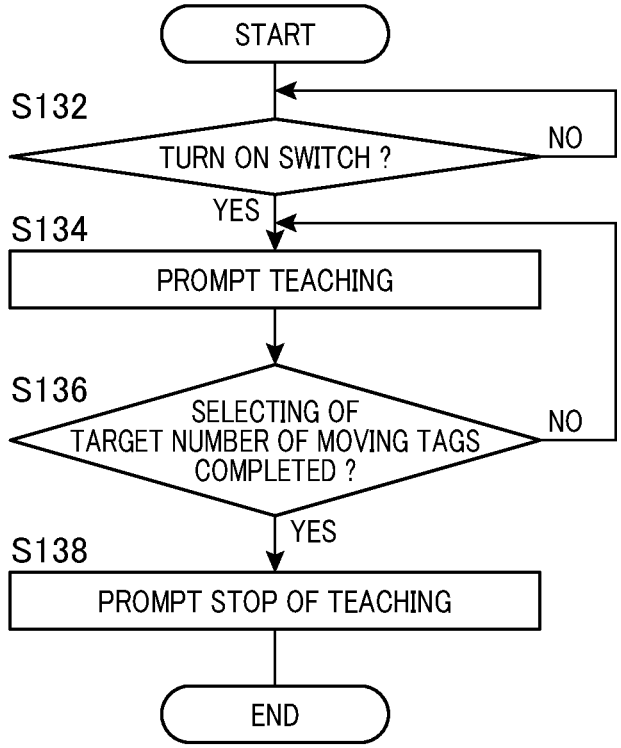
(A)
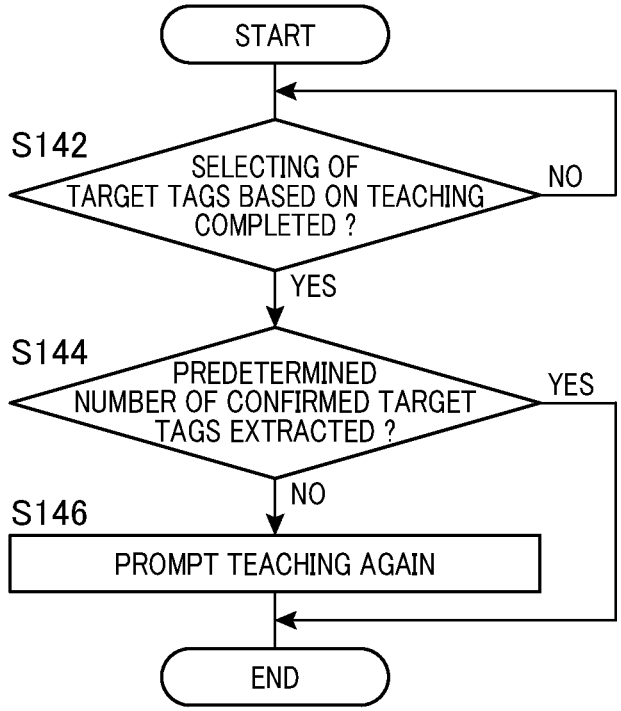
(B)

FIG.22
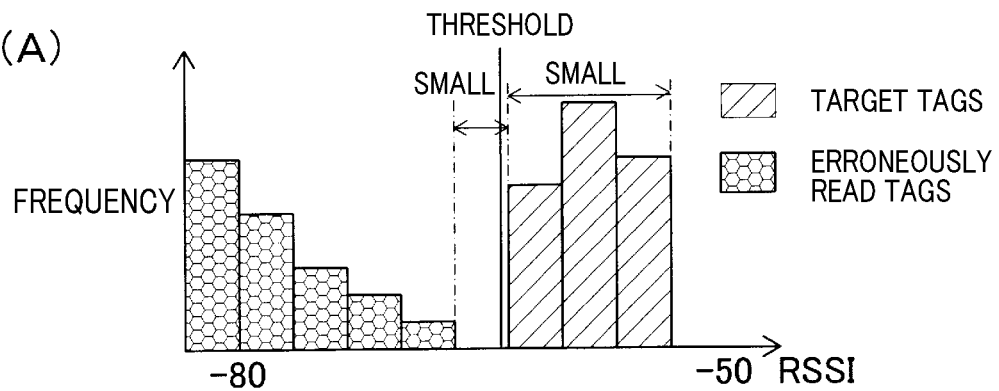
(A)
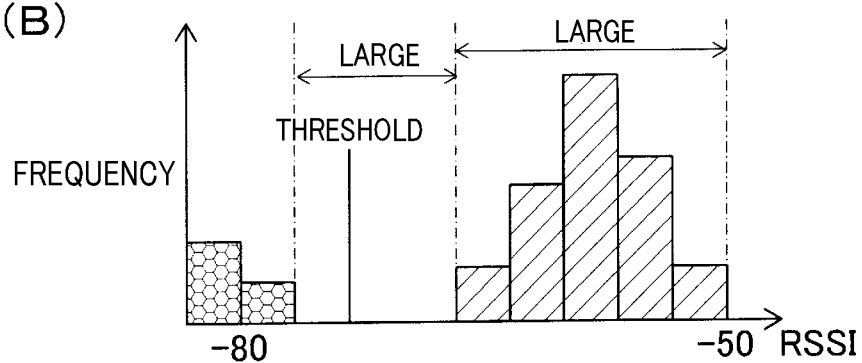
(B)
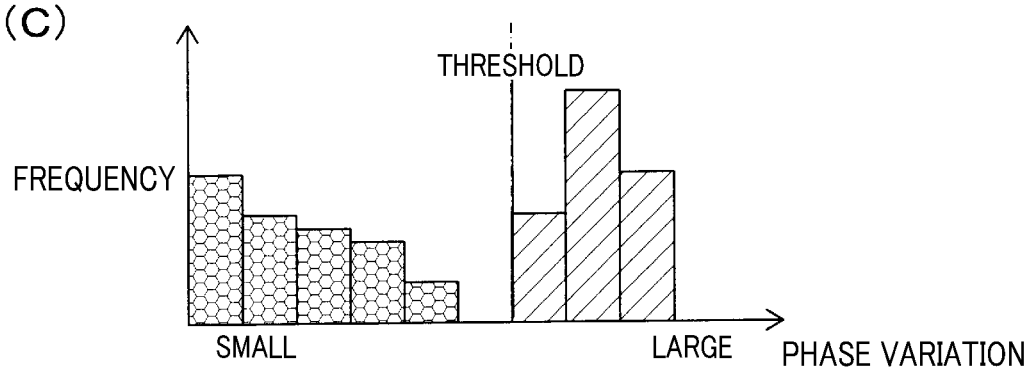
(C)
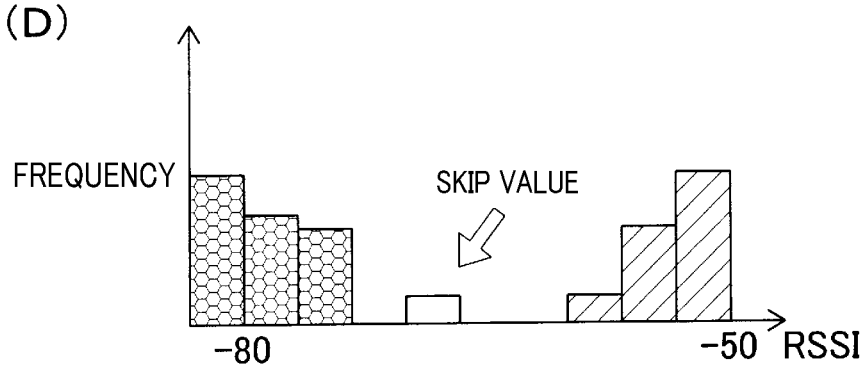
(D)

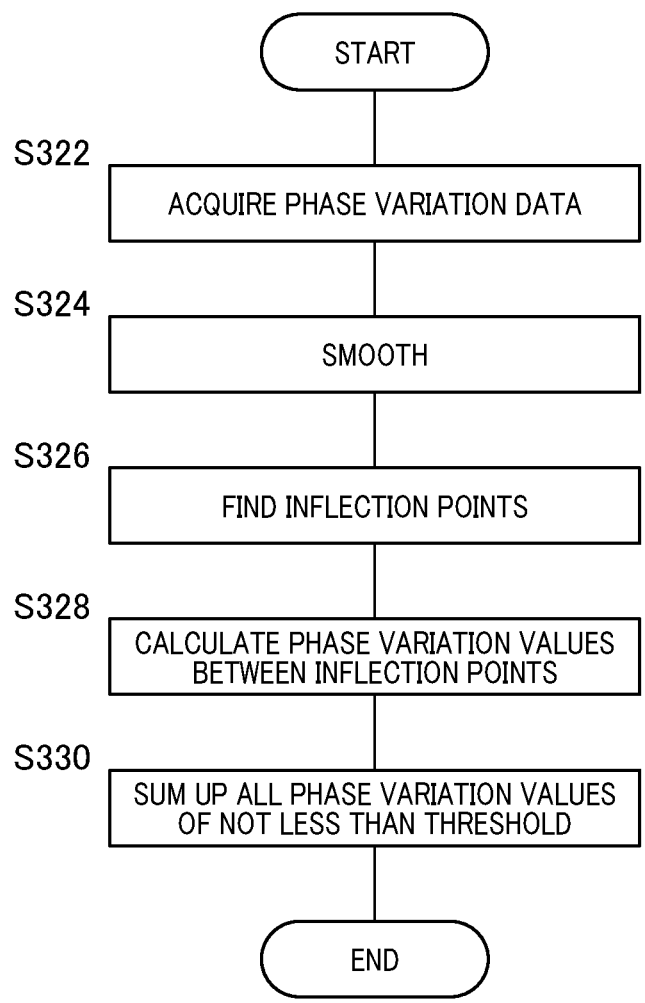

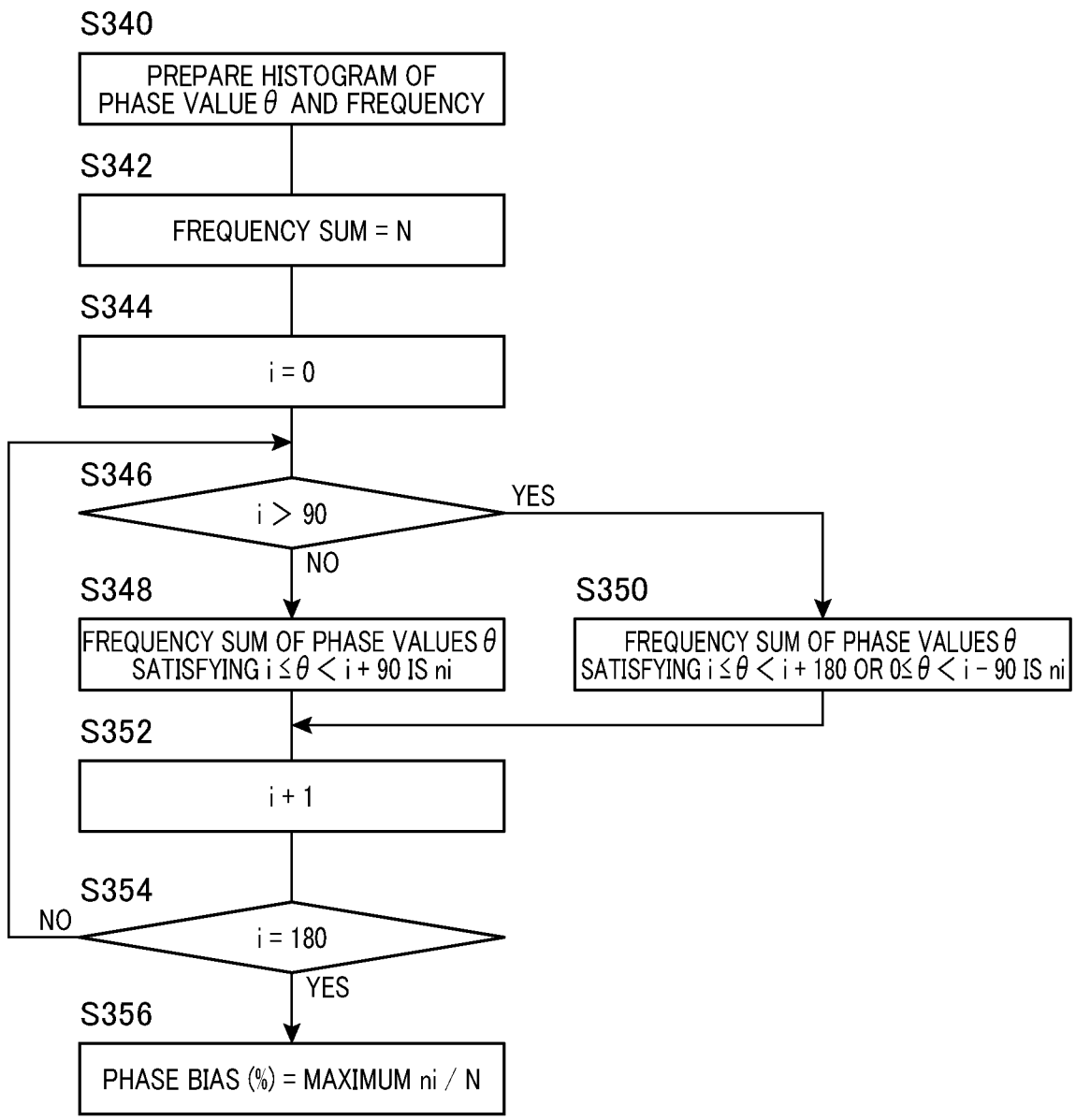

FIG.32

S360: TAG READING FREQUENCY = n
PHASE VARIATION = x
PHASE BIAS = y

S362: $x \geq 500$ ? — No → (to S368)
Yes ↓

S364: $y - 0.7 < \dfrac{0.9 - 0.7}{1000 - 500}(x - 500)$ ? — No → (to S368)
Yes ↓

S366: $y - 0.9 < \dfrac{1.0 - 0.9}{1500 - 1000}(x - 1000)$ ? — No → (to S368)
Yes ↓ (to S380)

S368: INDIVIDUAL TAG DETERMINATION COMPLETION TRIGGER OR TAG DETERMINATION COMPLETION TRIGGER ON ?
- Yes → S370: DETERMINED TO BE STATIONARY TAG
- No → S372: DETERMINED TO BE IN THE PROCESS OF TAG DETERMINATION

S380: $x \geq 1000$ ? — No → (to S390)
Yes ↓

S384: $y - 0.7 < \dfrac{0.9 - 0.7}{2200 - 1500}(x - 1500)$ ? — No → (to S390)
Yes ↓

S386: $y - 0.9 < \dfrac{1.0 - 0.9}{2800 - 2200}(x - 2200)$ ? — No → (to S390)
Yes ↓

S388: DETERMINED TO BE MOVING TAG

S390: DETERMINED TO BE DIFFICULT DISCRIMINATION TAG

FIG.33
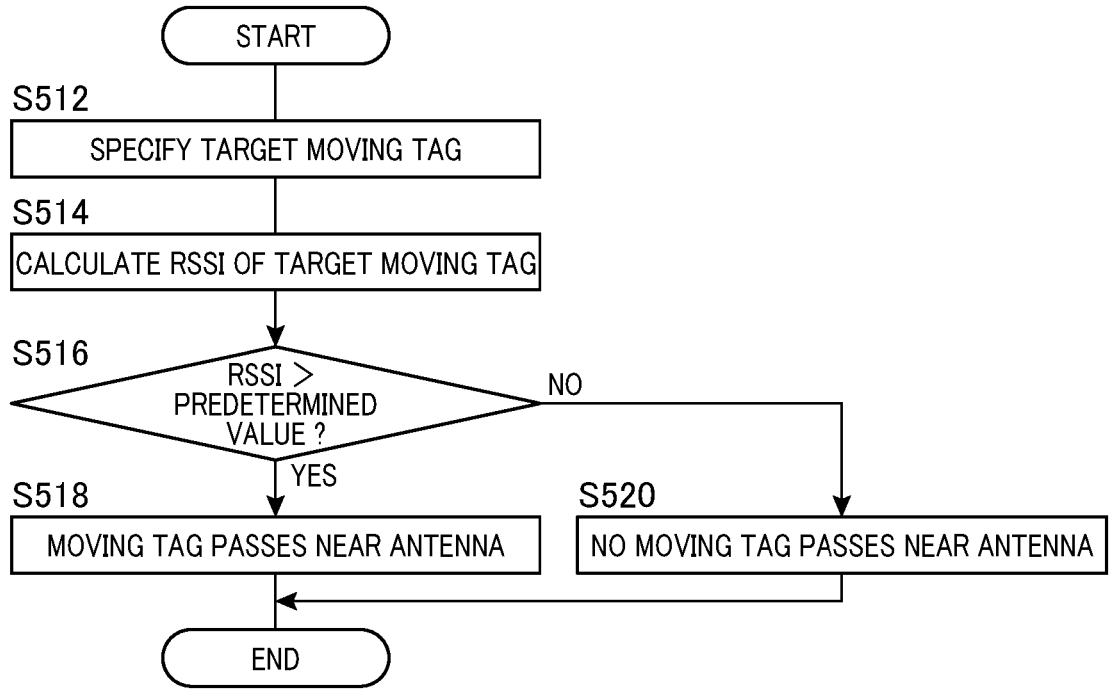
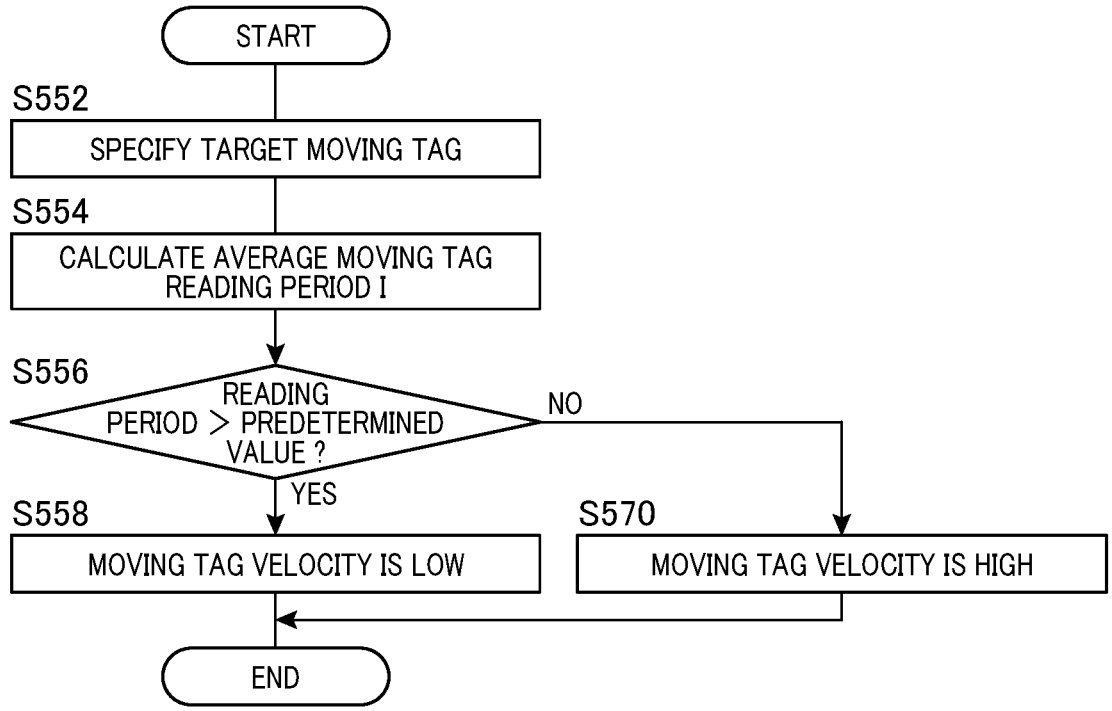

FIG.35
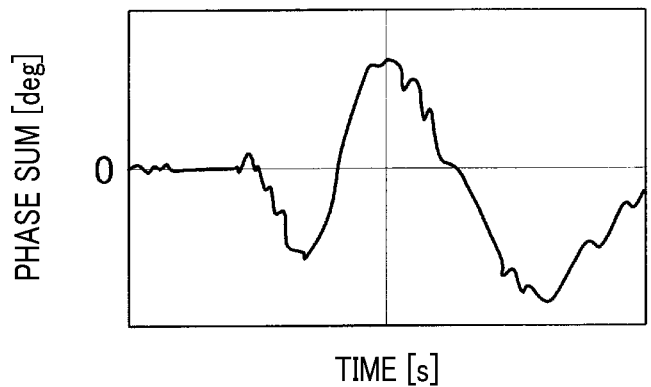
(A)
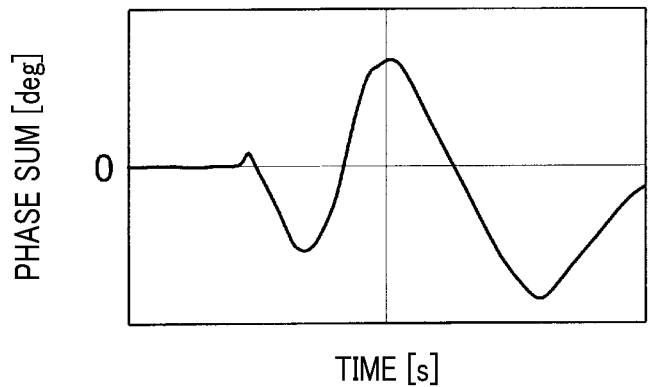
(B)
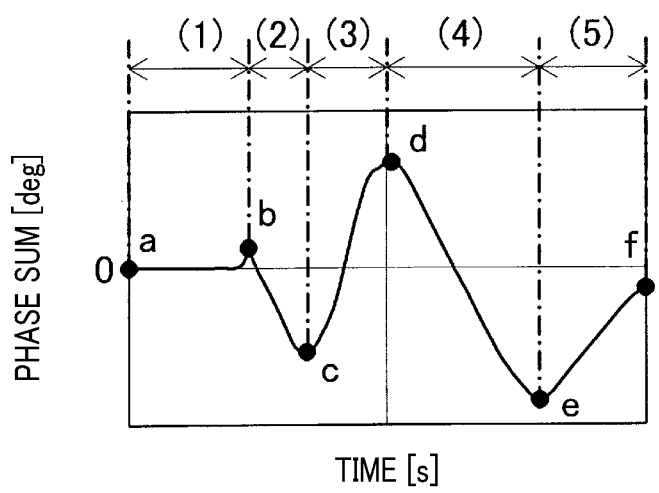
(C)

MOVING TAG

FIG.47

| ELAPSED TIME [SEC] | RADIO TAG 5A | | RADIO TAG 5B | | RADIO TAG 5C | |
|---|---|---|---|---|---|---|
| | PHASE FREQUENCY / TOTAL PHASE FREQUENCY IN THE PAST 4 sec | MOVING/ STATIONARY DETERMINATION | PHASE FREQUENCY / TOTAL PHASE FREQUENCY IN THE PAST 4 sec | MOVING/ STATIONARY DETERMINATION | PHASE FREQUENCY / TOTAL PHASE FREQUENCY IN THE PAST 4 sec | MOVING/ STATIONARY DETERMINATION |
| 1 | 2 / 2 | WAITING FOR DETERMINATION | 0 / 0 | WAITING FOR DETERMINATION | 0 / 0 | WAITING FOR DETERMINATION |
| 2 | 2 / 4 | WAITING FOR DETERMINATION | 0 / 0 | WAITING FOR DETERMINATION | 0 / 0 | WAITING FOR DETERMINATION |
| 3 | 1 / 5 | WAITING FOR DETERMINATION | 0 / 0 | WAITING FOR DETERMINATION | 1 / 1 | WAITING FOR DETERMINATION |
| 4 | -1 / 6 | MOVING | 0 / 0 | STATIONARY | -1 / 2 | STATIONARY |
| 5 | -2 / 6 | MOVING | 0 / 0 | STATIONARY | 0 / 2 | STATIONARY |
| 6 | -2 / 6 | MOVING | 0 / 0 | STATIONARY | 0 / 2 | STATIONARY |

FIG.48

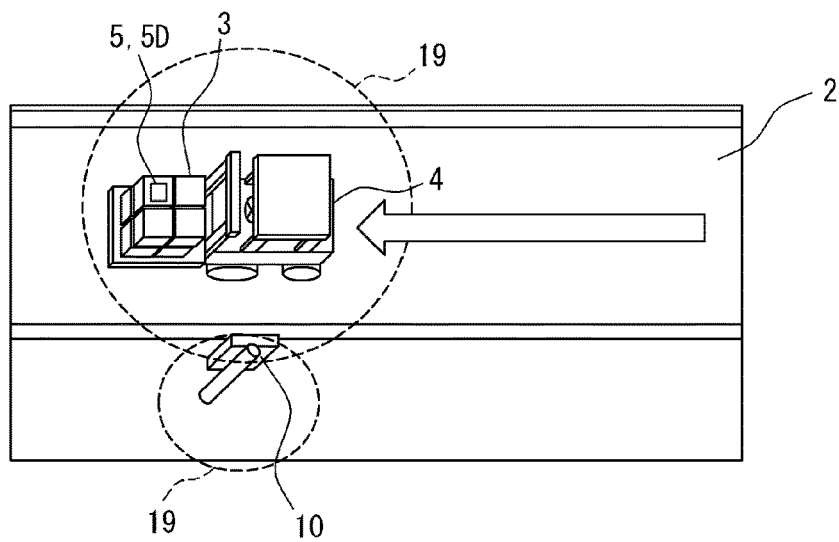

FIG.51

| ELAPSED TIME [SEC] | RADIO TAG 5D | | RADIO TAG 5E | | RADIO TAG 5F | |
|---|---|---|---|---|---|---|
| | PHASE FREQUENCY | MOVING/ STATIONARY DETERMINATION | PHASE FREQUENCY | MOVING/ STATIONARY DETERMINATION | PHASE FREQUENCY | MOVING/ STATIONARY DETERMINATION |
| | TOTAL PHASE FREQUENCY IN THE PAST 4 sec | | TOTAL PHASE FREQUENCY IN THE PAST 4 sec | | TOTAL PHASE FREQUENCY IN THE PAST 4 sec | |
| 1 | 2 | WAITING FOR DETERMINATION | 2 | WAITING FOR DETERMINATION | 2 | WAITING FOR DETERMINATION |
| | 2 | | 2 | | 2 | |
| 2 | 2 | WAITING FOR DETERMINATION | 2 | WAITING FOR DETERMINATION | 2 | WAITING FOR DETERMINATION |
| | 4 | | 4 | | 4 | |
| 3 | 2 | WAITING FOR DETERMINATION | 1 | WAITING FOR DETERMINATION | 1 | WAITING FOR DETERMINATION |
| | 6 | | 5 | | 5 | |
| 4 | 2 | MOVING | 0 | MOVING | 0 | MOVING |
| | 8 | | 5 | | 5 | |
| 5 | 2 | MOVING | 0 | TEMPORARILY STATIONARY | 0 | TEMPORARILY STATIONARY |
| | 8 | | 3 | | 3 | |
| 6 | 1 | MOVING | −2 | TEMPORARILY STATIONARY | 0 | TEMPORARILY STATIONARY |
| | 7 | | 3 | | 1 | |
| 7 | 0 | MOVING | −2 | MOVING | 0 | TEMPORARILY STATIONARY |
| | 5 | | 4 | | 0 | |
| 8 | 0 | TEMPORARILY STATIONARY | −2 | MOVING | 0 | STATIONARY |
| | 3 | | 6 | | 0 | |

FIG.54

| ELAPSED TIME [SEC] | RADIO TAG 5A | | | | RADIO TAG 5C | | | |
| --- | --- | --- | --- | --- | --- | --- | --- | --- |
| | PHASE FREQUENCY | PHASE DIFFERENCE $\Delta \phi$ | PHASE SUM / TOTAL PHASE FREQUENCY | MOVING/ STATIONARY DETERMINATION | PHASE FREQUENCY | PHASE DIFFERENCE $\Delta \phi$ | PHASE SUM / TOTAL PHASE FREQUENCY | MOVING/ STATIONARY DETERMINATION |
| | TOTAL PHASE FREQUENCY IN THE PAST 4 sec | INTEGRATED VALUE FOR 4 sec | | | TOTAL PHASE FREQUENCY IN THE PAST 4 sec | INTEGRATED VALUE FOR 4 sec | | |
| 1 | 2 | 360 | | WAITING FOR DETERMINATION | 0 | 180 | | WAITING FOR DETERMINATION |
| | 2 | 360 | | | 0 | 180 | | |
| 2 | 2 | 370 | | WAITING FOR DETERMINATION | 0 | 180 | | WAITING FOR DETERMINATION |
| | 4 | 730 | | | 0 | 360 | | |
| 3 | 1 | 270 | | WAITING FOR DETERMINATION | 1 | 270 | | WAITING FOR DETERMINATION |
| | 5 | 1000 | | | 1 | 640 | | |
| 4 | −1 | −270 | 212 | MOVING | −1 | 270 | 455 | STATIONARY |
| | 6 | 1270 | | | 2 | 910 | | |
| 5 | −2 | 360 | 212 | MOVING | 0 | 180 | 455 | STATIONARY |
| | 6 | 1270 | | | 2 | 910 | | |
| 6 | −2 | 360 | 212 | MOVING | 0 | 180 | 455 | STATIONARY |
| | 6 | 1270 | | | 2 | 910 | | |

APPARATUS FOR DETECTING TAG MOVEMENTS AND WIRELESS TAG READER

CROSS-REFERENCE TO RELATED APPLICATIONS

This application is based on and claims the benefit of priority from earlier Japanese Patent Applications No. 2018-044912 filed Mar. 13, 2018; No. 2018-046224 filed Mar. 14, 2018; No. 2018-480223 filed Sep. 26, 2018; and No. 2018-131763 filed Jul. 11, 2018, the descriptions of which are incorporated herein by reference.

BACKGROUND

Technical Field

The present disclosure relates to an apparatus for detecting tag movements that detects the moving state of a radio (wireless) tag affixed to an article or the like and moving integrally with the article as the article travels, and a radio (wireless) tag reader that reads data from a radio tag.

Related Art

Moving/stationary tag detection devices are used for detecting the moving state of a radio tag that travels with an article to which the radio tag is affixed. As a technique related to such a moving/stationary tag detection device, there is known, for example, a radio tag reader disclosed in JP 2016-470046 A. In this radio tag reader, output intensity of radio waves corresponding to a limit of tag detection is taken to be a critical radio field intensity. This radio tag reader uses a tag type table prepared in advance in which critical radio field intensities are correlated to distances for individual tag types. When a tag is detected, the radio tag reader refers to the tag type table according to the type of the detected tag to calculate a distance to the tag based on the distance correlated to the critical radio field intensity.

There is also known a radio tag reader disclosed in JP 2014-190857 A, for example, as a technique of detecting radio tags. According to this radio tag reader, two radio tags are affixed to a measurement target, for intended evaluation based on difference in reception level, i.e. based on that relative values do not vary due to distance or characteristics of walls. In JP 2016470046 A, one tag is used as a reference.

There is also known a radio tag reader disclosed in JP 2013-37663 A, for example, as a technique of detecting radio tags. According to this tag reader, a stationary tag file is prepared based on phase information. Stationary tag files may use standard deviation of phases. Moving tags have a large standard deviation, while stationary tags have a small standard deviation. In view of this, tags with a small standard deviation are specified as stationary tags, and tags that are not stationary tags are determined to be moving tags.

Furthermore, according to JP 2006-72672 A, one fixed tag is set per gate. The fixed tag is set at a position disabling communication with other gates. Each gate is provided with a reader that can communicate with the fixed tag. When communication is established with a moving tag but not with the fixed tag, the reader determines that the moving tag has passed through the gate.

PRIOR ART REFERENCES

[Patent reference 1] JP 2016-170046 A
[Patent reference 2] JP 2014-190857 A
[Patent reference 3] JP 2013-37663 A
[Patent reference 4] JP 2006-72672 A JP 2016-170046 A mentioned above discloses a configuration for using radio field intensity to detect moving state of a radio tag. According to this configuration, for example, when the radio tag is moving with the travel of the article, the radio field intensity varies as the article travels. Therefore, the critical radio field intensity cannot be stably measured, which may lead to failure of correctly detecting the moving radio tag. To detect a moving radio tag with high accuracy, a phase sum may be used in the method of detecting a moving radio tag. The phase sum is an accumulation of phase differences which are calculated from response waves from a radio tag.

However, detecting a moving radio tag using phase differences of response waves from a radio tag may cause problems, Specifically, if an object, such as a forklift, passes across the front of the antenna during the detection as mentioned above, reflection from this moving object may cause reception of response waves from a radio tag that is not moving and located near the antenna (hereinafter may also be termed stationary tag). In this case, phase of the response waves from the stationary tag may be measured as being changing. Accordingly, the stationary tag may be erroneously detected as moving.

The radio tag reader of JP 2014-190857 A mentioned above needs a reference tag be affixed in advance. Unless the tag is affixed to an object whose state can always be identified, there may be a difference between an object desired to be detected and the reference tag. For example, assume that the object desired to be detected is a package collected by a forklift and a reference tag is affixed to the forklift. In this case, the relative value may change depending on the material or moisture absorptivity of the package.

The radio tag reader of JP 2013-37663 A mentioned above specifies stationary tags based on that they have a small standard deviation. To specify stationary tags based on phase deviation, a sufficient amount of data of stationary tags is required to be collected. Moreover, this radio tag reader determines those tags which are not stationary tags to be moving tags. Therefore, it takes time for specifying moving tags and stationary tags. For example, when a forklift conveying articles, to which radio tags are affixed, passes through a gate (radio tag reader) provided to the conveyor path, it may be difficult to discriminate between stationary tags and moving tags in real time.

In P 2013-37663 A, the cause of phase change of stationary tags is considered to be "large phase variation which is due to small motion (travel), such as a person's hand waving". While there is an influence of direct waves and reflected waves, phase variation alone is not sufficient for construing that consideration has been given to stationary tags showing a phase behavior (large phase change) similar to that of moving tags. Therefore, with this radio tag reader, it is assumed to be difficult to appropriately specify the stationary tags showing such phase behavior to be stationary tags.

The technique disclosed in JP 2006-72672 A mentioned above requires use of a fixed tag, which raises an issue of needing a space for setting the fixed tag. Therefore, a technique dispensing with such a fixed tag is desired to enable determination as to whether a radio tag is moving or stationary.

In this regard, passive radio tags can change phase of radio waves received by a radio tag reader, in conformity with the distance between the radio tag and the radio tag reader. Accordingly, radio waves may be sequentially transmitted from the radio tag reader to see whether the phase of response waves transmitted from a radio tag has changed. Thus, based on the response waves, the radio tag may be determined as to whether it is moving.

However, a moving object may reflect the radio waves of a radio tag that is stationary (hereinafter termed stationary tag). These reflected waves from the moving object have a path length that varies with the travel of the object, which may lead to phase change of the reflected waves with the travel of the object. Therefore, confirming phase change alone still cannot eliminate the difficulty of accurately determining whether a radio tag is moving or stationary.

SUMMARY

It is thus desired to precisely keep track of the moving state of a radio tag which is affixed to an article and travels with the article, and in particular, to provide a configuration easily enabling discrimination or selecting between moving radio tags and stationary radio tags.

It is thus further desired to provide a radio tag reader capable of reliably selecting target tags desired to be detected from among read radio tags, It is thus further desired to provide a radio tag reader capable of accurately determining whether a radio tag is moving or stationary.

A first aspect of the present disclosure is an apparatus for detecting tag movements which detects a moving state of a radio tag. The device includes an antenna, a phase measurement section, a distance change measurement section, a detection section, and a velocity change measurement section. The phase measurement section uses the antenna to measure phases of response waves from the radio tag. The distance change measurement section measures change of distance from the radio tag to the antenna based on measurements of the phase measurement section. The detection section detects travel of the radio tag based on measurements of the distance change measurement section. The velocity change measurement section measures change of velocity of the radio tag relative to the antenna based on measurements of the distance change measurement section. In the device, the detection section detects a radio tag having a rate of changes in signs of the velocity, in which the rate is not less than a predetermined value in velocity changes that are measured by the velocity change measurement section, and determines the detected radio tag as being a stationary tag that is not moving.

According to the first aspect, the phase measurement section uses the antenna to measure phases of response waves from a radio tag. Based on the measurements of the phase measurement section, change of distance from the radio tag to the antenna is measured by the distance change measurement section. Based on the measurements of the distance change measurement section, travel of the radio tag is detected by the detection section. Furthermore, based on the measurements of the distance change measurement section, change of velocity of the radio tag relative to the antenna is measured by the velocity change measurement section. A radio tag having a rate of changes in signs of the velocity, in which the rate is not less than a predetermined value in the measured velocity changes, is detected as being a stationary tag.

A moving object, such as a forklift, is usually an assembly of complicated structures including a plurality of supports or concave-convex surfaces. Therefore, if radio waves are reflected by such a moving object passing across the front of the antenna, the position of reflecting radio waves may change. Thus, when phases of the response waves from a stationary tag are measured, the stationary tag may be unavoidably measured as being moving because the reflection path of the radio waves may abruptly change conforming to the change in reflection position. Since the reflection position of the moving object sequentially changes with the travel, the velocity of the stationary tag, which is measured using phases of the response waves, abruptly changes within small values with frequent sign changes of velocity. In this regard, response waves from a moving tag have a reflection path that does not abruptly change. Thus, if the rate of changes in the signs of the velocity in the measured velocity changes is not less than a predetermined value, the reflection path is taken to be changing with the travel of the moving body. Therefore, the response waves are determined to be from a stationary tag. Accordingly, a moving tag can be easily discriminated from a stationary tag.

A second aspect of the present disclosure is an apparatus for detecting tag movements which detects moving state of a radio tag. The device includes an antenna, a phase measurement section, a distance change measurement section a detection section, and a velocity change measurement section. The phase measurement section uses the antenna to measure phases of response waves from the radio tag. The distance change measurement section measures change of distance from the radio tag to the antenna based on measurements of the phase measurement section. The detection section detects travel of the radio tag based on measurements of the distance change measurement section. The velocity change measurement section measures change of velocity of the radio tag relative to the antenna based on measurements of the distance change measurement section. In the device, the detection section detects a radio tag having one peak in a distribution of velocities that are measured by the velocity change measurement section, and determines the detected radio tag as being a stationary tag that is not moving.

According to the second aspect, the phase measurement section uses the antenna to measure phases of response waves from a radio tag. Based on the measurements of the phase measurement section, change of distance from the radio tag to the antenna is measured by the distance change measurement section. Based on the measurements of the distance change measurement section, travel of the radio tag is detected by the detection section. Furthermore, based on the measurements of the distance change measurement section, change of velocity of the radio tag relative to the antenna is measured by the velocity change measurement section. A radio tag having one peak in a distribution of measured velocities is detected as being a stationary tag by the detection section.

When phases of response waves from a stationary tag are measured, reflection positions sequentially change with the travel of the moving object as described above. Thus, velocities measured using phases of response waves mostly have small values. Therefore, if distribution of velocities as measured has one peak in the vicinity of 0 (zero), the reflection path is determined as being changing with the travel of the moving body and the response waves are determined to be from a stationary tag. Thus, a moving tag can be easily discriminated from a stationary tag.

A third aspect of the present disclosure is a radio (wireless) tag reader that selects target tags desired to be detected from among radio tags including the target tags and erroneously read tags. The radio tag reader includes a confirmed tag extraction unit, a threshold calculation unit, and a selecting unit. The confirmed tag extraction unit extracts a plurality of radio tags estimated to be target tags, based on a first threshold that uses at least one of phase variation, velocity or acceleration, distance or angle data, and reception intensity. The threshold calculation unit calculates a second threshold using at least one of phase variation, velocity or acceleration, distance or angle data, period from first reading to last reading, and reception intensity of the plurality of extracted target tags. The selecting unit selects target tags desired to be detected by using the calculated second threshold from among target tags that have not been extracted by the confirmed tag extraction unit.

According to the third aspect, a plurality of target tags are reliably extracted based on the first threshold that uses at least one of phase variation, velocity or acceleration, distance or angle data, and reception intensity. The second threshold is calculated using at least one of phase variation, velocity or acceleration, distance or angle data, period from first reading to last reading, and reception intensity of the plurality of extracted target tags. Specifically, the radio tag reader calculates a second threshold that is a value relative to detection values of radio tags that are reliably target tags. Based on the second threshold, the radio tag reader selects target tags desired to be detected, from among target tags that have not been reliably determined to be target tags. Thus, the radio tag reader can reliably select radio tags that are desired to be detected, eliminating the influence of the materials or moisture absorption of the loaded packages, or influence of reflected waves. Since the second threshold is calculated from the plurality of extracted target tags, there is no need of affixing a reference tag to an object desired to be discriminated in order to obtain a relative value in advance.

A fourth aspect of the present disclosure is a radio (wireless) tag reader that detects a moving tag and a stationary tag based on phase values of response waves received from a radio tag. The radio tag reader includes a total number calculation unit, a sum calculation unit, a calculation unit, and a selecting unit. The total number calculation unit calculates a total number of phase values throughout an angle range of detecting phase values (0° to 180° or 0° to 360°). The sum calculation unit calculates a most frequent sum by calculating a sum of phase values for each angle in every predetermined angle range (90° or a half value of the all angle range) throughout the angle range of detecting phase values. The calculation unit calculates a phase bias, that is, whether phase values are biased in the predetermined angle range of the most frequent sum, by comparing the total number with the most frequent sum. The selecting unit selects tags with a low phase bias as being moving tags and selects tags with a high phase bias as being stationary tags.

According to the fourth aspect, moving tags can be selected based on phase bias because moving tags have low phase bias. Furthermore, tags which are not moving but showing phase behavior of moving tags will have high phase bias. Therefore, these tags are selected as being stationary tags. Since moving tags and stationary tags are specified relying on phase bias, time required for specifying moving tags and stationary tags can be reduced.

Bias can also be found if there is alteration in distribution configuration. When preparing distribution, the distribution configuration may alter depending on the parameter. The distribution configuration becomes more stable as the parameter increases. However, radio tag readers, which are required to perform real-time discrimination, should not rely on distribution configuration when performing discrimination.

In this regard, the fourth aspect of the present disclosure has focused attention on the fact that phases of a stationary tag correspond to a combination of direct waves and reflected waves. Thus, a range where direct waves and reflected waves enhance each other is determined in advance to search bias and enable discrimination not relying on distribution. By achieving discrimination with a fewer number of times of reading, moving tags can be discriminated from stationary tags at high speed.

A fifth aspect of the present disclosure is a radio (wireless) tag reader that communicates with a radio tag. The radio tag reader includes a phase calculation section, a phase difference calculation section, a phase rotation detection section, and a moving/stationary determination section. The phase calculation section transmits radio waves to the radio tag to sequentially calculate phases of received waves which are radio waves transmitted from the radio tag in response and received by the radio tag reader. The phase difference calculation section calculates phase differences, each being a difference between phases which have been calculated at two time points by the phase calculation section. The phase rotation detection section detects one rotation of phases of the received waves, based on the phase differences calculated by the phase difference calculation section. The moving/stationary determination section determines whether the radio tag is moving, based on a frequency of rotation of the phases in a predetermined moving/stationary determination period.

When a moving body passes near a stationary tag, combined waves of reflected waves and direct waves are observed as received waves. The reflected waves correspond to the response waves transmitted from the stationary tag and reflected by the moving object. The direct waves correspond to the waves directly received from the stationary tag.

Phases of reflected waves rotate with the travel of the moving object and thus phases of combined waves also rotate. However, when direct waves and reflected waves attenuate each other, combined waves are unlikely to be observed. Direct waves and reflected waves enhance each other when in the same phase, and attenuate each other when in reverse phases. Direct waves from a stationary tag always have the same phase, while the phase of reflected waves depends on the distance from the moving object causing reflection to the radio tag reader. Accordingly, the intensity of combined waves depends on the position of the moving object.

Therefore, while phases of combined waves rotate with the travel of the moving object, after the combined waves have become observable due to approach of the moving object, the combined waves may become sometimes observable and sometimes not observable.

Larger phase difference between direct waves and reflected waves means that the phase of the combined waves is offset accordingly from that of the direct waves. At the same time, larger phase difference between direct waves and reflected waves means that the amplitude of the combined waves becomes smaller accordingly. Consequently, combined waves of a stationary tag may have an observable phase range that is more limited than that of direct waves from a radio tag affixed to a moving body (termed moving tag hereinafter), Since the observable phase range is limited, phase rotation is unlikely to be detected based on phase differences. In other words, even when combined waves are received from a stationary tag, rotation of phases can be detected only a fewer number of times in a given period.

Accordingly, by allowing the phase determination section to determine whether the radio tag is moving based on phase frequency during a moving/stationary determination period, erroneous determination of a stationary tag as being a moving tag is minimized, which would otherwise occur due to the influence of reflected waves. Thus, accuracy is improved in determining whether a radio tag is moving or stationary.

The foregoing reference numbers or numerals exemplify correspondent components in the following embodiments.

BRIEF DESCRIPTION OF THE DRAWINGS

FIG. 6 is an illustration in which FIG. 6(A), FIG. 6(B) and FIG. 6(C) thereof are diagrams illustrating change of reflection path of radio waves when a stationary tag is read;

FIG. 7 is an illustration in which FIG. 7(A) is a diagram illustrating change of velocity of a stationary tag with time; and FIG. 7(B) is a diagram illustrating change of velocity of a moving tag with time;

FIG. 8 is an illustration in which FIG. 8(A) is a diagram illustrating change of velocity of a stationary tag with time in a state where change of reflection position is comparatively small; and FIG. 8(B) is a diagram illustrating velocity distribution of FIG. 8(A);

FIG. 9 is an illustration in which FIG. 9(A) is a diagram illustrating change of velocity of a stationary tag with time in a state where change of reflection position is comparatively large; and FIG. 9(B) is a diagram illustrating velocity distribution of FIG. 9(A);

FIG. 10 is an illustration in which FIG. 10(A) is a diagram illustrating change of velocity of a moving tag with time; and FIG. 10(B) is a diagram illustrating velocity distribution of FIG. 10(A);

FIG. 11 is an illustration in which FIG. 11(A) is a diagram illustrating change of velocity of a moving tag with time when passing through a null range; and FIG. 11(B) is a diagram illustrating velocity distribution of FIG. 11(A);

FIG. 12 is an illustration in which FIG. 12(A) is a diagram illustrating change of distance to an antenna measured for a moving tag and a stationary tag according to a third embodiment of the present disclosure; and FIG. 12(B) is a diagram illustrating angle change;

FIG. 13 is an illustration in which FIG. 13(A) is a diagram illustrating phase variation and received power of a radio tag, FIG. 13(B) is a diagram illustrating angle change of a moving radio tag; and FIG. 13(C) is a diagram illustrating distance change of a moving radio tag;

FIG. 16 is an illustration in which FIG. 16(A) is a diagram illustrating a radio tag reader according to a fourth embodiment of the present disclosure; and FIG. 16(B) is a diagram illustrating a radio tag reader according to a first modification of the fourth embodiment;

FIG. 20 is an illustration in which FIG. 20(A) is a flow diagram illustrating an interruption process following the main flow of FIG. 14 performed by a radio tag reader according to a second modification of the third embodiment; and FIG. 20(B) is a flow diagram illustrating an interruption process following the main flow of FIG. 14 performed by the radio tag reader of the fourth embodiment;

FIG. 21 is an illustration in which FIG. 21(A) is a flow diagram illustrating a teaching process performed by the radio tag reader according to the fifth embodiment; and FIG. 21(B) is a flow diagram illustrating a confirmed target tag extraction failure process performed by the radio tag reader according to the fifth embodiment;

FIG. 22 is an illustration in which FIG. 22(A) is a diagram illustrating data variation in the case where the distance between a target tag and a radio tag reader is short; FIG. 22(B) is a diagram illustrating data variation in the case where the distance between a target tag and a radio tag reader is long; FIG. 22(C) is a diagram illustrating the case where phase variation mostly exceeds a threshold and variation is small; and FIG. 22(D) is a diagram illustrating skip value processing in the case of FIG. 22(C);

FIG. 23 is an illustration in which FIG. 23(A) is a diagram illustrating moving tags and stationary tags according to a sixth embodiment of the present disclosure; and FIG. 23(B) is a diagram illustrating direct waves and reflected waves;

FIG. 24 is an illustration in which FIG. 24(A) is a diagram illustrating phase change of a moving tag 30$a$; FIG. 24(B) is a diagram illustrating phase change of a stationary tag 30$b$; FIG. 24(C) is a diagram illustrating phase change of a stationary tag 30$c$; and FIG. 24(D) is a diagram illustrating phase change of a stationary tag 30$d$;

FIG. 25 is an illustration in which FIG. 25(A) is a diagram illustrating phase change of the moving tag 30$a$; FIG. 25(B) is a diagram illustrating frequency of phase (θ) in the range of −90° to +90° of FIG. 25(A); FIG. 25 (C) is a diagram illustrating phase change of the stationary tag 30$c$; and FIG. 25(D) is a diagram illustrating frequency of phase (θ) in the range of −90° to +90° of FIG. 25(C);

FIG. 26 is an illustration in which FIG. 26(A) is a diagram illustrating a sum ni(0) of frequencies in the range of phase 0° to phase 90°; FIG. 26(B) is a diagram illustrating a sum ni(1) of frequencies in the range of phase 1° to phase 91°; FIG. 26(C) is a is a diagram illustrating a sum ni(91) of frequencies in the range of phase 91° to phase 1°; and FIG. 26(D) is a diagram illustrating a sum ni(180) of frequencies in the range of phase 180° to phase 90°;

FIG. 30 is a flow diagram illustrating a sub-routine for calculating phase variation;

FIG. 31 is a flow diagram illustrating a sub-routine for calculating phase bias;

FIG. 32 is a flow diagram illustrating a sub-routine for a process of determining tags;

FIG. 33 is an illustration in which FIG. 33(A) is a flow diagram illustrating a sub-routine for a distance estimation process; and FIG. 33(B) is a flow diagram illustrating a sub-routine for a velocity estimation process;

FIG. 35 is an illustration in which FIGS. 35(A), 35(B) and 35(C) are diagrams each illustrating calculation of phase variation;

FIG. 36 is an illustration in which FIG. 36(A) is a diagram illustrating a first threshold and a second threshold; FIG. 36(B) is a diagram illustrating stationary tags and moving tags identified by the first and second thresholds; and FIG. 36(C) is a diagram illustrating a third threshold;

FIG. 47 is a diagram illustrating a first specific example of the eighth embodiment;

FIG. 48 is a diagram illustrating a moving state of a radio tag in a second specific example;

FIG. 51 is a chart illustrating change of phase frequency and results of moving/stationary determination in the second specific example;

FIG. 54 is a diagram specifically illustrating results of moving/stationary determination obtained in the ninth embodiment.

DETAILED DESCRIPTION OF THE PREFERRED EMBODIMENTS

First Embodiment

Figure 1:
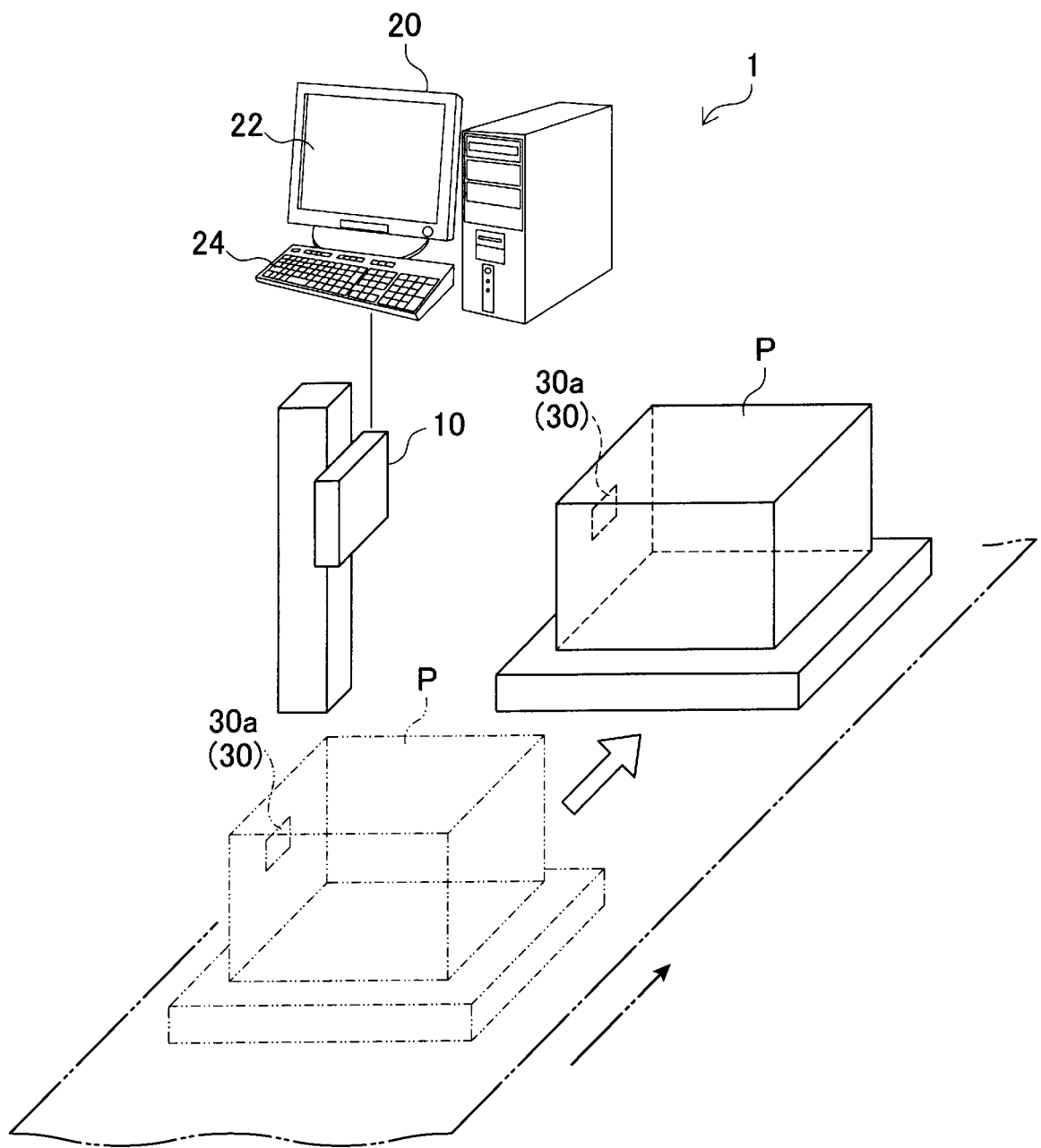
FIG. 1 is a schematic diagram illustrating a configuration of a conveyance management system according to a first embodiment of the present disclosure.

With reference to the accompanying drawings, a first embodiment will be described. The first embodiment embodies a conveyance management system which is provided with a moving/stationary tag detection device (functioning as an apparatus for detecting tag movements) according to the present disclosure, FIG. 1 shows a conveyance management system 1 including a radio (wireless) tag reader 10 and a management device 20. The conveyance management system 1 is configured to manage the moving state or the like of a package P, to which a radio tag 30, such as a radio-frequency (RF) tag (i.e., wireless tag), is affixed, by allowing the radio tag reader 10 to detect the package P. As shown in FIG. 1, the radio tag reader 10, which serves as a moving/stationary tag detection device, is disposed on a conveyance path, through which the package P with the radio tag 30 affixed thereto is conveyed, to read the radio tag 30. The management device 20 manages the package P based on the results of reading of the radio tag reader 10.

The radio tag reader 10 is configured, for example, by a known RF radio tag reader and is set up, as shown in FIG. 1, at a gate provided to the conveyance path. The radio tag reader 10 outputs data read from the radio tag 30 or data related to the moving state of the radio tag 30 to the management device 20.

Figure 2:
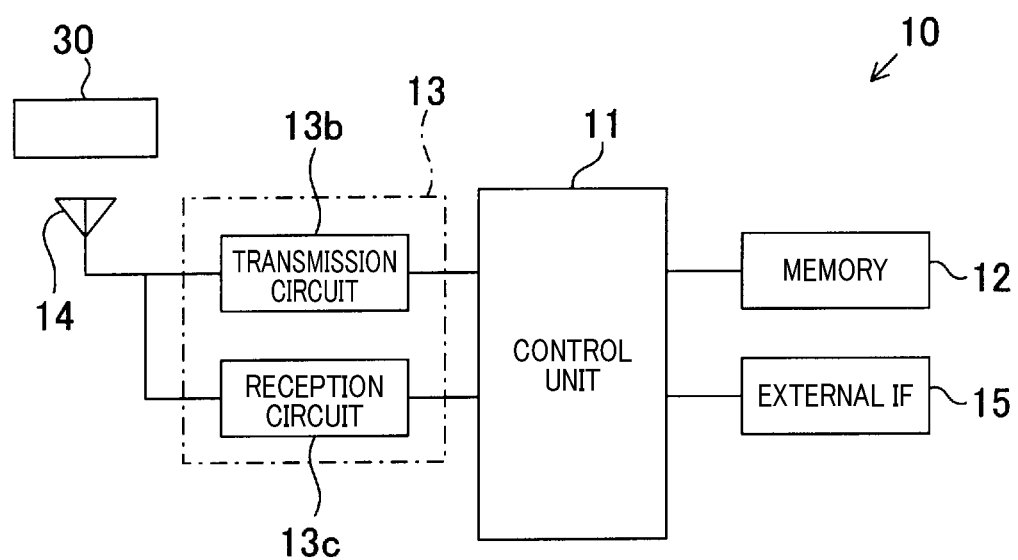
FIG. 2 is a block diagram illustrating an example of an electrical configuration of a radio tag reader.

The radio tag reader 10 has a hardware configuration, as shown in FIG. 2, which includes a control unit 11, a memory 12, a communication processing unit 13, an antenna 14 and an external interface 15. The control unit 11, which is mainly configured by a microcomputer, includes a CPU, a system bus and an input/output interface. The control unit 11 configures a data processing unit together with the memory 12 that is configured by a semiconductor memory or the like.

As shown in FIG. 2, the communication processing unit 13 includes a transmission circuit 13b and a reception circuit 13c. For example, the transmission circuit 13b is configured by a carrier oscillator, an encoder, a modulator, an amplifier, and other components. The carrier oscillator outputs a carrier (carrier waves) of a predetermined frequency. The encoder is connected to the control unit 11 to encode transmission data outputted from the control unit 11 and outputs the encoded data to the modulator. The modulator receives an input of a carrier (carrier waves) from the carrier oscillator and transmission data from the encoder, Specifically, the modulator produces a modulated signal for the carrier (carrier waves) outputted from the carrier oscillator and outputs the modulated signal to the amplifier. The modulated signal is a signal that has been ASK (amplitude shift keying) modulated by an encoded transmission code (modulation signal) outputted from the encoder when a command is transmitted to a communication target. The amplifier amplifies the inputted signal (modulated signal from the is modulator) by a set amplification factor. The amplified signal is ensured to be outputted to the antenna 14 as a transmission signal, The antenna 14 is connected to an input terminal of the reception circuit 13c so that a radio signal (reception signal), corresponding to response waves, received by the antenna 14 from a radio tag 30 is ensured to be inputted to the reception circuit 13c. For example, the reception circuit 13c is configured by an amplifier, a demodulator and other components. The reception circuit 13c allows the amplifier to amplify a reception signal received by the antenna 14 and allows the demodulator to demodulate the amplified signal. Furthermore, the reception circuit 13c outputs a signal corresponding to the waveform of the demodulated signal to the control unit 11 as reception data. The phase of the response waves of the radio tag 30 received in this manner is correlated to the measurement time (reception time) by the control unit 11 and sequentially stored in the memory 12. It should be noted that the control unit 11 or the communication processing unit 13 can correspond to an example of the phase measurement section.

The external interface 15 is configured as an interface for performing data communication with an external device, e.g., the management device 20, to perform a communication process in cooperation with the control unit 11.

Figure 3:
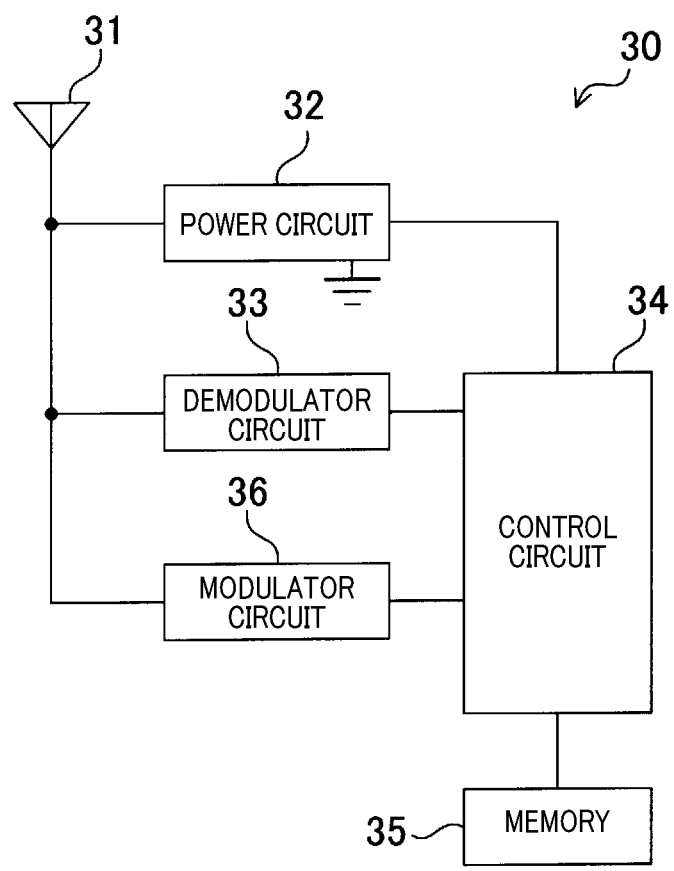
FIG. 3 is a block diagram illustrating an example of an electrical configuration of a radio tag.

Referring to FIG. 3, an electrical configuration of the radio tag 30 to be read by the radio tag reader 10 will be described.

As shown in FIG. 3, the radio tag 30 includes an antenna 31, a power circuit 32, a demodulator circuit 33, a control circuit 34, a memory 35 and a modulator circuit 36. The power circuit 32 rectifies and smooths a transmission signal (carrier signal) received from the radio tag reader 10 via the antenna 31 to produce operation power which is supplied to the individual components including the control circuit 34.

The demodulator circuit 33 demodulates data superimposed on the transmission signal (carrier signal) and outputs the demodulated signal to the control circuit 34. The memory 35 is configured by ROM and various semiconductor memories, such as EEPROM, and stores control programs or identification information (tag ID) for identifying the radio tag 30, data according to usage of the radio tag 30, or other information or data. The control circuit 34 reads data from the memory 35 and outputs the read data as transmission data to the modulator circuit 36. The modulator circuit 36 load-modulates a response signal (carrier signal) with the transmission data and transmits the load-modulated signal from the antenna 31 as response waves. FIGS. 2 and 3 respectively show examples of electrical configurations of the radio tag reader 10 and the radio tag 30. However, as long as these configurations can perform radio communication through medium of electromagnetic waves, other known electrical configurations may be used, The management device 20 will be described.

Figure 4:
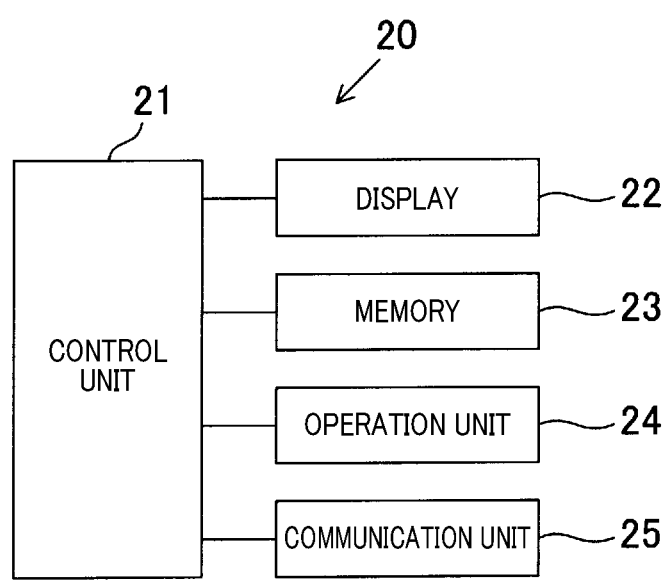
FIG. 4 is a block diagram illustrating an example of an electrical configuration of a management device.

The management device 20 uses data read from a radio tag 30 and acquired from the radio tag reader 10 or uses externally acquired data to serve as a device for managing the states of conveyance of packages P. The management device 20 is configured, for example, as a computer and includes, as shown in FIG. 4, a control unit 21 configured by a CPU and the like, a display 22 configured as a liquid crystal monitor or the like, a memory 23 configured by ROM, RAM, HDD and the like, an operation unit 24 configured as a mouse, a keyboard or the like, and a communication unit 25 configured as a communication interface for performing data communication with an external device, e the radio tag reader 10 or a high-order device.

A configuration characteristic of the radio tag reader 10 of the present embodiment will be specifically described.

The radio tag reader 10 of the present embodiment uses phases difference of response waves received from a radio tag 30 to detect a moving state of the radio tag 30. This is because use of phase differences enables correct detection of the moving state of the radio tag 30 even when it is moving at a low speed. Specifically, in a measurement process performed by the control unit 11, the control unit 11 uses the communication processing unit 13 so that phases of response waves from the measured radio tag 30 are stored in the memory 12 for a predetermined period, being correlated to the measurement times (reception times). Then, in a tag detection process performed by the control unit 11, the control unit 11 reads the phases and the measurement times of the response waves stored in the memory 12, and measures a distance to the radio tag 30 based on a phase sum which is an accumulation of phase differences calculated based on these phases. As the method of measuring a distance to the radio tag 30 based on a phase sum, for example, the method described in the text of Japanese Patent Application No. 2017-189510 may be used.

Figure 5:
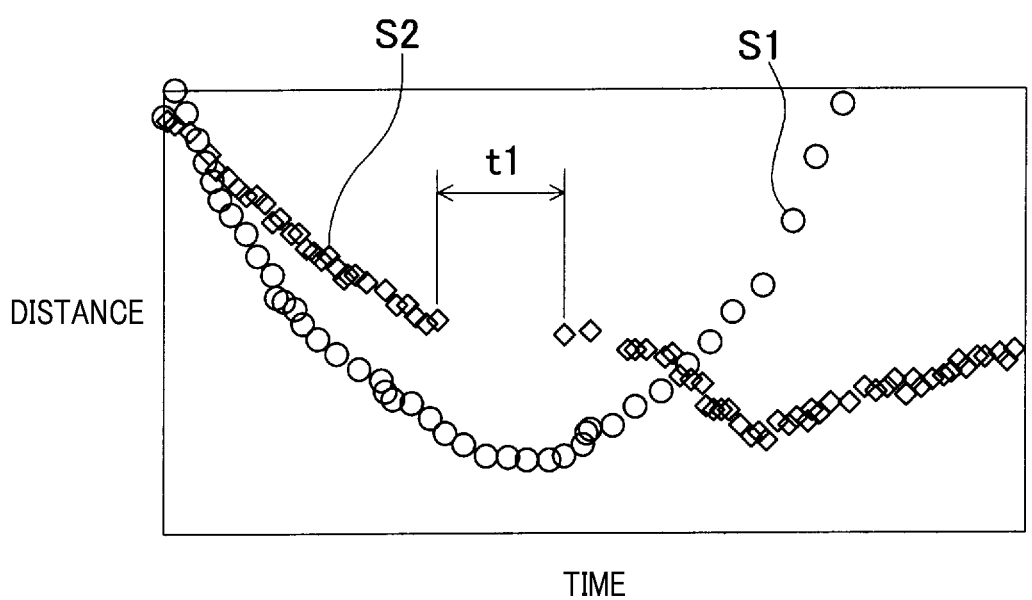
FIG. 5 is a diagram illustrating change of distance to an antenna measured for a moving tag and a stationary tag.

Thus, for example, if a package P with a radio tag 30 affixed thereto is linearly conveyed by a forklift: or the like across the front of the radio tag reader 10 (antenna 14), distance to the moving tag 30 (also termed moving tag 30a hereinafter) as measured changes with time as indicated by the measurement S1 in FIG. 5. Specifically, the phase sum calculated as mentioned above is used as a basis for measuring change in distance from the radio tag 30 to the antenna 14. Based on this measurement, travel of the radio tag 30 is detected. Accordingly, the control unit 11 serves as the distance change measurement section that measures change in distance from the radio tag 30 to the antenna 14 based on the phase sum, and also serves as the detection section that detects travel of the radio tag 30 based on the measurement of distance change. FIG. 5 shows that the radio tag reader 30 is positioned closer to the radio tag reader 10 (antenna 14) toward the lower part of the diagram, Radio tags 30 are usually not read by the radio tag reader 10 if they are not moving because of being affixed to articles or the like which are located neither near the radio tag reader 10 nor in front (on radio emission side) of the antenna 14 (also termed stationary tags 30b hereinafter). However, as shown in FIGS. 6(A) to 6(C), if a moving object M, such as a forklift, moves across the front of the radio tag reader 10 (antenna 14), the moving object M may reflect radio waves, and response waves from a stationary tag 30b may be received. In this case, if phases of the response waves from the stationary tag 30b are measured as being changing due to traveling of the moving object M, measured distance may change with time as indicated by the measurement S2 in FIG. 5. Resultantly, the stationary tag 30b may be erroneously detected as being moving. Also, there may be a state where the response waves from the stationary tag 30b cannot be temporarily received (null state, see t1 of FIG. 5) due to the influence or the like of the surrounding environment. This state can also be a factor of erroneous detection.

Specifically, the moving object M, such as a forklift, is usually an assembly of complicated structures including a plurality of supports or concave-convex surfaces. Therefore, if radio waves are reflected by such a moving object M passing across the front of the radio tag reader 10 (antenna 14), the position of reflecting radio waves may change as shown in FIGS. 6(A) to 6(C). More specifically, for example, when the forklift has traveled to the position shown in FIG. 6(A), radio waves may be reflected by a support ahead of the driver's seat of the forklift. When the fork lift has traveled to the position shown in FIG. 6(B), radio waves may be reflected by a part of the seat support of the forklift. When the fork lift has traveled to the position shown in FIG. 6(C), radio waves may be reflected by a support behind the driver's seat of the forklift.

Thus, when phases of the response waves from the stationary tag 30b are measured, the stationary tag 30b may be unavoidably measured as being moving because the reflection path of the radio waves may abruptly change conforming to the change of reflection position The velocity of the stationary tab 30b relative to the radio tag reader 10 (antenna 14) may be calculated, for example, by differentiating the distance measured using phases of the response waves. In this case, since the reflection position of the moving object M sequentially changes with the travel thereof, the velocity of the stationary tag 30b abruptly changes within small values as shown in FIG. 7(A) with frequent sign changes of velocity. The same applies to the acceleration calculated by differentiating this velocity. In this regard, the response waves from a moving tag 30a have a reflection path that will not abruptly change. Therefore, as shown in FIG. 7(B), velocity of the moving tag 30a relative to the radio tag reader 10 (antenna 14) calculated by differentiating the measured distance will not show frequent sign changes. In FIGS. 7(A) and 7(B), velocity in the direction of approaching the radio tag reader 10 (antenna 14) is taken to be positive, while velocity in the direction of departing from the radio tag reader 10 (antenna 14) is taken to be negative.

Accordingly, if the rate of change of sign in measured velocities (rate of change in acceleration) is not less than a predetermined value, the reflection path is taken to be changing with the travel of the moving object M and thus the response waves are determined as being transmitted from a stationary tag 30b. Specifically, for example, in an environment, such as an outdoor environment with good visibility, where there are fewer objects reflecting radio waves, if the rate of sign change of velocities is 25% or more, the response waves are determined to be from a stationary tag 30b, and if less than 25%, determined to be from a moving tag 30a. In an environment, such as inside a warehouse, where there are lots of objects reflecting radio waves, if the rate of sign change of velocities is 50% or more, the response waves are determined to be from a stationary tag 30b, and if less than 50%, determined to be from a moving tag 30a. Thus, by changing the predetermined value depending on the environment where the radio tag reader 10 is used, the accuracy of detecting stationary tags 30b can be enhanced.

Thus, in the present embodiment, moving tags 30a can be easily discriminated from stationary tags 30b, based on the rate of changes in the signs of the measured velocities. It should be noted that the control unit 11 that measures velocity change of the radio tag 30 relative to the antenna 14 based on the measurement of distance change can correspond to an example of the velocity change measurement section.

Second Embodiment

With reference to the drawings, a moving/stationary tag detection device according to a second embodiment will be described, The second embodiment is different from the first embodiment in that moving tags 30a are discriminated from stationary tags 30b according to distribution of measured velocities. The components identical with or similar to those of the first embodiment are given the same reference numerals to omit description. The same applies to the third and subsequent embodiments.

As described above, when phases of response waves from a stationary tag 30b are measured, the reflection position sequentially changes with the travel of a moving object M. Thus, velocities measured based on the phases of response waves mostly have small values.

For example, if the change of reflection position is comparatively small, the stationary tag 30b will have velocities, as shown in FIG. 8(A), which are approximate to 0 (zero). In this case, distribution of measured velocities has one peak in the vicinity of 0 (zero) as shown in FIG. 8(B). For example, if reflection position changes comparatively frequently, the stationary tag 30b will have velocities, as shown in FIG. 9(A), which greatly change in the vicinity of 0 (zero). In this case as well, distribution of measured velocities shows one peak in the vicinity of 0 (zero) as shown in FIG. 9(B). In other words, distribution of measured velocities of the stationary tag 30b, which has one peak in the vicinity of 0 (zero), appears to be a normal distribution.

For example, if a moving tag 30a linearly passes across the front of the radio tag reader 10 (antenna 14), velocities of the moving tag 30a may change as shown in FIG. 10(A). In this case, distribution of measured velocities has a plurality of peaks as shown in FIG. 10(B). For example, if a moving tag 30a passes through a range disabling reception of radio waves (null range) when passing across the front of the radio tag reader 10, velocities of the moving tag 30a cannot be measured during a predetermined period (see t2 of FIG. 11(A)). In this case as well, distribution of the measured velocities will have a plurality of peaks as shown in FIG. 11(B). In other words, velocity distribution of the moving tag 30a, which does not have one peak, does not appear to be a normal distribution. It should be noted that, in FIGS. 8(A), 9(A), 10(A) and 11(A), velocity in the direction of approaching the radio tag reader (antenna 14) is taken to be positive, while velocity in the direction of departing from the radio tag reader 10 (antenna 14) is taken to be negative.

Accordingly, in the tag detection process of the present embodiment, even more specific condition is used if distribution of measured velocities has one peak. Specifically, if distribution of measured velocities has one peak in the vicinity of 0 (zero), the reflection path is determined as being changing with the travel of the moving body M and the response waves are determined to be from a stationary tag 30b. In other words, a radio tag 30 having one peak in the velocity distribution is detected as being a stationary tag 30b. In this manner, moving tags 30a can be easily discriminated from stationary tags 30b.

The present disclosure should not be construed as being limited to the first and second embodiments and modifications thereof. For example, the present disclosure can be embodied as follows.

(1) In the tag detection process, a radio tag 30 may be detected as being a stationary tag 30b if the radio tag 30 has a rate of changes in the signs of the velocity, in which the rate is not less than a predetermined value in measured velocities, and shows a velocity distribution with one peak. Thus, considering both the rate of changes of the velocity signs and the velocity distribution, the accuracy of detecting stationary tags 30b is enhanced.

Figure 12:
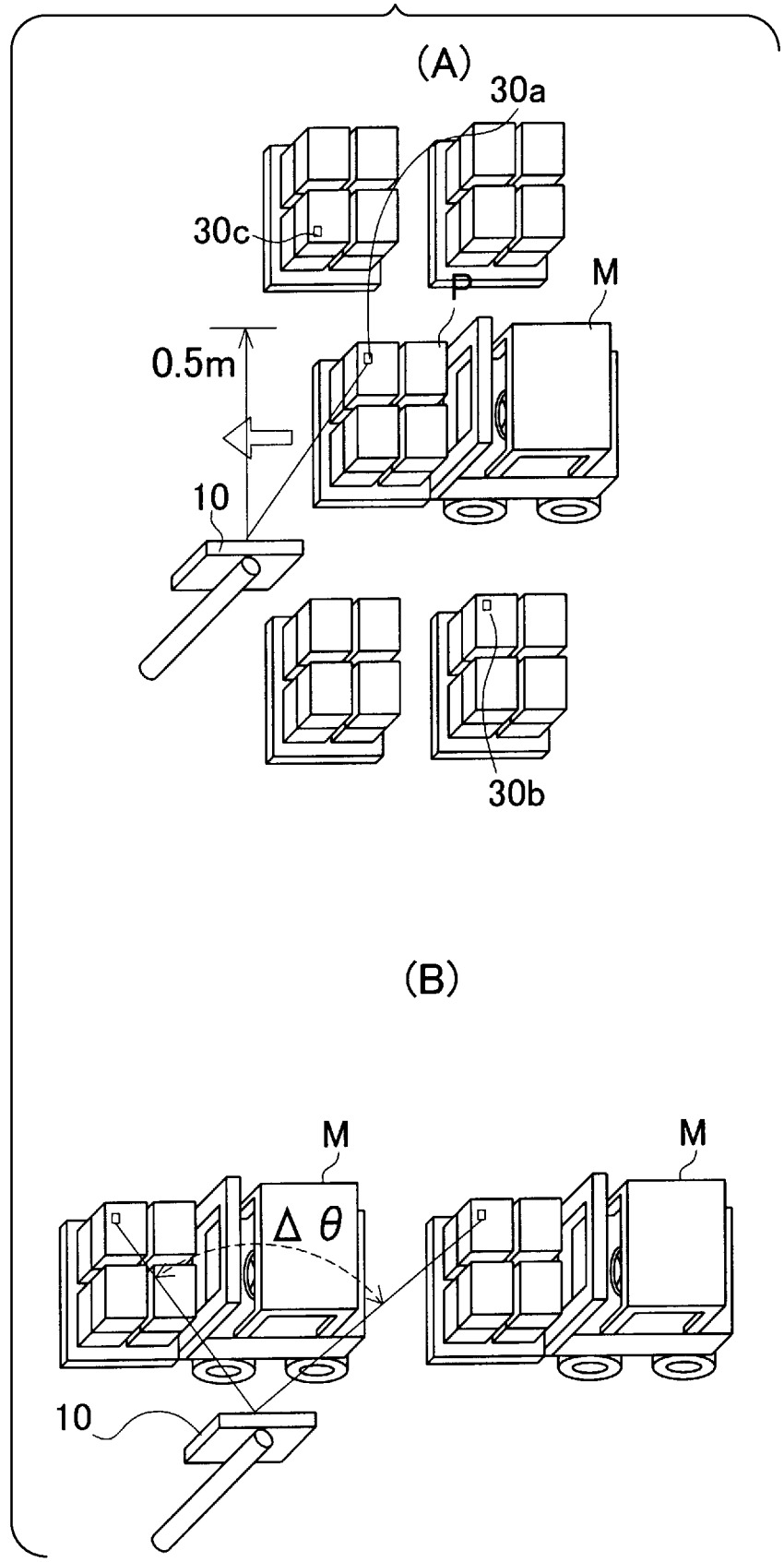

(2) The tag detection process is not limited to be executed by the radio tag reader 10, but may be executed by the management device 20 or other component that has received results of detection from the radio tag reader 10, in this configuration, the radio tag reader 10 or the management device 20 or other component serves as the moving/stationary tag detection device, Third Embodiment A third embodiment will be described. As shown in FIG. 12(A), if packages P with radio tags 30 affixed thereto are linearly conveyed across the front of a radio tag reader 10 (antenna 14) by a forklift M or the like, measured distance to any of the moving radio tags 30 (also termed moving tags 30a hereinafter) changes with time. Specifically, change of distance from a radio tag 30 to the antenna 14 is measured based on a phase sum that is measured as described above. Based on this measurement of distance, travel of the radio tag 30 is detected. Thus, the control unit 11 uses a phase sum as a basis for measuring change of distance from the radio tag 30 to the antenna 14, and uses the change of measured distance as a basis for detecting travel of the radio tag 30.

Radio tags 30 are usually not read by the radio tag reader 10 if they are not moving because of being affixed to articles or the like located neither near the radio tag reader 10 nor in front (on radio emission side) of the antenna 14 (also termed stationary tags 30b hereinafter), or if they are located further than a reading range (e.g., 0.5 m) of the antenna 14 (termed distant stationary tags 30c hereinafter). However, if a moving object M, such as a forklift, moves across the front of the radio tag reader 10 (antenna 14), the moving object M may reflect radio waves, and response waves from a stationary tag 30b or a distant stationary tag 30c may be received. In this case, if phases of the response waves from the stationary tag 30b or the distant stationary tag 30c are measured as being changing due to the travel of the moving object M, measured distance may change with time. Resultantly, the stationary tag 30b or the distant stationary tag 30c may be erroneously detected as being moving. Also, there may be a state where the response waves from the stationary tag 30b or the distant stationary tag 30c cannot be temporarily received (null state) due to the influence or the like of the surrounding environment. This state can also be a factor of erroneous detection.

Thus, even when it is a stationary tag 30b or a distant stationary tag 30c that is subjected to measurement of phases of the response waves, the stationary tag 30b or the distant stationary tag 30c may be unavoidably measured as being moving because the reflection path of the radio waves abruptly changes conforming to the change of reflection position. Therefore, the radio tag reader 10 of the third embodiment performs a process of selecting target tags desired to be detected from among the radio tags that include the target tags and erroneously read tags.

Figure 13:
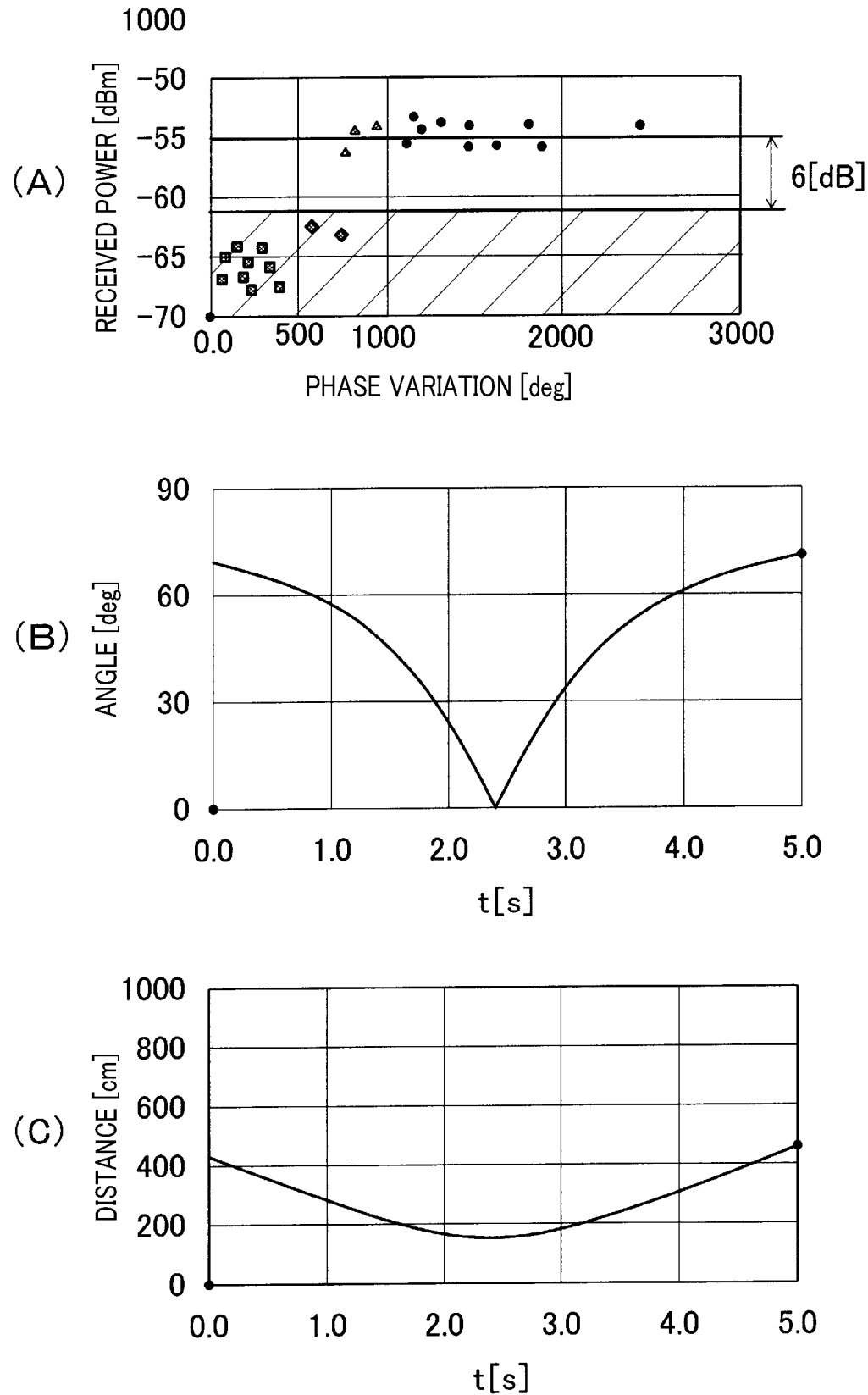

FIG. 13(A) shows received powers of radio tags which have showed phase change among read tags. The vertical axis indicates received power dBm and the horizontal axis indicates phase variation (phase sum) deg. In the figure, a mark □ indicates a stationary tag (erroneously read tag) and a mark • indicates a moving tag. In the third embodiment, target tags which are reliably ensured to be moving with a phase variation of 1000 deg or more are extracted based on a first threshold. Then, an average of received powers (e.g., −55 dBm) is calculated for the tags which have been reliably ensured to be target tags. Then, based on a second threshold (−61 dBm), the remaining radio tags whose received power is lower than the average (−55 dBm) by 6 dB and have not been reliably ensured to be target tags are selected as moving tags Δ and stationary tags ◇.

Referring to the flow diagrams of FIGS. 14 and 15, a description will be given of a selecting process for selecting tags as moving tags and stationary tags performed by the radio tag reader. First, a radio tag is read and data of the radio tag are acquired (step S12). At this step, the radio tag reader acquires data of the radio tag, including IDs phase, received power and reading time. Then, it is determined whether frequency of reading the tag has reached a predetermined value or more (step S14). Specifically, since reading is iterated for the same radio tag, control returns to step S12 for acquisition of read data until the frequency reaches the predetermined value or more (No at step S14). Then, when the frequency of reading has reached the predetermined value or more, differences of the acquired phases are summed up based on the reading times to obtain a phase variation (phase sum) (deg). Then, a moving/stationary determination process is performed (step S30).

Figure 14:
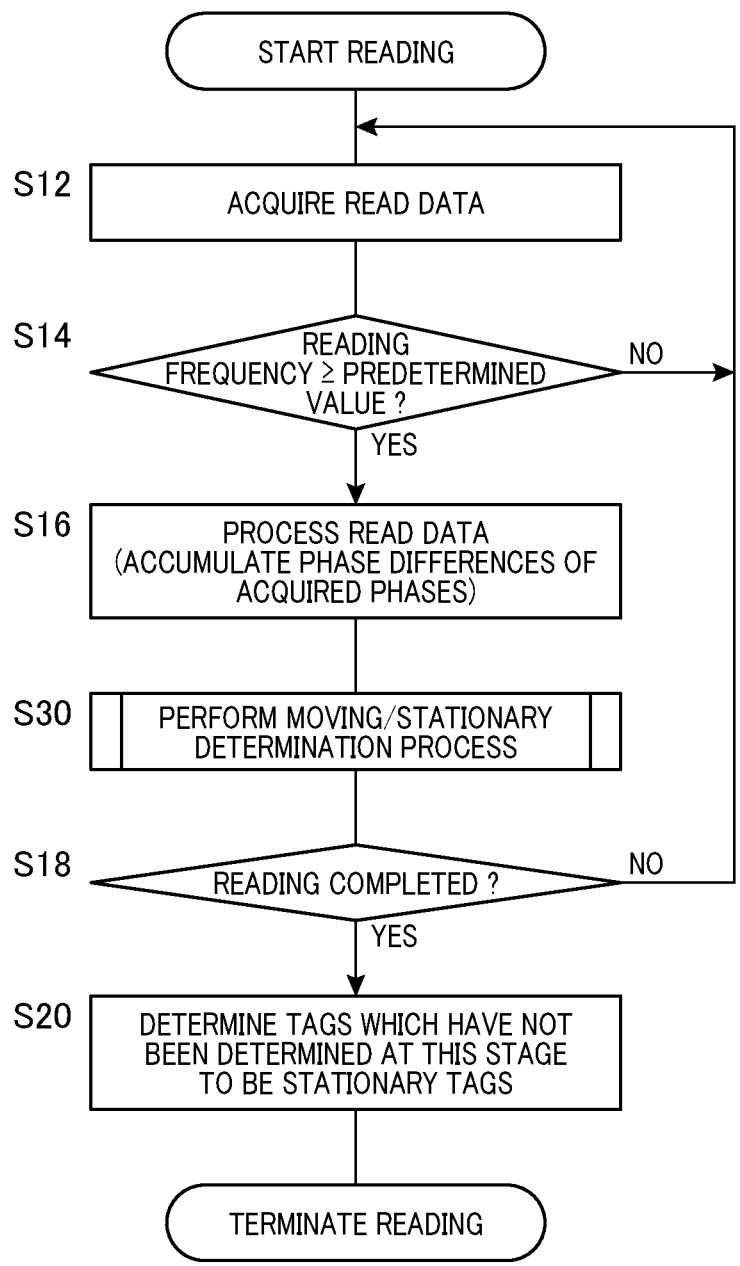
FIG. 14 is a main flow diagram illustrating a radio tag reading process performed by a radio tag reader according to the third embodiment.
Figure 15:
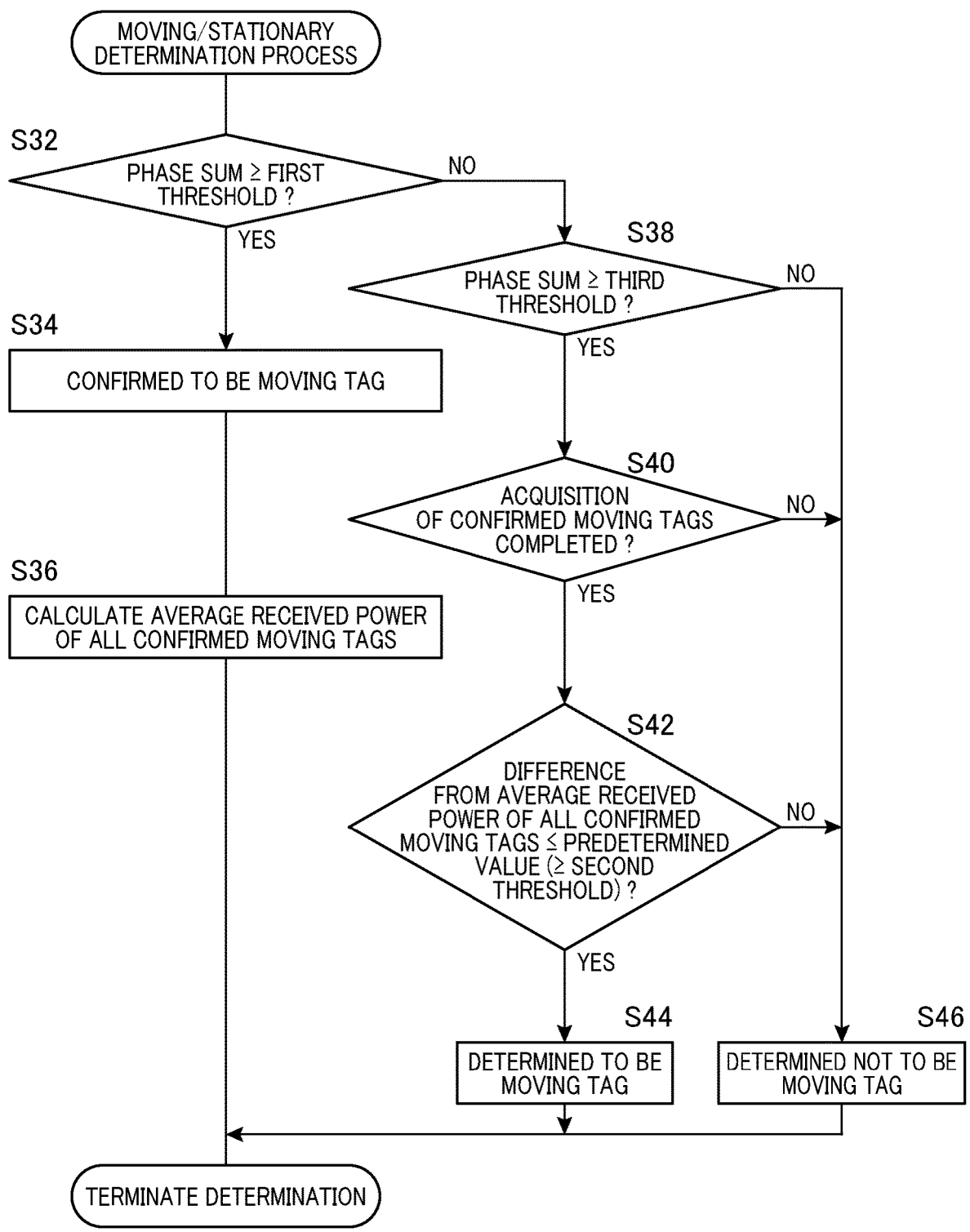
FIG. 15 is a flow diagram illustrating a sub-routine of a moving/stationary determination process performed by the radio tag reader according to the third embodiment.

FIG. 15 shows a sub-routine, i.e. the moving/stationary determination process (step S30), of FIG. 14. First, it is determined whether a phase difference integrated value (termed phase sum hereinafter) is a first threshold (1,000 deg) or more (step S32). A radio tag having a phase sum equal to or more than the first threshold (marks • in FIG. 13(A)) is confirmed to be a moving tag (step S34). Then, an average of received powers of all the confirmed moving tags is calculated (step S36). As described referring to FIG. 13(A), an average of received powers (e.g., −55 dBm) of the tags that are reliably ensured to be target tags is calculated. Then, control returns to the main flow of FIG. 14. At step S18, it is determined whether reading has been completed (No at step S18), and then control returns to step S12.

If the phase sum has been determined to be less than the first threshold (1000 deg) (No at step S32), it is determined whether the phase sum is not less than a third threshold (500 deg) (step S38). At this step, the radio tags that have not moved at all or have moved little are excluded to reduce processing time and load. In FIG. 13(A), the radio tags with a mark □ correspond to the tags having a phase sum of less than the third threshold (500 deg) (No at step S38) and thus are determined not to be moving tags (step S46).

Until all the tags are confirmed to be moving tags at step S34, radio tags marked ◇ and Δ in FIG. 13(A) whose phase sum is determined to be not less than the third threshold (500 deg) at step S38 are temporarily determined, at step S46, not to be moving tags through the determination as to whether the tags are acquired as confirmed moving tags (No at step S40). Then, if all the tags are confirmed to be moving tags at step S34 and acquired as confirmed moving tags (Yes at step S40), it is determined whether the radio tags marked ◇ and Δ in FIG. 13(A) each have a power difference of not more a predetermined value (6 dB) from the average of received powers (−55 dBm) of all the confirmed moving tags calculated at step S36, i.e. whether each have a power difference of not less than the second threshold (−61 dBm) (step S42). The radio tags marked Δ in FIG. 13(A), which have a power difference of not less than the second threshold (−1 dBm) (Yes at step S42), are determined to be moving tags (step S44). The radio tags marked ◇ in FIG. 13(A), which have a power difference of less than the second threshold (−61 dBm) (No at step S42), are determined not to be moving tags (step S46). Then, control returns to the main flow of FIG. 14. At step S18, if it is determined that reading has completed (Yes at step S18), the tags that have not determined to be moving tags at this stage are determined to be stationary tags (step S20), and the present process is terminated.

The radio tag reader 10 of the third embodiment extracts a plurality of target tags that are reliably ensured to be moving, based on the first threshold which has be obtained based on phase variation values varying with the travel of the radio tags. The radio tag reader 10 then calculates a second threshold using reception intensities of the plurality of extracted target tags, which change with the travel of the radio tags. Thus, the radio tag reader of the third embodiment can select radio tags that are reliably ensured to be moving, eliminating the influence of the materials or moisture absorption of the loaded packages, or influence of reflected waves. Furthermore, if it is difficult to determine moving tags based on phase variation alone, moving tags can be appropriately determined by combining reception intensities.

The radio tag reader 10 of the third embodiment uses a phase sum as a value that changes with the travel of a radio tag (phase variation). Instead of this, an average of phase variations, a median value of phase variations, a maximum value of phase variations, an average of periods during which phase variation becomes a predetermined value, (maximum value of phase variations−minimum value of phase variations)/2, and a minimum value of phase variations may be used.

Furthermore, velocity/acceleration may be used instead of phase variation. Velocity that can be used may be an average of tag velocity averages, a median value of tag velocity averages, a maximum value of tag velocity averages, a minimum value of tag velocity averages, an average of tag velocity median values, or an average of maximum tag velocities. Alternatively, velocity in terms of acceleration or a velocity unit in terms of an acceleration unit may be used. Velocity can be calculated by temporally differentiating phase change using radio tags having two frequencies. Acceleration can be obtained by calculating a gradient of velocity change. If a confirmed moving tag is determined using velocity/acceleration, a tag having a velocity of not less than a predetermined value may be determined as being a confirmed moving tag, a tag having a positive to negative sign ratio approximate to 1:1 in the acquired acceleration data in total frequency of reading acceleration may be determined as being a confirmed moving tag, or, combining these methods, a tag having a highest average velocity among tags having positive to negative sign ratio approximate to 1:1 may be determined as being a confirmed moving tag.

Furthermore, angle/distance may be used instead of phase variation. Angle can be obtained based on a known technique of configuring the antenna with two elements and using a phase difference by acquiring a distance between the antenna elements. The distance can be obtained based on a known technique of using a radio tag having two frequencies and using the two frequencies and a phase difference. Angle that can be used may be an average of tag angle variations, an average of tag angle changes of 5° or more, an average of absolute values of tag angle changes, a positive to negative sign ratio of tag angle change directions, or an average of periods during which angle variation reaches 30°. Alternatively, the angle in terms of distance, i.e. an angle unit converted to a distance unit, may be used. If a confirmed moving tag is determined using angle/distance, a tag located within a predetermined angle range ($\Delta\theta$) as shown in FIG. 12(B) may be determined as being a confirmed moving tag.

FIG. 13(B) shows tag angle relative a radio tag passing across the front of the antenna of the radio tag reader, as seen from the antenna. The horizontal axis indicates time t(s), and the vertical axis indicates angle (deg). The angle change temporarily decreases but increases again after passing across the front. Using this, a method of determining a tag whose angle sign has changed, or whose angle change has shown a predetermined pattern, such as increase of a predetermined value or more, as being a confirmed moving tag is used.

FIG. 13(C) shows distance between the antenna of the radio tag reader and a radio tag passing across the front of the antenna. The horizontal axis indicates time t(s) and the vertical axis indicates distance (cm). As shown, distance decreases once and increases again after passing the front. Using this, a tag whose distance has decreased and then increased may be determined as being a confirmed moving tag. Alternatively, a tag whose distance becomes approximate to a set value may be determined as being a confirmed moving tag. For example, a tag whose distance change is not less than a predetermined value, e.g. a tag that has traveled 50 cm or more or approached to a point within 90 cm from the antenna, may be determined as being a confirmed moving tag. Also, combining angle and distance, a tag whose angle and distance have changed with a predetermined pattern may be determined as being a confirmed moving tag.

Instead of phase variation, period (reading period) from the first reading to the last reading may be used. Reading of a radio tag is iterated as long as the radio tag is present within the reading range of the radio tag reader. Accordingly, the first reading is performed when a radio tag has traveled into the reading range and the last reading is performed immediately before the radio tag travels out of the reading range. For radio tags that are present in the reading range without moving, reading is continuously performed. Therefore, the tags for which reading is continued may be determined as not moving. If a radio tag that has once been determined to be a moving tag based on a threshold is continuously subjected to reading, this radio tag is determined not to be a moving tag.

If a reading period is used, value that can be used may be an average of periods each obtained by subtracting a sum of periods, in each of which $\Delta t$ has exceeded 100 ms, from the reading period of the tag, a proportion of a sum of periods, in each of which $\Delta t$ has exceeded 100 ms during reading of the tag, or a proportion of a sum of periods in each of which $\Delta t$ has lowered 40 ms during reading of the tag. Furthermore, value that can be used may be an average of periods of reading the tag, a value obtained by dividing frequency of the tag in which $\Delta t$ has exceeded 100 ms, by frequency of reading the tag, or an average of $\Delta t$ changes of the tag.

Furthermore, instead of phase variation, received power (received signal strength indicator (RSSI)) may be used. If RSSI is used, value that can be used may be an average of maximum tag RSSIs, an average of average tag RSSIs, an average of average −60 dBm or more tag RSSIs, or a proportion of −60 dBm or more tag RSSIs. Also, an average of tag RSSI variations, or an average of tag RSSI trajectories may be used.

First Modification of the Third Embodiment

A radio tag reader of a first modification of the third embodiment calculates an average phase sum of all the confirmed moving tags at step S36 of the process shown in FIG. 15. At step S42, the radio tag reader determines whether an undetermined tag is moving or not moving based on whether the difference between the average phase sum of all the confirmed moving tags and the phase sum of the undetermined tag is not more than a predetermined value. If the moving velocity of the undetermined tag is high, for example, the phase sum is used for the second threshold together with the first threshold to appropriately determine whether the undetermined tag is a moving tag.

Second Modification of the Third Embodiment

Figure 20:
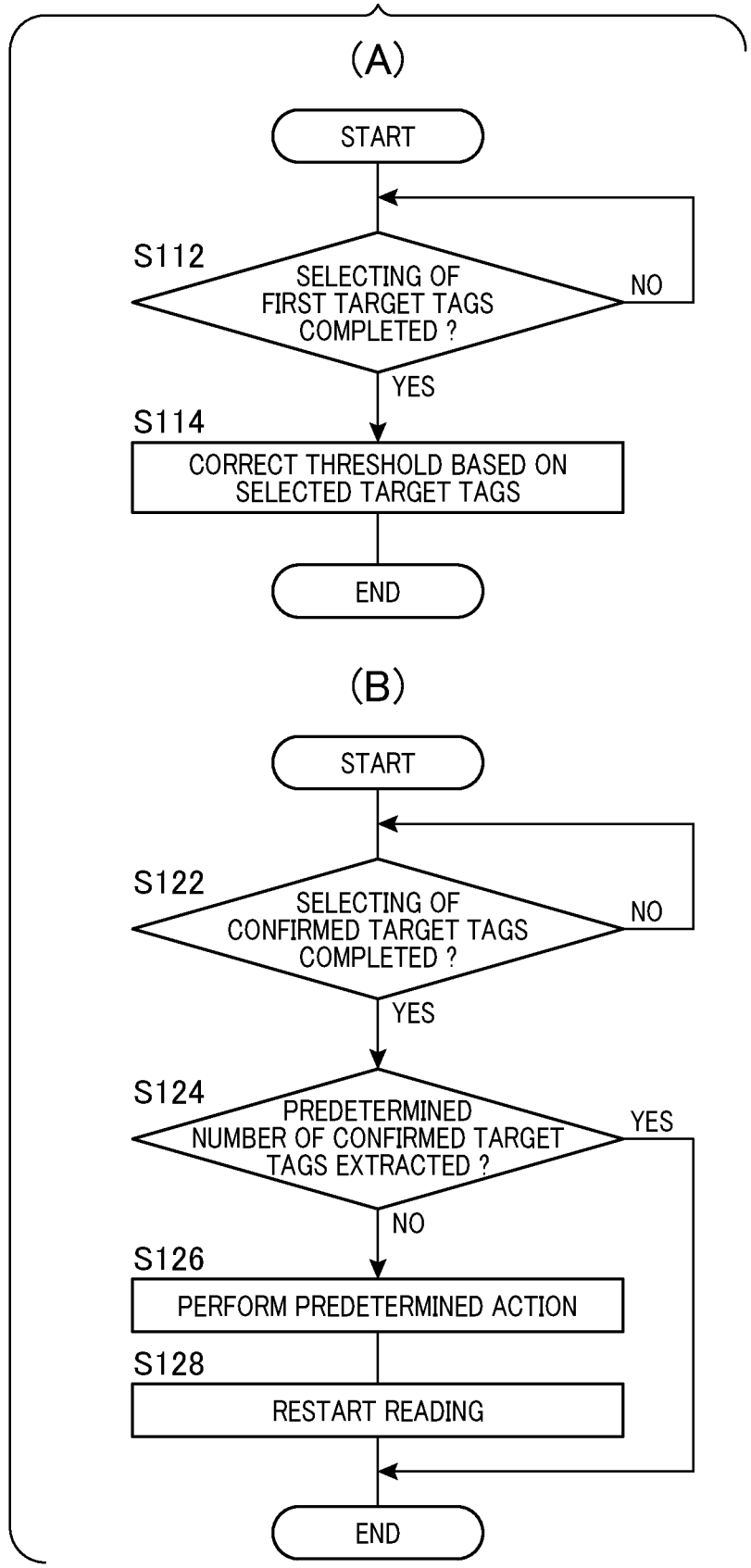

A radio tag reader of a second modification of the third embodiment corrects the first threshold based on the results of selecting in the previous cycle. This correction is made after a package P with a radio tag 30 affixed thereto has passed across the front of the radio tag reader, as shown in FIG. 12(A), being conveyed by a forklift, and data of the package P has been processed, that is, when the subsequent forklift passes, FIG. 20(A) is a flow diagram illustrating an interruption s process performed after the main flow of FIG. 14 by the radio tag reader of the second modification of the third embodiment. It is determined whether first target tags have been selected (step S112), If target tags have been selected (Yes at step S112), the first threshold is corrected based on the selected target tags (step S114). For example, the first threshold (1000 deg) for the phase sum used in the third embodiment is corrected for increase or decrease based on the selected target tags. Due to the correction, the influence of moisture or the like of the day is eliminated, and accordingly, the second and the subsequent target tags are reliably selected, Although the first threshold has been corrected herein, the second or third threshold may be corrected. The previous determination for the tags as being stationary may be diverted to the subsequent cycle, Fourth Embodiment FIG. 16(A) shows a radio tag reader 110A used for a point-of-sale (POS) register according to a fourth embodiment.

The radio tag reader 110A of the fourth embodiment performs a radio tag reading process similar to that of the third embodiment described referring to FIGS. 14 and 15. The radio tag reader 110A shown in FIG. 16(A) reads radio tags affixed to articles in a basket CS placed on a conveyor belt 112. Since the basket CS is on the conveyor belt 112, the distance from the basket CS to the antenna, not shown, of the radio tag reader varies. Therefore, the radio tag reader uses at least one of phase variation, distance variation and velocity variation during the conveyance as a basis for finding radio tags in the basket CS which can be determined to be target tags. Specifically, in a manner as performed for confirmed tags, the radio tag reader detects tags whose received power (RSSI) is varying, as being target tags.

FIG. 20(B) is a flow diagram illustrating an interruption process performed after the main flow of FIG. 14 by the radio tag reader of the fourth embodiment.

The radio tag reader determines whether confirmed target tags have been selected (step S122). If selecting of confirmed target tags has been completed (Yes at step S122), it is then determined whether a predetermined number of confirmed target tags, e.g. two radio tags, has been extracted as confirmed target tags (step S124), if a predetermined number of confirmed target tags has been extracted (Yes at step S124), the present process is terminated. If a predetermined number of confirmed target tags has not been extracted (No at step S124), a predetermined action is taken for changing phase variation, distance variation or velocity variation that has been used when selecting confirmed target tags, so that the basket CS is separated from the antenna of the radio tag reader (step S126). The predetermined action herein corresponds to reverse rotation of the conveyor belt 112 shown in FIG. 16(A). Then, reading operation is performed again (step S128).

The reversely rotatable conveyor belt 112 used for the radio tag reader 110A of the fourth embodiment can operate such that the phase variation, velocity variation or distance variation used for the first threshold is changed (step S126). Thus, the first threshold is reliably acquired. Although phase variation, distance variation or velocity variation has been changed in the radio tag reader 110A of the fourth embodiment, acceleration, angle data or reception intensity may be changed.

First Modification of the Fourth Embodiment

FIG. 16(B) shows a radio tag reader 110B used for a POS register according to a first modification of the fourth embodiment.

The radio tag reader 110B of the first modification of the fourth embodiment performs a radio tag reading process similar to that of the third embodiment described referring to FIGS. 14 and 15.

The radio tag reader 110B shown in FIG. 16(B) reads radio tags affixed to articles which are conveyed by a cart CM. Since the cart CM is conveyed by a shopper, the distance from the cart CS to the antenna, not shown, of the radio tag reader varies. Therefore, the radio tag reader uses at least one of phase variation, distance variation and velocity variation during the conveyance as a basis for finding radio tags in the cart CM which can be determined to be target tags. Specifically, in a manner as performed for confirmed tags, the radio tag reader detects tags whose received power (RSSI) is varying, as being target tags.

Fifth Embodiment

Figure 17:
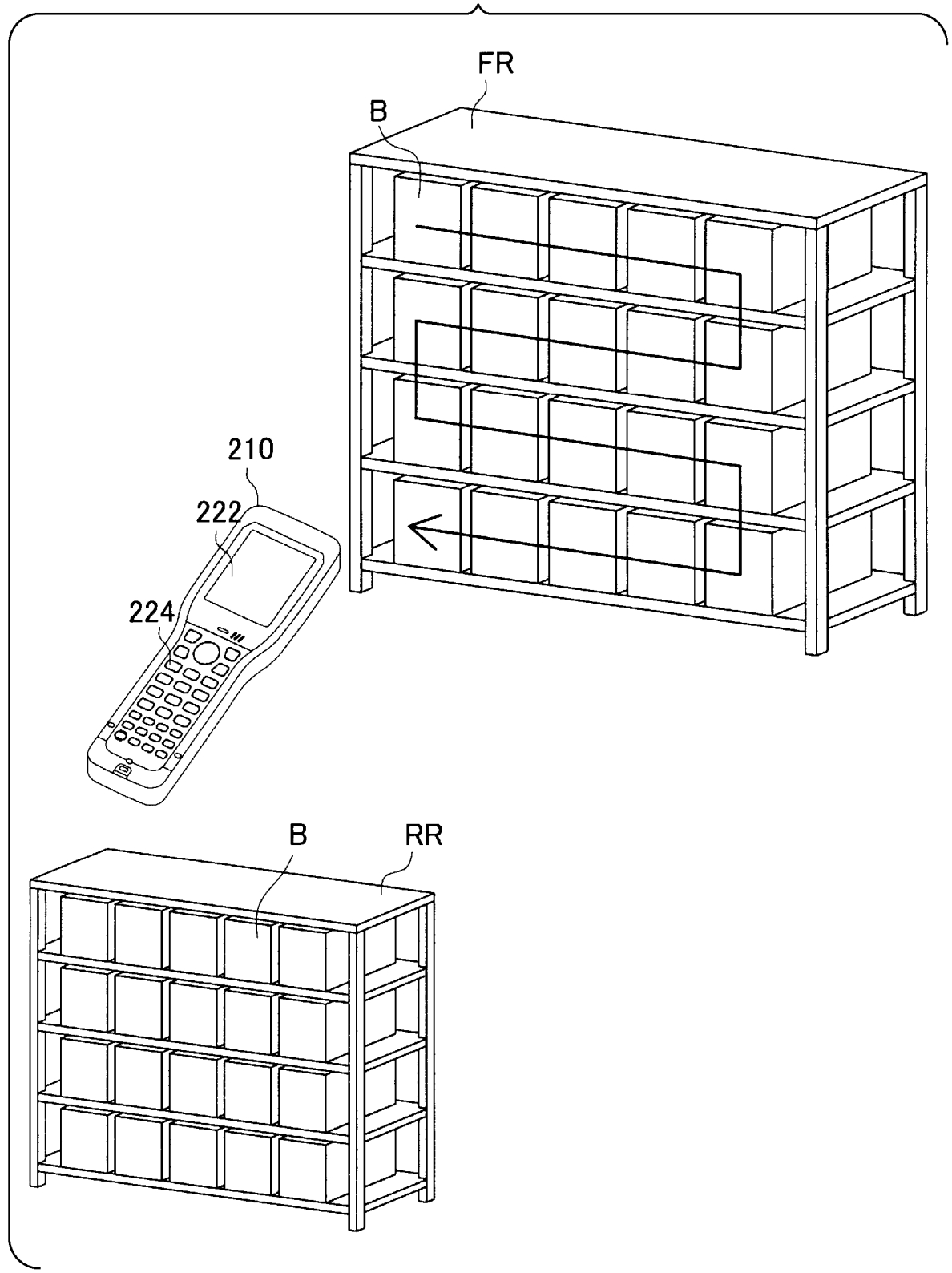
FIG. 17 is a diagram illustrating a radio tag reader according to a fifth embodiment of the present disclosure.

FIG. 17 shows a radio tag reader 210 according to a fifth embodiment.

The radio tag reader 210 of the fifth embodiment is used for inventory. In the inventory, the radio tag reader 210 reads articles B on a front shelf FR, which is in front of the tag reader, and determines articles on a rear shelf RR, if read, as being erroneously read. The radio tag reader 210 includes a display 222 and a start switch 224 that starts reading of the front shelf.

An inventory worker performs teaching along the thick line indicated on the articles B of FIG. 17 by moving the radio tag reader 210 relative to the articles B to find articles that can be reliably determined to be the articles B on the front shelf FR, based on phase variation as in the third embodiment. Then, articles whose reception intensity is in a predetermined range are determined to be the articles B on the front shelf FR.

FIG. 21(A) is a flow diagram illustrating a teaching process performed by the radio tag reader of the fifth embodiment, When the operator stands in front of the front shelf FR and operates the start switch 224 to start reading (Yes at step S132), teaching of the front shelf is prompted on the display 222 (step S134). Prompting of teaching is continued (step S134) until a target number of moving tags can be selected (No at step S136). If a target number of moving tags has been selected (Yes at step S136), stop of teaching is prompted on the display 222 (step S138).

To indicate a predetermined number of target tags as having been extracted, the radio tag reader 210 of the fifth embodiment allows the worker to perform teaching until data of necessary number of target tags are obtained.

FIG. 21(B) shows a flow diagram illustrating a confirmed target tag extraction failure process performed by the radio tag reader of the fifth embodiment.

After selecting target tags based on teaching (Yes at step S142), the radio tag reader determines whether a predetermined number of confirmed target tags have been extracted (step S144). If a predetermined number of confirmed target tags has been extracted (Yes at step S144), the present process is terminated. If a predetermined number of confirmed target tags has not been extracted (No at step S144), error is indicated accordingly on the display 222 and the radio tag reader prompts the worker to again perform teaching (step S146).

The radio tag reader of the fifth embodiment offers specific display as a result of selecting target tags. For example, if a predetermined number of target tags has not been detected, the radio tag reader of the fifth embodiment provides error display accordingly so that the worker is prompted to again perform reading of radio tags.

FIG. 22(A) is a diagram illustrating data variation in the case where the distance between target tags (front shelf) and the radio tag reader is short. FIG. 22(B) is a diagram illustrating data variation in the case where the distance between target tags (front shelf) and the radio tag reader is long.

The horizontal axes each indicate reception intensity (RSSI) and the vertical axes each indicate frequency (number of read tags). As shown in FIG. 22(A), when the distance is short, RSSI variation of the target tags is small. Specifically, RSSI values of the target tags are categorized into three types. Furthermore, variation in RSSI is small both in the target tags and erroneously read tags. Specifically, there is only a small difference in RSSI between the minimum RSSI of a target tag and the maximum RSSI of an erroneously read tag.

As shown in FIG. 22(B), when the distance is long, RSSI variation of the target tags is large. Specifically, RSSI values of the target tags are categorized into five types. Furthermore, variation in RSSI is large both in the target tags and erroneously read tags. Specifically, there is a large difference in RSSI between the minimum RSSI of a target tag and the maximum RSSI of an erroneously read tag.

If the front shelf and the rear shelf are tried to be discriminated only based on reception intensity (RSSI), it is difficult to determine a second threshold for selecting tags which fall into target tags and erroneously read tags. This is because, as described referring to FIGS. 22(A) and 22(B), variation range of RSSI or difference in RSSI between target tags and erroneously read tags may depend on the distance between the radio tag reader and the front shelf. In this regard, the radio tag reader of the fifth embodiment corrects the second threshold based on the variation range of RSSI, i.e. depending on the distance between the radio tag reader and the front shelf. Specifically, if the RSSI variation of target tags is small, the radio tag reader determines this distance to be short as shown in FIG. 22(A), and thus increases the second threshold to make it approximate to the minimum RSSI of target tags. If the RSSI variation of target tags is large, the radio tag reader determines this distance to be long as shown in FIG. 22(B), and thus decreases the second threshold to make it smaller than the minimum RSSI of target tags.

The radio tag reader 210 of the fifth embodiment performs a radio tag reading process similar to that of the third embodiment described referring to FIGS. 14 and 15.

Figure 18:
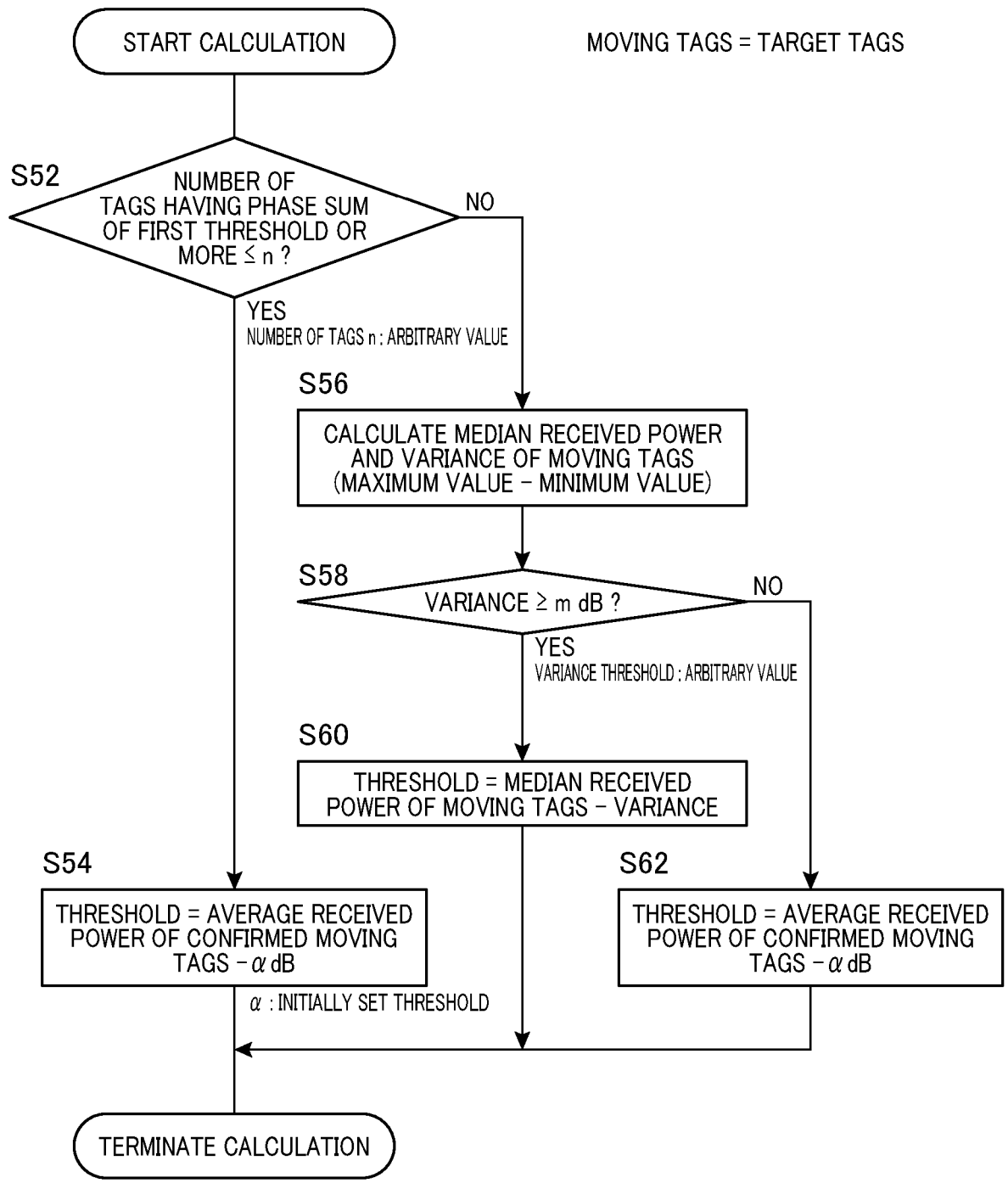
FIG. 18 is a flow diagram illustrating a sub-routine for calculating a second threshold performed by the radio tag reader according to the fifth embodiment.

However, the radio tag reader 210 is different from the third embodiment in the calculation of an average power performed at step S36 of FIG. 15 and in the determination made at step S42 as to whether the power difference is not more than a predetermined value. Specifically, in the fifth embodiment, the second threshold that has been calculated referring to data variation is corrected when calculating an average power at step S36 of FIG. 15. Then, the determination at step S42 is made based on whether the power difference is not less than the corrected second threshold. FIG. 18 is a flow diagram of a sub-routine related to the fifth embodiment, for calculating a second threshold at step S36 of the flow diagram sown in FIG. 15.

First, it is determined whether the number of tags whose phase sum exceeds the first threshold is n (e.g., 3) or more (step S52). If the number is 2 or less (Yes at step S52), data variation cannot be calculated and accordingly control proceeds to step S54. At step S54, a threshold (second threshold) is calculated by subtracting an initially set threshold α (e.g., 10 dB) from an average received power of the confirmed moving tags. Then, the sub-routine is terminated.

If the number of tags, whose phase sum exceeds the first threshold, exceeds n (e.g., 3) (Yes at step S52), a median received power and a variance (maximum value−minimum value) of the moving tags are calculated (step S56). Then, it is determined whether the variance is not less than an arbitrary value m (e.g., 3 dB), i.e. whether data variation is small (step S58). If the variance is 3 dB or more (Yes at step S58), a threshold (second threshold) is calculated by subtracting the variance from the median received power of the moving tags (step S60). Then, the sub-routine is terminated. If the variance is less than 3 dB (No at step S58), a threshold (second threshold) is calculated by subtracting an initially set threshold α (e.g., 10 dB) from an average received power of the confirmed moving tags (step S62). Then, the sub-routine is terminated.

The radio tag reader of the fifth embodiment calculates a second threshold according to the variation range of the reception intensities of the plurality of extracted target tags. Therefore, radio tags can be appropriately selected irrespective of whether the distance between a target tag and the radio tag reader is short or long, while appropriately incorporating reception intensities.

The radio tag reader of the fifth embodiment uses a median received power for a second threshold. Instead, an average or a most frequent value of maximum reception intensities of a plurality of target tags may be used as bases for calculating a second threshold. Thus, when performing inventory, the radio tag reader of the fifth embodiment can read the radio tags which are affixed to articles located on a reading-target shelf in front of the radio tag reader and have high reception intensities, and can instantly determine erroneous reading for the radio tags which are affixed to articles located on a non-reading-target rear shelf and have low reception intensities due to reflected waves.

First Modification of the Fifth Embodiment

FIG. 22(C) is a diagram illustrating the case where phase variations mostly exceed a threshold but are small. FIG. 22(D) is a to diagram illustrating the case where data of FIG. 22(C) has been replaced by received power, and illustrating skip value processing. When phase variations mostly exceed a threshold but are small as shown in FIG. 22(C), the radio tag reader according to a first modification of the fifth embodiment increases the second threshold for received power even more than in the conventional art. Thus, the skip value shown in FIG. 22(D) is determined to correspond to an erroneously read tag.

Figure 19:
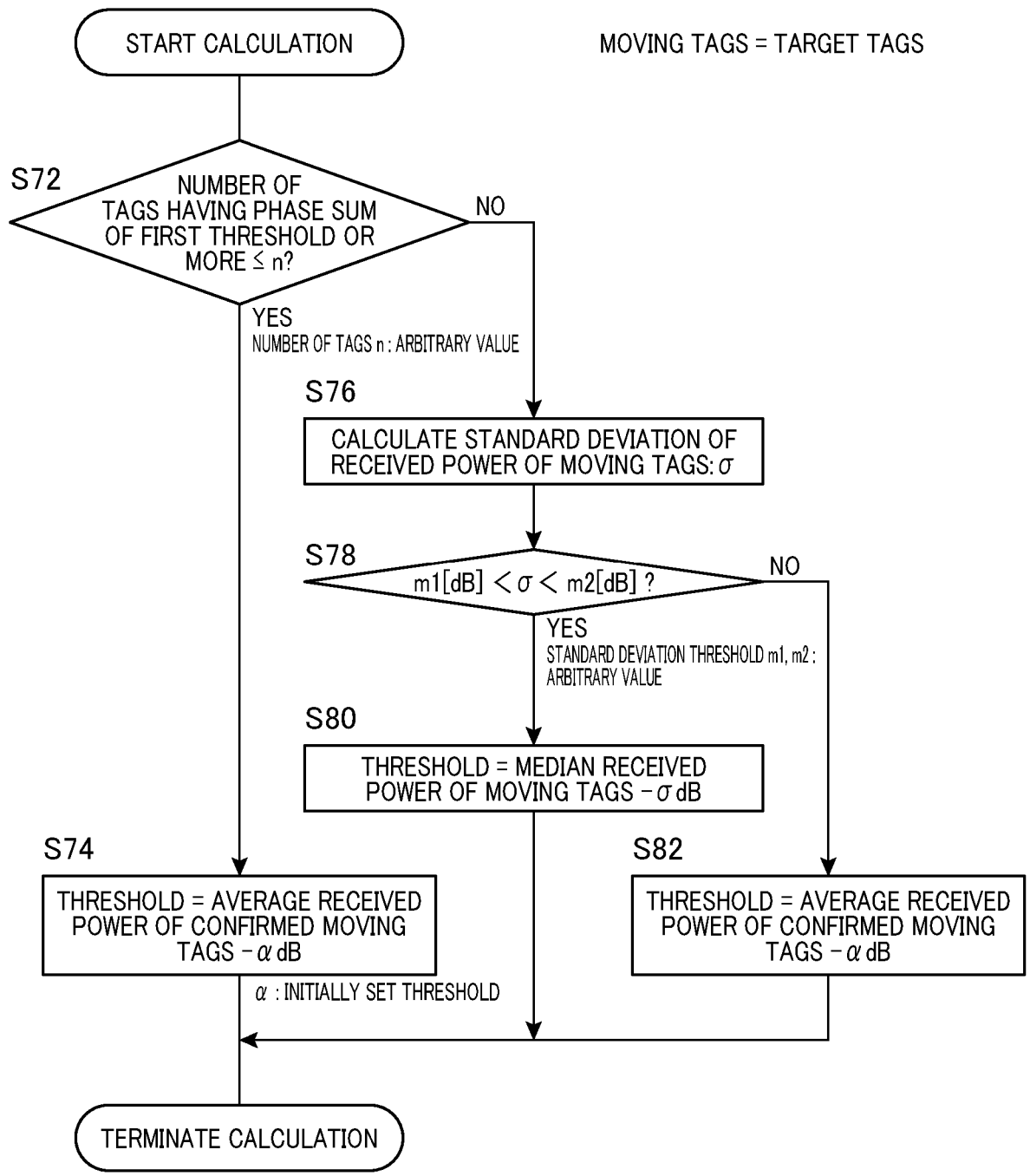
FIG. 19 is a flow diagram illustrating a sub-routine for calculating a second threshold performed by a radio tag reader according to a first modification of the fifth embodiment.

The radio tag reader 210 according to the first modification of the fifth embodiment performs a radio tag reading process similar to that of the fifth embodiment described referring to FIGS. 14 and 15. However, the radio tag reader 210 of the first modification of the fifth embodiment is different in the calculation of an average power at step S36 of FIG. 15 and in the determination made at step S42 as to whether the power difference is not more than a predetermined value. Specifically, in the first modification of the fifth embodiment, the second threshold calculated referring to data variation is corrected when calculating an average power at step S36 of FIG. 15. Then, it is determined, at step S42, whether the power difference is not less than the corrected second threshold. FIG. 19 is a flow diagram of a sub-routine related to the fifth embodiment for calculating a second threshold at step S36 of the flow diagram sown in FIG. 15, First, it is determined whether the number of tags whose phase sum exceeds the first threshold is n (e.g., 3) or more (step S72). If the number is two or less (Yes at step S72), data variation cannot be calculated and accordingly control proceeds to step S74. At step S74, a threshold (second threshold) is calculated by subtracting an initially set threshold α (e.g., 10 dB) from an average received power of the confirmed moving tags. Then, the sub-routine is terminated.

If tags, whose phase sum exceeds the first threshold, exceeds n (e.g., 3) (No at step S72), a received power standard deviation σ of the moving tags is calculated (step 76). Then, it is determined whether the received power standard deviation σ is greater than a standard deviation threshold m1 (e.g., 10 dB) and smaller than a standard deviation threshold m2 (e.g., 3 dB) (step S78). If the received power standard deviation c is more than 10 dB and less than 3 dB (Yes at step S78), a threshold (second threshold) is obtained by subtracting the received power standard deviation σ from a median received power of the moving tags. Then, the sub-routine is terminated, if the received power standard deviation σ is less than 10 dB or more than 3 dB (No at step S78), a threshold (second threshold) is obtained by subtracting an initially set threshold α (e.g., 10 dB) from an average received power of the confirmed moving tags (step S82). Then, the sub-routine is terminated.

The radio tag reader according to the first modification of the fifth embodiment calculates a second threshold according to the variation range of the reception intensities of the plurality of extracted target tags. Therefore, radio tags can be appropriately selected even when there is a skip value, while appropriately incorporating reception intensities.

The radio tag reader according to the first modification of the fifth embodiment calculates a second threshold from a received power standard deviation. Instead, there may be used an average or an average of median values or a most frequent value of reception intensities of a plurality of target tags, or a standard deviation as a basis for the calculation. Thus, when performing inventory, the radio tag reader according to the first modification of the fifth embodiment can read the radio tags which are affixed to articles located on a reading-target shelf in front of the radio tag reader and have high reception intensities, and can instantly determine erroneous reading for the radio tags which are affixed to articles located on a non-reading-target rear shelf and have low reception intensities due to reflected waves being detected.

Sixth Embodiment

A sixth embodiment will be described.

Figure 23:
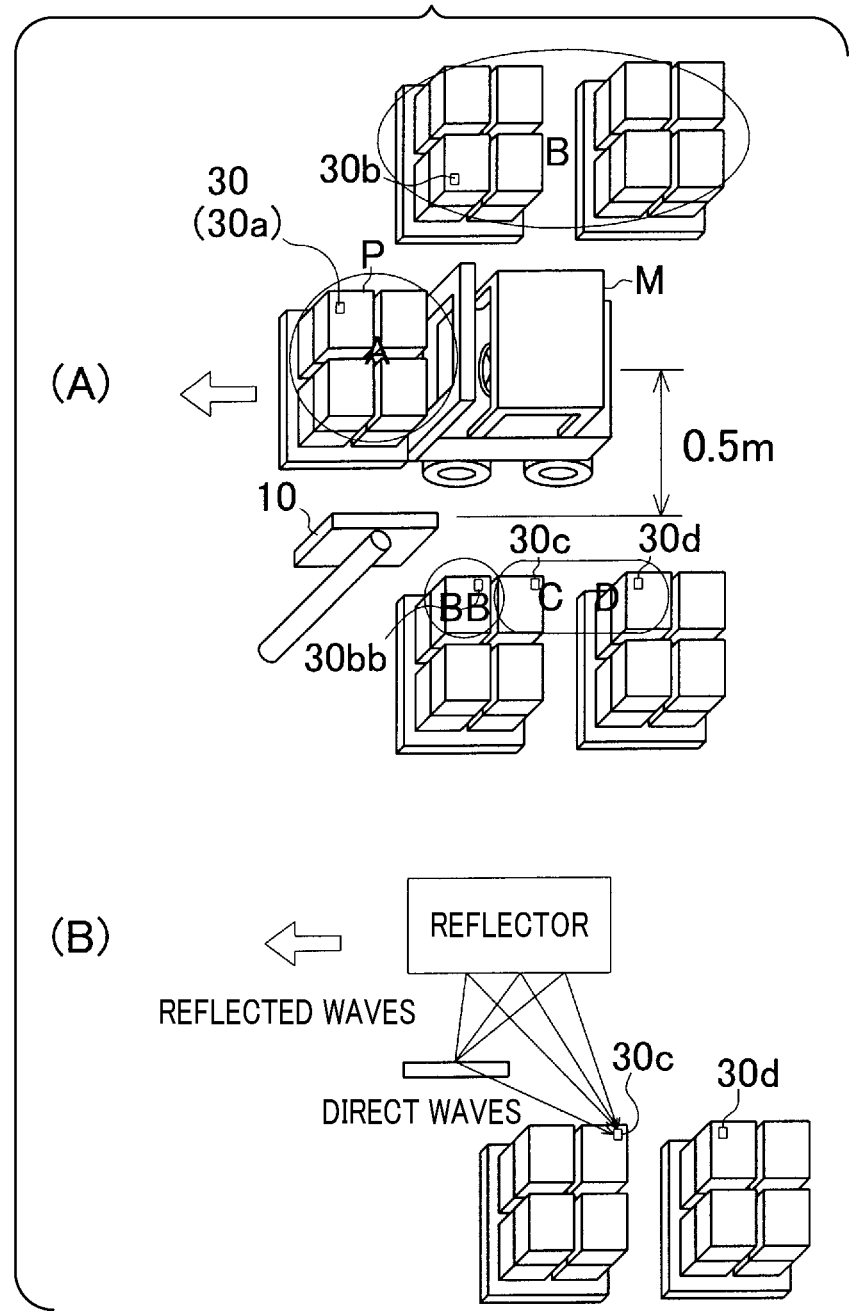

As shown in FIG. 23(A), if packages P with radio tags 30 affixed thereto are linearly conveyed by a forklift M or the like across the front of a radio tag reader 10 (antenna 14), distance to a moving radio tag 30 (also termed moving tag 30a hereinafter) as measured changes with time. Specifically, as described above, change of distance from a radio tag 30 to the antenna 14 is measured based on a measured phase sum. Based on this measurement, travel of the radio tag 30 is detected. Thus, the control unit 11 uses the phase sum as a basis for measuring change of distance from the radio tag 30 to the antenna 14, and uses the measurement of change of distance as a basis for detecting travel of the radio tag 30.

Figure 24:
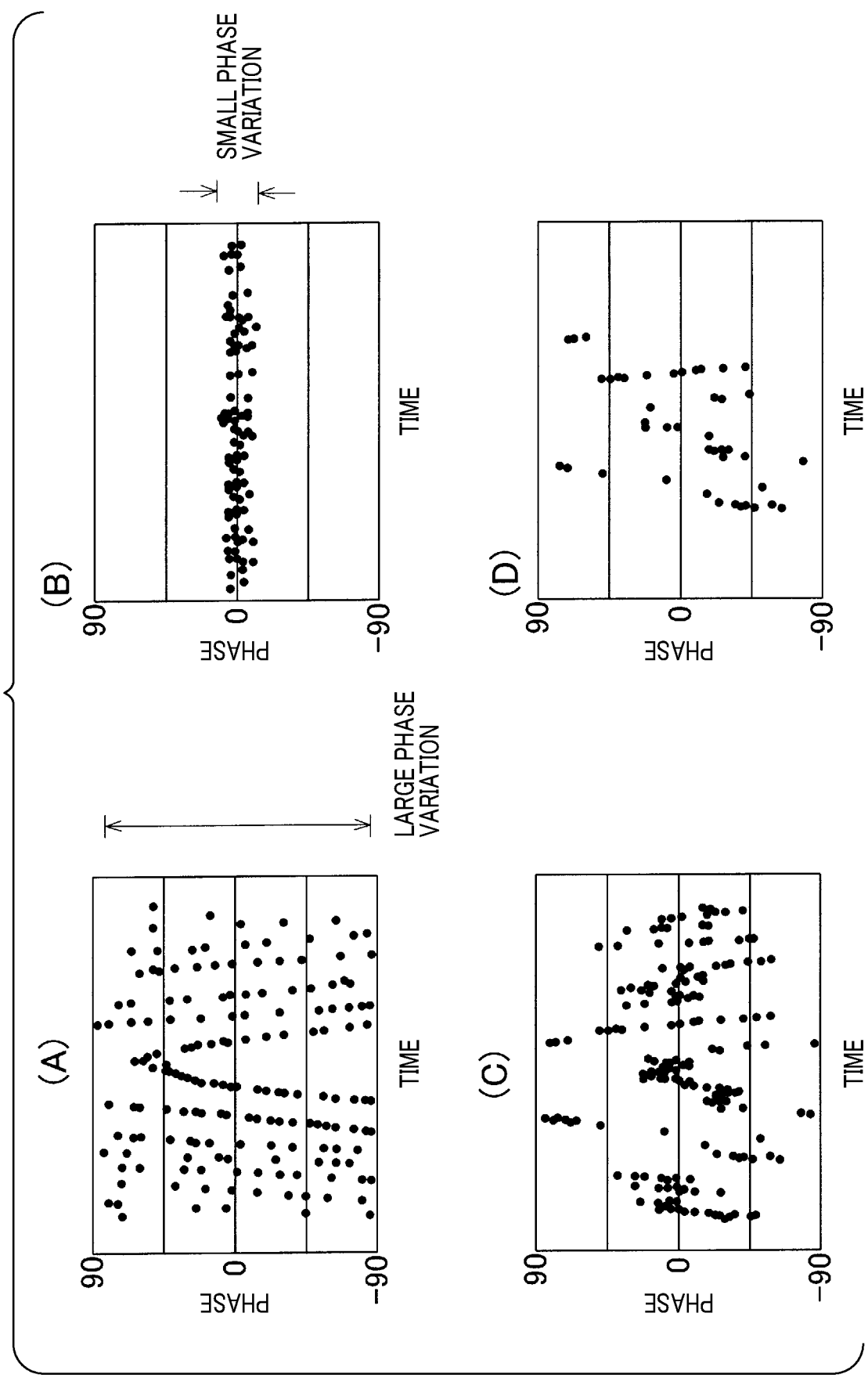

In this case, the radio tag reader 10 of the sixth embodiment uses phase change in combination with a phase sum or a phase variation, which will be described later, to determine whether a tag is moving or stationary. FIG. 24(A) is a diagram illustrating phase change of a moving tag 30a. The vertical axis indicates phase (deg) and the horizontal axis indicates time. As shown in FIG. 24(A), phase variation is great. FIG. 24(B) is a diagram illustrating phase change of a stationary tag 30b. As shown in FIG. 24(B), phase variation is small, or specifically, phase value remains unchanged because distance remains unchanged. In FIG. 23(A), a stationary tag 30b also shows a similar phase change. Thus, tags reliably ensured to be moving can be discriminated from tags reliably ensured to be stationary, FIG. 24(C) is a diagram illustrating phase change of a stationary tag 30c of FIG. 23(A). FIG. 24(D) is a diagram illustrating phase change of a stationary tag 30d of FIG. 23(A). Phase variation of the stationary tag 30c is great, while that of the stationary tag 30d is intermediate with reading being sporadic. The cause of the phase variation of the stationary tag 30c being great is that, when the moving body M such as a forklift moves across the front of the radio tag reader 10 (antenna 14), response waves from the stationary tag 30b are unavoidably received due to the influence of reflection of radio waves from the moving object M. In this case, due to travel of the moving object M, response waves from the stationary tags 30c and 30d may be measured as having phase that changes with time. This may allow measured distance to change with time and the stationary tag 30c may be erroneously detected as being moving. Furthermore, due to the influence or the like of the surrounding environment, a state where response waves from the stationary tag 30c cannot be temporarily received (null state) may occur. This state may also be a cause of erroneous detection.

FIG. 23(B) is a diagram illustrating reflected waves and direct waves from the stationary tag 30c. Waves from the stationary tag 30d are read only when the reflector (forklift) passes and thus the stationary tag 30d can be determined to be stationary. Radio waves from the stationary tag 30c are a mixture of reflected waves and direct waves and thus have a great phase variation as shown in FIG. 24(C).

Figure 25:
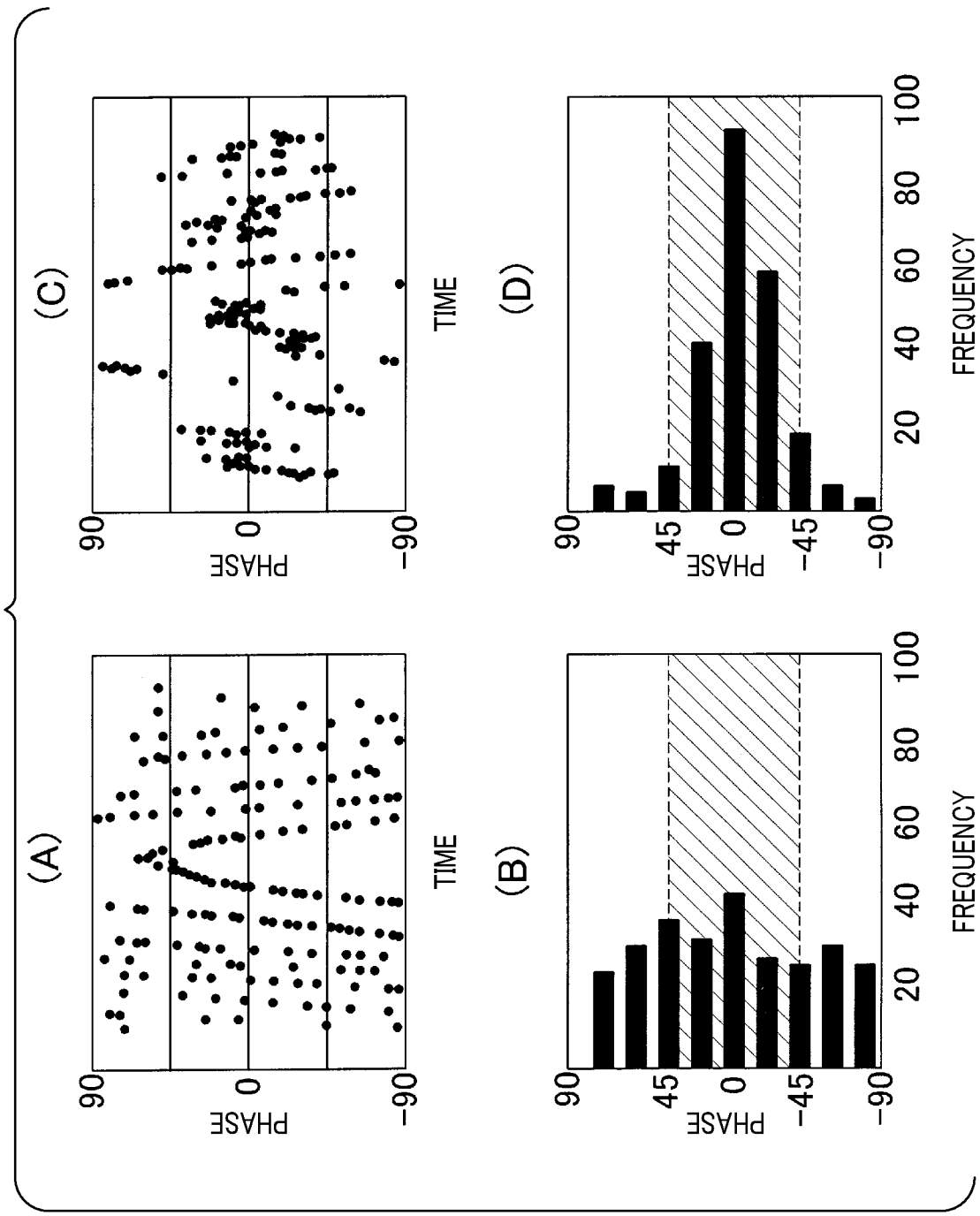

Therefore, the radio tag reader 10 of the sixth embodiment determines whether there is a bias in phase variation so that a stationary tag having a phase variation as large as that of a moving tag can be determined to be a stationary tag. FIG. 25(A) is a diagram illustrating phase change of a moving tag 30a of FIG. 23(A). FIG. 25(B) is a diagram illustrating frequency of phase θ of FIG. 25(A) in a range of −90° to +90°, with the center hatching indicating phase frequency in a range of −45° to +45°. The frequency sum in the range of −45° to +45° is 150, and the frequency sum throughout the range (−90° to +90°) is 290. Thus, phase bias is 150/290 which corresponds to 52%. In other words, the moving tag has no phase bias and indicates a value approximate to 50%.

FIG. 25(C) is a diagram illustrating phase change of a stationary tag 30c of FIG. 23(A). FIG. 25(D) is a diagram illustrating frequency of phase θ of FIG. 25(C) in a range of −90° to +90°, with the center hatching indicating phase frequency in a range of −45° to +45°. The frequency sum in the range of −45° to +45° is high and the phase bias is about 80%. In other words, the stationary tag has a great phase bias.

Referring to the flow diagrams of FIGS. 28 to 34, a selecting process for moving tags and stationary tags performed by the above radio tag reader will be described. First, with the flow diagram of a reading process shown in FIG. 28, reading is started. Radio tags are read and data of the radio tags are acquired (step S292). At this step, the radio tag reader acquires data of individual radio tags, including IDs, phases, received powers and reading times. Then, it is determined whether tag reading has been completed (step S294). Tag reading is iterated (step S292) unless tag reading is completed (No at step S294).

Figure 29:
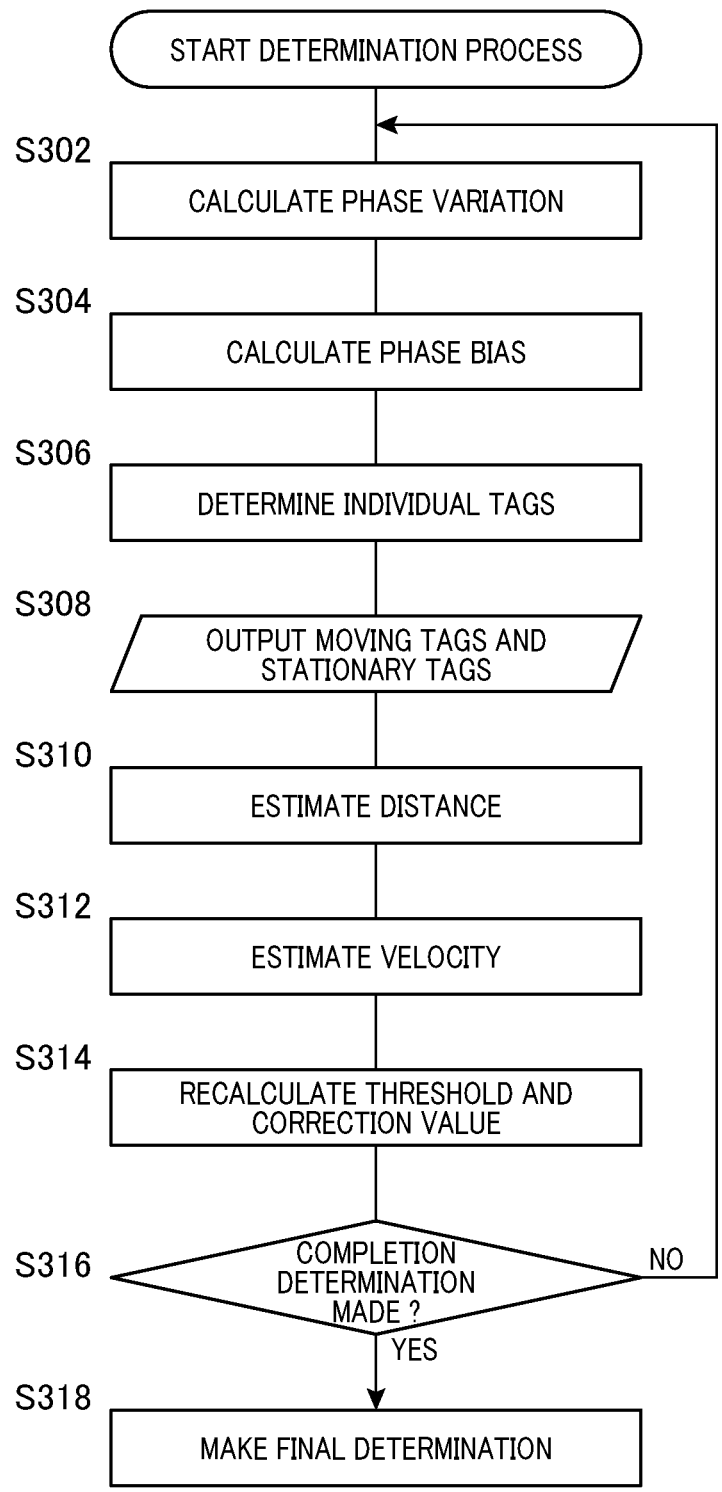
FIG. 29 is a flow diagram illustrating a determination process.

FIG. 29 is a flow diagram illustrating a determination process. At step S302 of FIG. 29, a phase variation is calculated. FIGS. 35(A) to (C) explain phase variation calculation.

I. Phase sum is recorded at every time point (see FIG. 35(A)).

II. Three inflection points (a,b,c) and an end point required for phase variation calculation are found (see FIG. 35(C)).

III. The following calculations are performed.

$$=|\text{starting point}-b| \quad (1)$$

$$=|b-a| \quad (2)$$

$$=|a-c| \quad (3)$$

$$=|c-\text{end point}| \quad (4)$$

Phase variation=(1)+(2)+(3)+(4)

Specifically, the radio tag reader of the sixth embodiment calculates a phase variation based on phase variation values between the starting point, the end point and the inflection points obtained from a graph of phase sum that is an accumulation of phase differences, FIG. 30 is a flow diagram illustrating a subroutine of the phase variation calculation process described above referring to FIG. 35.

Phase variation data are acquired and a phase variation is calculated (step S322 of FIG. 35(A)). The graph is smoothed (step S324 of FIG. 35(B)). The purpose of smoothing is to delete unnecessary inflection points due to blurring. In other words, the graph is smoothed to roughly determine inflection points. Inflection points of the graph are calculated based on the change of gradient in the phase change (step S326 of FIG. 35(C)). Phase variation values between the starting point, end point and inflection points are acquired (step S528).

$$=|\text{starting point}-b| \quad (1)$$

$$=|b-a| \quad (2)$$

$$=|a-c| \quad (3)$$

$$=|c-\text{end point}| \quad (4)$$

Phase variation=(1)+(2)+(3)+(4) is calculated (step S330).

In the summing process of step S330, phase variation values each being not less than a threshold are all summed up. The reason for excluding values of not more than the threshold is to discriminate phase variation values of not more than the threshold as having an influence of reflection. The main point of calculating a phase sum is to acquire data that the phase has continuously greatly varied. For example, the threshold may be 90 deg, 180 deg or half of a value in a phase acquirable range.

In the example shown in FIG. 35(C), in the case where $$|a-b|=40 \text{ deg} \quad (1)$$

$$|b-c|=340 \text{ deg} \quad (2)$$

$$|c-d|=500 \text{ deg} \quad (3)$$

$$|d-e|=600 \text{ deg} \quad (4)$$

$$|e-f|=250 \text{ deg}, \quad (5)$$

the value of (1) is excluded because it is not more than the threshold, and thus a phase variation is calculated as being (2)+(3)+(4)+(5)=1690 deg. As a method of acquiring a phase sum, the method described in the text of Japanese Patent Application No. 2017-489510 or disclosed in others may be used.

In the main routine shown in FIG. 29, calculation of a phase variation at step S302 is followed by calculation of a phase bias (step S304).

FIG. 31 shows a sub-routine of calculating a phase bias. For each tag, histograms of phase value θ and frequency as shown in FIGS. 25(B) and 25(D) are prepared for phase values shown in FIGS. 25(A) and 25(C) (step S340). Frequency sum (total number of phase values in the overall angle range (0-180°) for detecting phase value) is set to N (step S342). Then, phase value i is reset (step S344). Then, it is determined whether the phase value i is 90° or more (step S346).

Figure 26:
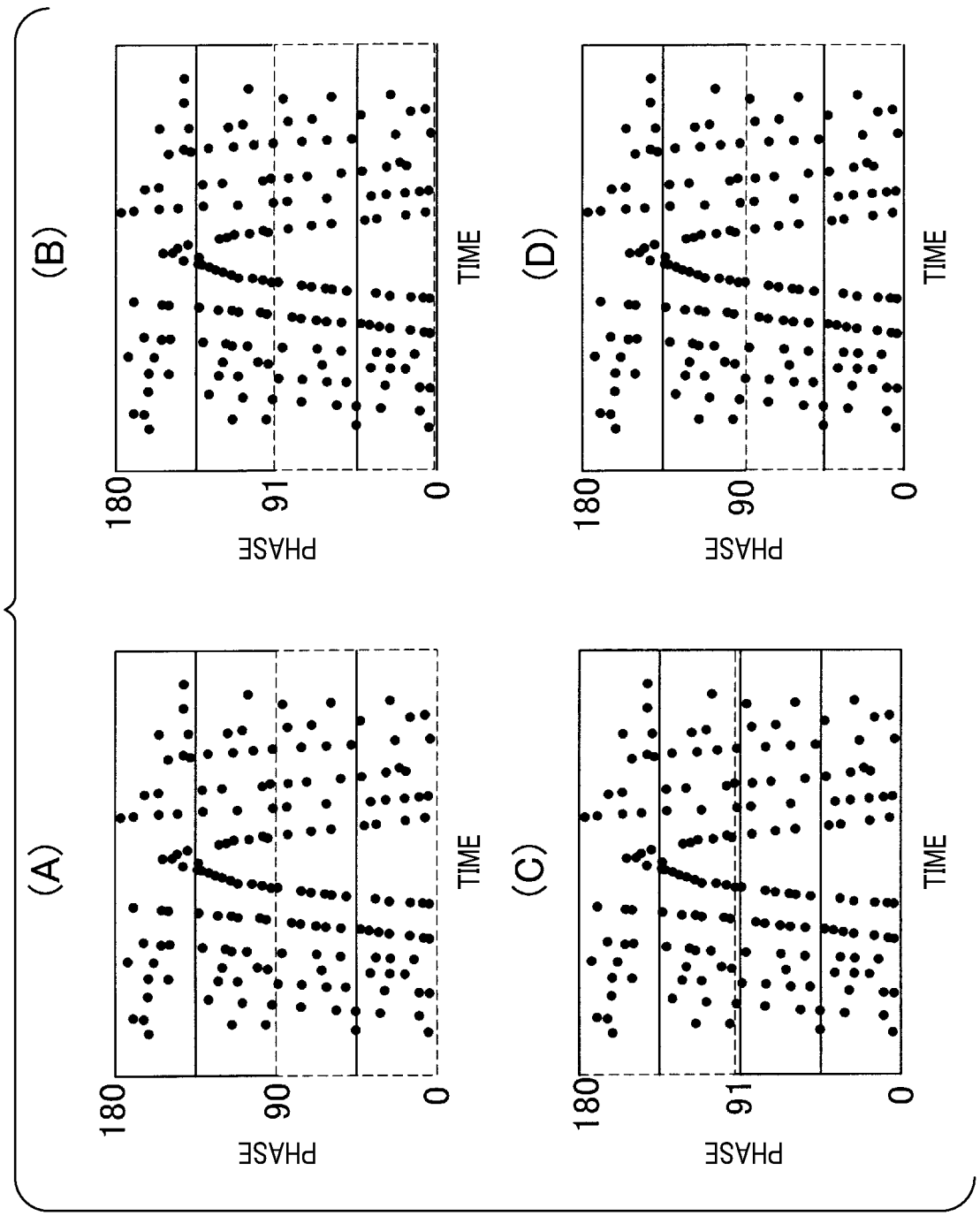

Since the phase value i is 0 (No at step S346), the frequency sum of the phase values θ satisfying i≤θ<i+90°, i.e. 0≤θ<90° herein (sum of phase values for individual angles in a predetermined angle range (90°), i.e. 0-90°), is set to ni(0) at step S348. The frequency sum in the phase range of 0° to 90° in FIG. 26(A) is set to ni(0). Then, a value 1 is added to i(0) (step S352). Then, it is determined whether calculation has been completed for i=180°, i.e. for the phases of all angles (step S354). If the determination at step S354 is No, control returns to step S346. Then, at step S348, the frequency sum of the phase values θ satisfying i≤θ<i+90°, i.e. 1°≤θ<91° herein, is set to ni(1). Frequency sum in the phase range of 1° to 91° in FIG. 26(B) is set to ni(1).

This processing is iterated up to phase 91° so that the determination at step S346 becomes Yes. Then, at step S350, frequency sum of phase values θ satisfying i≤θ<180° or 0≤θ<i−90°, i.e. 91°≤θ<180° or 0≤θ<1 herein, is set to ni(91). Frequency sum in the phases 90° to 180° and 0° to 1° shown in FIG. 25(C) is set to ni(91). When frequency sum ni(180) up to 180° shown in FIG. 26(D) has been calculated (Yes at step S354), a maximum value in ni(1) to ni(180)/N (frequency sum) is calculated as a phase bias (%). Specifically, by comparing the frequency sum (N) with a most frequent sum (ni), it is calculated whether the phase values are biased in a predetermined angle range (90°) of the most frequent sum.

In FIG. 25(B), the percentage of no phase bias of −45° to +45° in −90° to +90° is 50%. In the example shown in FIGS. 26(A) to 26(D), the percentage of no phase bias of 90° range in 0° to 180° is also 50%. In the example described above, phase bias of 90° range within 0° to 180° has been calculated. However, phase bias of 180° range (half of the overall angle range) within 0° to 360° may be preferably calculated.

In the main routine shown in FIG. 29, the phase bias calculation at step S304 is followed by individual tag determination (step S306).

FIG. 32 shows a subroutine for the individual tag determination.

Figure 36:
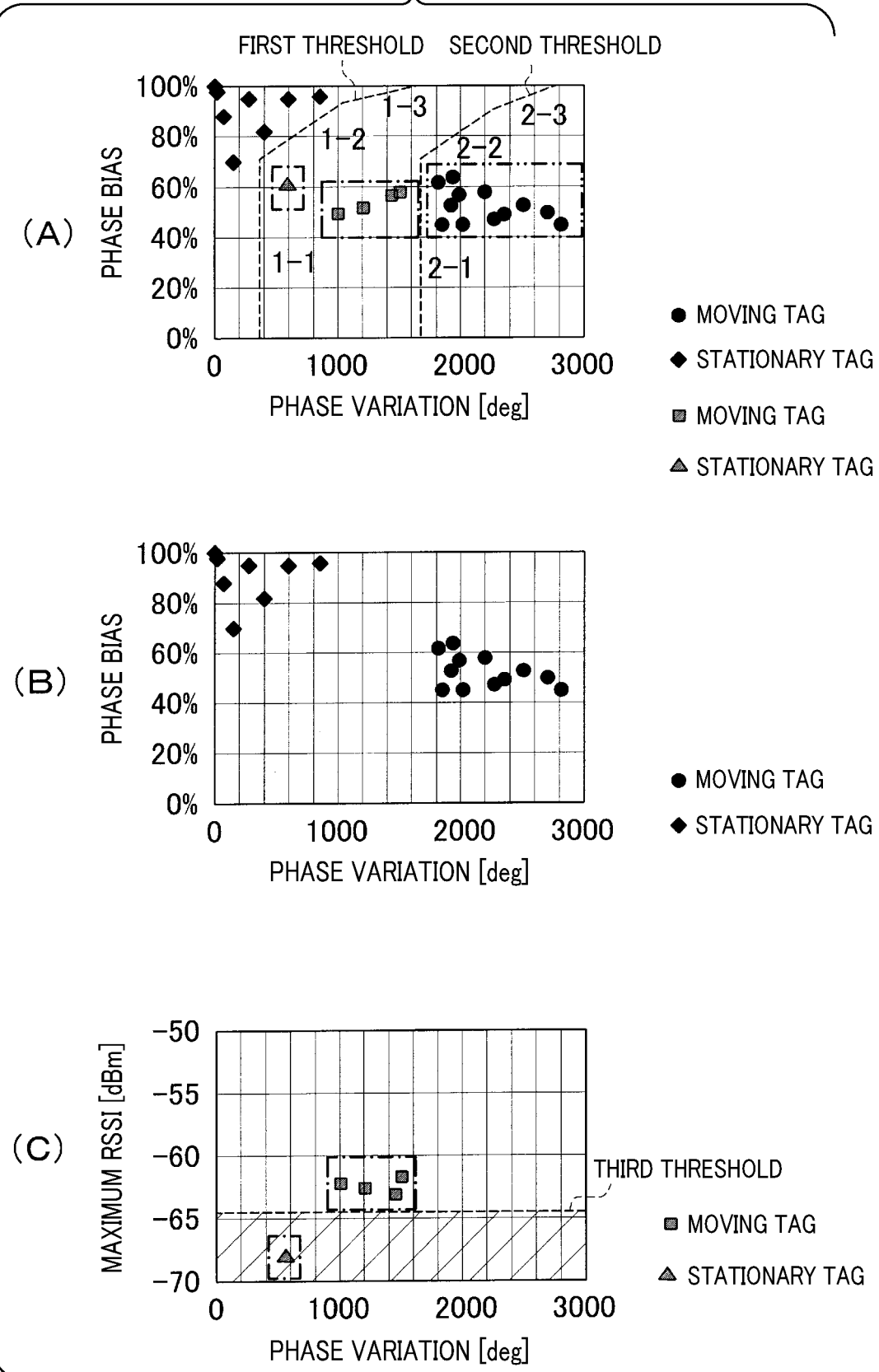

First, tag reading frequency is set to n, phase variation is set to x and phase bias is set to y (step S360). FIG. 36(A) is a table defining tags in terms of phase bias and phase variation. From phase variation and phase bias based on the first and second thresholds, tags that are reliably ensured to be stationary are discriminated from tags that are reliably ensured to be moving. It is determined whether x≥500 is satisfied (step S362). A determination indicated by 1-1 in FIG. 36(A) is made based on the first threshold. It is determined whether y−0.7<0.9−0.7/1000−500(x−500) is satisfied (step S364). A determination indicated by 1-2 in FIG. 36(A) is made based on the first threshold. It is determined whether y−0.9<1.0−0.9/1500−1000(x−1000) is satisfied (step S366). A determination indicated by 1-3 in FIG. 36(A) is made based on the first threshold. Specifically, the tags marked ♦ on the left of the first threshold in FIG. 36(A) are reliably ensured to be stationary (step S370) when an individual tag determination completion trigger or tag determination completion triggers are turned on (Yes at step S368).

The tag determination completion (turn-on of tag determination completion triggers) is determined based on the output from a sensor (line sensor or camera) indicating that the moving object (forklift) has moved to a moving end position. Alternatively, the tag determination completion is determined when the radio tag reader can no longer read tags affixed to packages P conveyed by the moving object (forklift), or after a QR code reader located at the moving end position has read a QR code (trademark) affixed to a predetermined position of the moving object, or four seconds after a reader, which is capable of reading both radio tags and QR codes, has read the QR code, or when the number of tags determined to be moving has matched the number of tags assumed to pass through the gate acquired from another system. Alternatively, the tag determination completion is determined when the number of tags assumed to pass through the gate acquired from another system has reached 80%, or after lapse of four seconds from the start of reading moving tags, or when the forklift driver has pressed a completion button, or after lapse of four seconds from the start of decrease of the phase sums of the tag that has been determined to be moving (from the start of phase cycling), or on other occasions.

The individual tag determination completion (turn-on of an individual tag determination completion trigger) is determined when the tag reading frequency has exceeded a specified value, or when the tag reading period has exceeded a specified value, or when the tag reading frequency and the phase bias have become not less than the respective specified values, or when the tag reading frequency has exceeded the specified value and the phase variation is not more than a specified percentage of the phase variation of moving tags, or when the tag reading frequency and the phase variation have become not less than the respective specified values, or on other occasions. Alternatively, the individual tag determination completion is determined when a moving tag ID is found to be different from the type of the tag in the process of being determined. For example, if three or more tags that have been determined to be moving tags by the radio tag reader have IDs starting from 33E, and if the subsequent tag has an ID starting from a number other than 33E (e.g., 34D), the tag is determined to have no probability of being a moving tag and the determination is forcibly completed, Then, at steps S380, S384 and S386, it is determined whether the tag can be reliably ensured to be a moving tag based the second threshold shown in FIG. 36(A). It is determined whether x≥1000 is satisfied (step S380). A determination indicated by 2-1 in FIG. 36(A) is made based on the second threshold. It is determined whether y−0.7<0.9−0.7/2200−1500(x−1500) is satisfied (step S384).

A determination indicated by 2-2 in FIG. 36(A) is made based on the second threshold. It is determined whether y−0.9<1.0−0.9/2800−2200(x−2200) is satisfied (step S386). A determination indicated by 2-3 in FIG. 36(A) is made based on the second threshold. Specifically, the tags marked • on the right of the second threshold in FIG. 36(A) (Yes at steps S380, S384 and S386) are reliably ensured to be moving tags (step S388). Stationary tags marked ▲ (whose phase behavior is similar to moving tags) and moving tags marked ■ (whose phase behavior is similar to stationary tags) in FIG. 36(A) for which a No determination has been made in any one of steps S380, S384 and S386 are determined to be difficult discrimination tags (step S390).

As shown in FIG. 36(B), reliably stationary tags marked ♦ are greatly away from reliably moving tags marked • and discrimination therebetween can be made promptly and reliably. In the radio tag reader 10 of the sixth embodiment, the first and second thresholds, i.e. the reference values for determining phase variation, have large values if phase bias is large (first and second thresholds have inflection points). Therefore, tags having a large phase bias and showing phase behavior similar to moving tags without relatively traveling can be reliably determined to be stationary tags. These tags are no longer erroneously determined to be moving tags.

In the main routine shown in FIG. 29, the individual tag determination at step S306 is followed by outputting of reliably stationary tags and reliably moving tags (step S308).

Then, a process of distance estimation is performed (step S310). FIG. 33(A) shows a sub-routine for distance estimation.

First, a moving tag as a target of distance determination is specified (step S512). At this step, a reliably moving tag marked • is specified shown in FIG. 36(A). Then, an average received power (RSSI) is calculated for the moving tag as a target of distance determination (step S514). It is determined whether the calculated average received power (RSSI) is higher than a predetermined value (step S516). If the average received power (RSSI) is higher than the predetermined value (Yes at step S516), the moving tag is determined to be passing near the antenna (step S518). If the moving tag is determined to be passing near the antenna, the received power from the tag will be high. Accordingly, at step S314 of FIG. 29, a third threshold described later is set to a large value. If the average received power (RSSI) is lower than the predetermined value (No at step S516), the moving tag is determined not to be passing near the antenna (step S520). If the moving tag is determined not to be passing near the antenna, the received power from the tag will be low. Accordingly, at step S314 of FIG. 29, the third threshold is corrected to a small value.

The radio tag reader of the sixth embodiment feeds back the distance of the moving tag to improve calculation accuracy. The distance estimation herein is based on a received power (RSSI). However, instead, distance may be estimated based on processing of image data captured by a camera, or based on measurement obtained from a distance sensor.

When a distance from the antenna to a moving tag is estimated, the radio tag reader of the sixth embodiment uses data of tags that have been reliably selected as moving tags. Accordingly, distance can be estimated with high reliability.

In the sixth embodiment, a distance from the antenna to a moving tag is estimated based on reception intensities of tags which have been reliably determined to be moving tags. Accordingly, distance can be estimated with high reliability.

In this regard, a distance from the antenna to a moving tag may be estimated based on the reception intensity of a tag having a maximum phase variation among the tags reliably determined to be moving tags. When a distance from the antenna to a moving tag is estimated in this manner, distance estimation can be performed with high reliability.

A distance from the antenna to a moving tag may be estimated to be an average of estimated distances of a predetermined number of tags having high-order phase variations among the tags reliably determined to be moving tags (the number of tags for calculating an average may depend on the situation, e.g. three predetermined number of tags, 20% of planned number of tags of shipment, half of tags with a value exceeding the second threshold, or the like). When a distance from the antenna to a moving tag is estimated in this manner, distance estimation can be performed with high reliability.

A distance from the antenna to a moving tag may be estimated to be an average of estimated velocities of a predetermined number of tags having high-order velocities exceeding the second threshold. When a distance from the antenna to a moving tag is estimated in this manner, distance estimation can be performed with high reliability.

Then, a process of velocity estimation is performed (step S312 of FIG. 29). FIG. 33(8) shows a sub-routine for the velocity estimation.

First, a moving tag is specified as a target of velocity determination (step S552). At this step, a moving tag marked in FIG. 36(A) that has been reliably determined to be a moving tag is specified. Then, an average tag reading period (period from recognition of a finder pattern of a target code to completion of decoding; as the moving velocity becomes lower, the tag reading period becomes longer) is calculated as an I value for the moving tag that is a target of velocity determination (step S554). It is then determined whether the calculated tag reading period is longer than a predetermined period (step S556). If the tag reading period is longer than the predetermined period (Yes at step S556), the velocity of the moving tag is determined to be low (step S558). If the velocity of the moving tag is determined to be low, a third threshold described later is corrected so as to be small at step S314 of FIG. 29. If the reading period is shorter than the predetermined period (No at step S556), the velocity of the moving tag is determined to be high (step S570). If the velocity of the moving tag is determined to be high, the third threshold is corrected so as to be large at step S314 of FIG. 29.

The radio tag reader of the sixth embodiment feeds back the velocity of the moving tag to improve calculation accuracy. The threshold herein has been adjusted according to the velocity determination. However, instead, phase variation may be corrected according to velocity. For example, if the velocity calculated by dividing an estimated phase variation by a time period is larger than an estimated velocity, the estimated phase variation may be corrected by −180° rotation or −360° rotation.

For estimating a moving velocity of a tag, sensor data or image data may be used. In this case, the sensor data may be obtained from an acceleration sensor that has been provided in advance to a moving object (forklift) or a travel path. The image data may be obtained from a device that has been provided to the antenna or provided at a position where passage of a moving object can be observed.

The radio tag reader of the sixth embodiment has used an average reading period for a reliably moving tag marked • in FIG. 36(A). However, a reading period for a tag having a maximum phase variation may be used for estimation. When moving velocity estimation for a moving tag is performed based on tag reading period data of a tag having a maximum phase variation among the reliably moving tags, moving velocity can be estimated with high accuracy.

Moving velocity of a moving tag may be estimated to be an average of estimated moving velocities of the number of tags having high-order phase variations among tags that have been reliably determined to be moving tags (the number of tags may depend on the situation, e.g. three predetermined number of tags, 20% of planned number of tags of shipment, half of tags with a value exceeding the second threshold, or the like). When moving velocity of a moving tag is estimated in this manner, moving velocity estimation can be performed with high reliability.

Moving velocity of a moving tag may be estimated to be an average of estimated velocities of a predetermined number of tags having high-order velocities of exceeding the second threshold. When moving velocity of a moving tag is estimated in this manner, moving velocity estimation can be performed with high reliability.

Subsequent to the process of recalculating a threshold and a correction value (step S314 of FIG. 29), it is determined whether a completion determination has been made (step S316). If a completion determination has been made (Yes at step S316), a final determination is made for tags which have not yet been determined to be moving or stationary (step S318).

Figure 34:
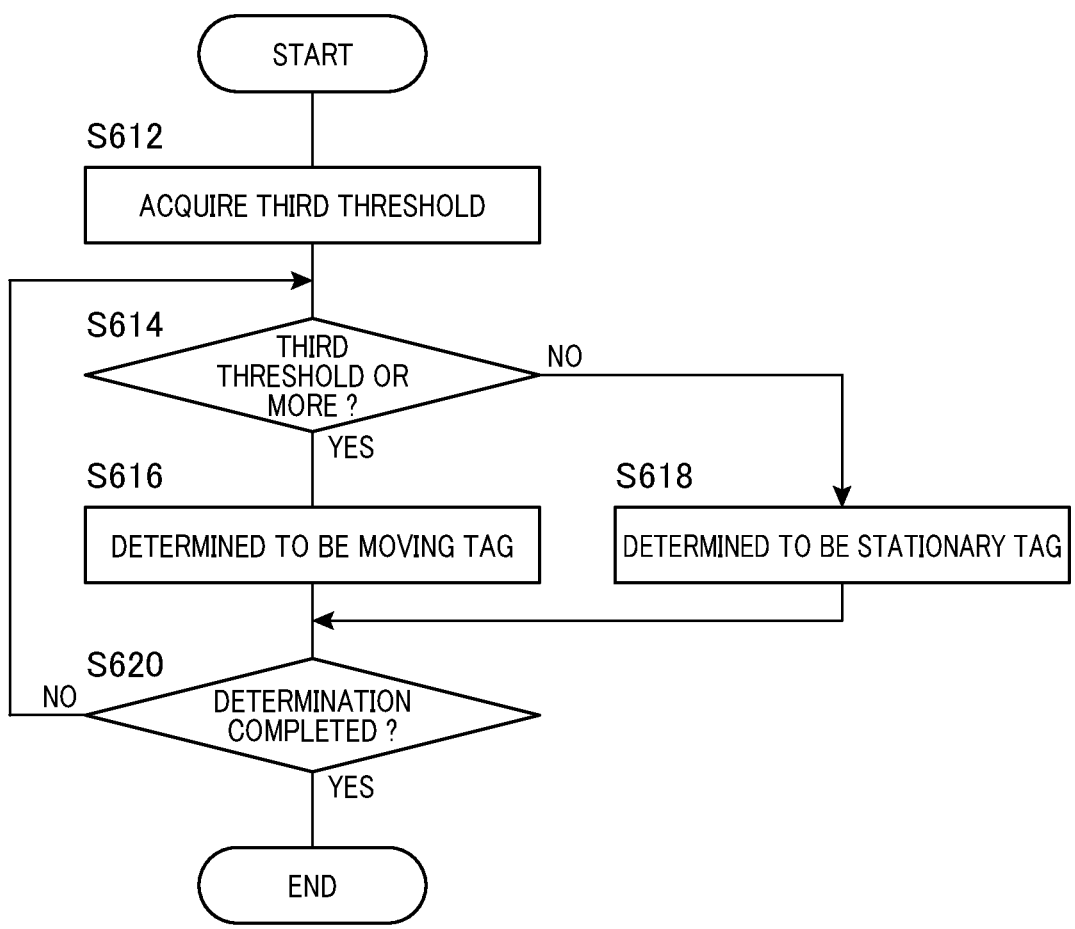
FIG. 34 is a flow diagram illustrating a sub-routine for a fin& determination process.

FIG. 34 shows a flow diagram of a sub-routine for the final determination.

A third threshold calculated at step S314 described above is acquired (step S612). For example, a value lower, by 6 db, than an average (e.g., −60 db) of received powers (RSSIs) of tags exceeding the second threshold, which have been reliably determined to be moving tags, is acquired as a third threshold. The moving tags marked ■ sandwiched between the first and second thresholds in FIG. 36(A) are each determined, as shown in FIG. 36(C), to have a value not less than the third threshold (−66 db) (Yes at step S614) and thus are selected as moving tags (step S616). The moving tag marked ▲ sandwiched between the first and second thresholds in FIG. 36(A) is determined, as shown in FIG. 36(C), to have a value less than the third threshold (−66 db) (No at step S614) and thus is selected as a stationary tag (step S618). If all the tags have been determined (Yes at step S620), the present process is terminated.

In the sixth embodiment, a third threshold has been determined based on reception intensity. However, a third threshold may be calculated using at least one of phase variation, velocity or acceleration, distance or angle data, and time from the first reading to the last reading.

The radio tag reader 10 of the sixth embodiment extracts a plurality of reliably moving target tags based on a second threshold, using phase variation and phase bias varying with the travel of the radio tag, followed by calculating a third threshold using reception intensities of the plurality of extracted target tags. Thus, the radio tag reader of the sixth embodiment can eliminate the influence of the materials or moisture absorption of the loaded packages, or influence of reflected waves to reliably select moving radio tags. Also, determination as being moving tags, which is difficult to be made based on phase variation or phase bias alone, can be appropriately made in combination with reception intensity.

The radio tag reader 10 of the sixth embodiment has used a phase sum as a value varying with the travel of the radio tag (phase variation). However, instead of a phase sum, an average phase variation, a median phase variation, a maximum phase variation, an average of periods required for respective phase variations to become a predetermined value, (maximum phase variation−minimum phase variation)/2, or a minimum phase variation may be used.

Modification of the Sixth Embodiment

Figure 27:
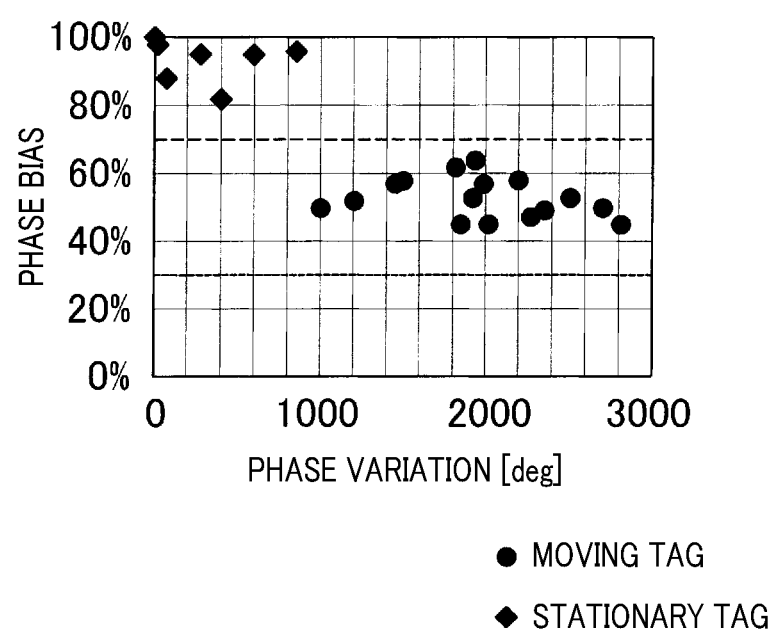
FIG. 27 is a diagram illustrating discrimination between stationary tags and moving tags according to a modification of the sixth embodiment.
Figure 28:
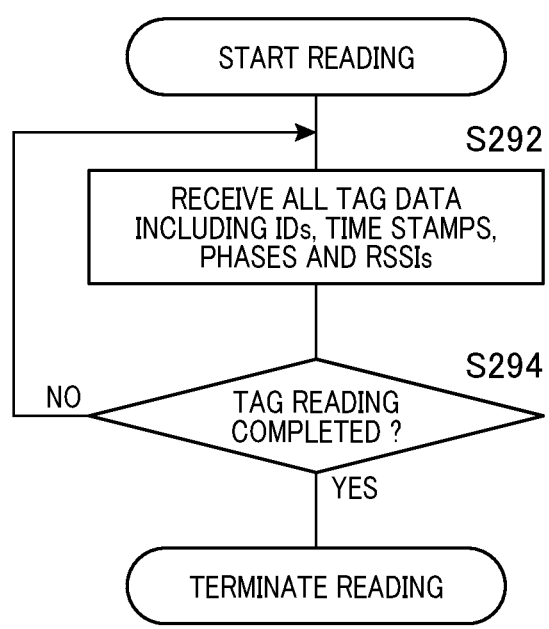
FIG. 28 is a flow diagram illustrating a reading process.

FIG. 27 is a diagram illustrating discrimination between stationary tags and moving tags according to a modification of the sixth embodiment. As shown in FIG. 27, if phase bias alone is used for discriminating stationary tags marked ♦ from moving tags marked •, the radio tag reader according to the modification of the sixth embodiment determines radio tags having phase bias of 70% or more as being stationary tags, and having phase bias of less than 70%, as being moving tags.

Seventh Embodiment

Figure 37:
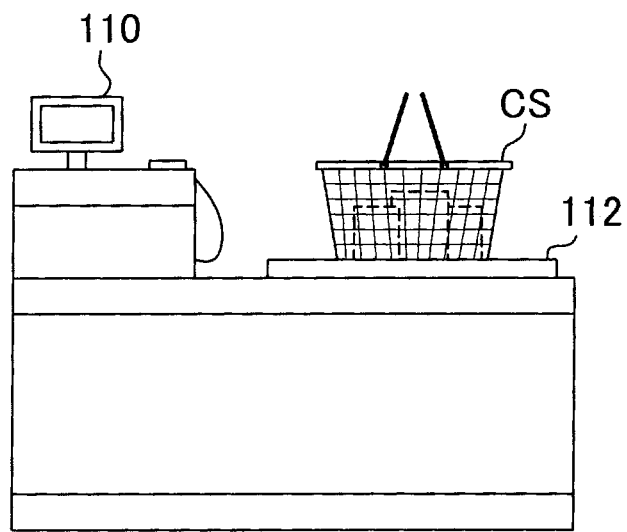
FIG. 37 is a diagram illustrating a radio tag reader according to a seventh embodiment of the present disclosure.

FIG. 37 is a diagram illustrating a radio tag reader 110 used for a POS register according to a seventh embodiment of the present disclosure.

The radio tag reader 110 reads radio tags affixed to articles is which are in a basket CS placed on a conveyor belt 112. Since the distance from the basket CS placed on the conveyor belt 112 to the antenna, not shown, of the radio tag reader varies, the radio tag reader finds radio tags that can be confirmed in the basket CS in the meantime, based on phase variation or phase bias (step S1).

Then, with the conveyor belt 112 being finely vibrated, the radio tag reader detects tags behaving similarly to the confirmed tags described above in terms of phase or received power (RSSI), as being target tags (passing tags) (step S2).

To make distinction from the adjacent register, different vibration may be used (e.g., different vibration direction or different vibration pattern). The antenna used at step S1 may be different from the antenna used at step S2, so that the process can be divided into two. Alternatively, two or more antennas may be used for one POS register.

Eighth Embodiment

An Eighth embodiment will be described.

Figure 38:
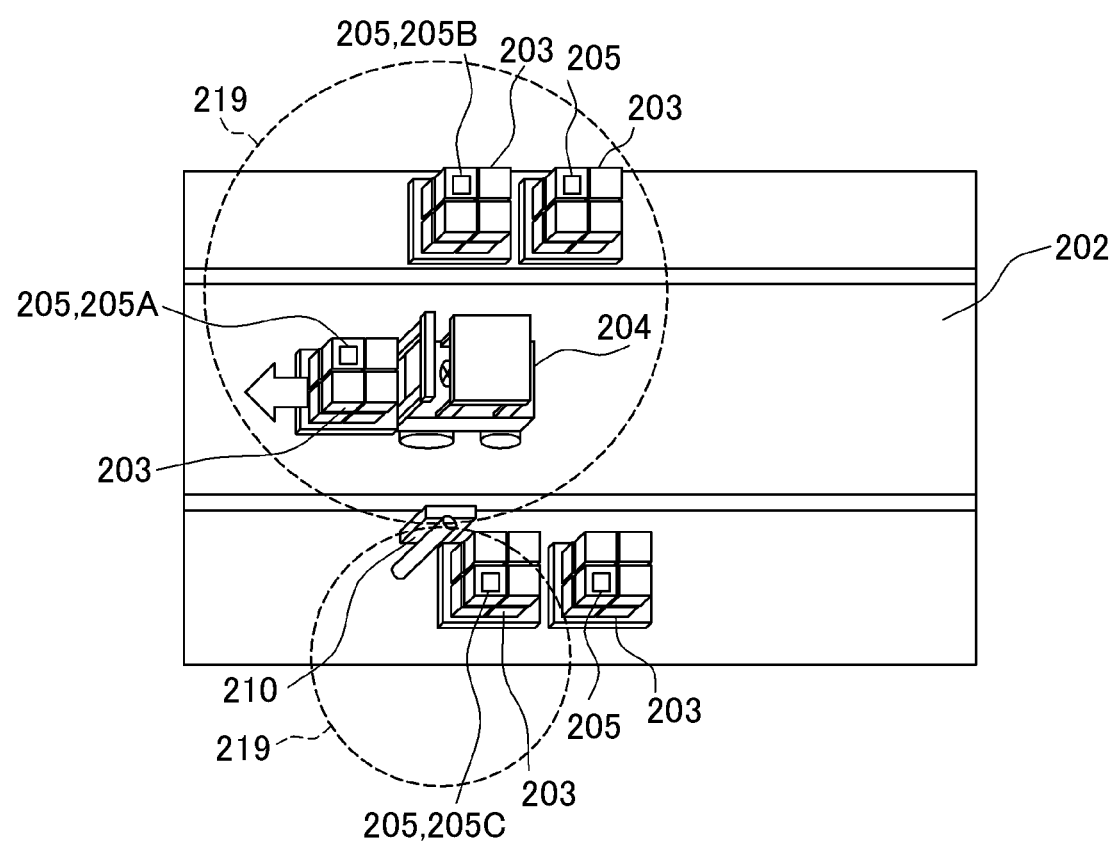
FIG. 38 is a diagram illustrating a state where a radio tag reader is used.

FIG. 38 is a diagram illustrating an example of use of a radio tag reader 210.

In the example shown in FIG. 38, the radio tag reader 210 is set up beside a lane 202 to detect passage of packages 203 through the lane 202 being conveyed by a forklift 204 or the like that is a moving body. A radio tag 205 is affixed to each package 203. The radio tag reader 210 detects that each radio tag 205, which is affixed to the package 203 conveyed by the forklift 204, is moving.

To detect a radio tag 205, the radio tag reader 210 sequentially transmit probe waves. Each radio tag 205 is of a passive type and thus is activated by receiving probe waves and transmits response waves. The radio tag reader 210 can detect a radio tag 205 when receiving response waves transmitted from the radio tag 205, Hereinafter, the radio waves transmitted from a radio tag 205 and received by the radio tag reader 210 are termed received waves.

If traveling of a radio tag 205 is detected, but the radio tag 205 can no longer be detected thereafter, the package 203 with the radio tag 205 affixed thereto can be determined to have passed through the lane 202. However, the package 203 with the radio tag 205 affixed thereto can be temporarily left beside the lane 202. The radio tag 205 affixed to the package 203 left beside the lane 202 also responds to the probe waves transmitted from the radio tag reader 210.

In this regard, the radio tag reader 210 is capable of distinguishing whether the radio tag 205 that has transmitted waves to be received is a moving radio tag 205 or a stationary radio tag 205.

Configuration of the Radio Tag Reader 210

Figure 39:
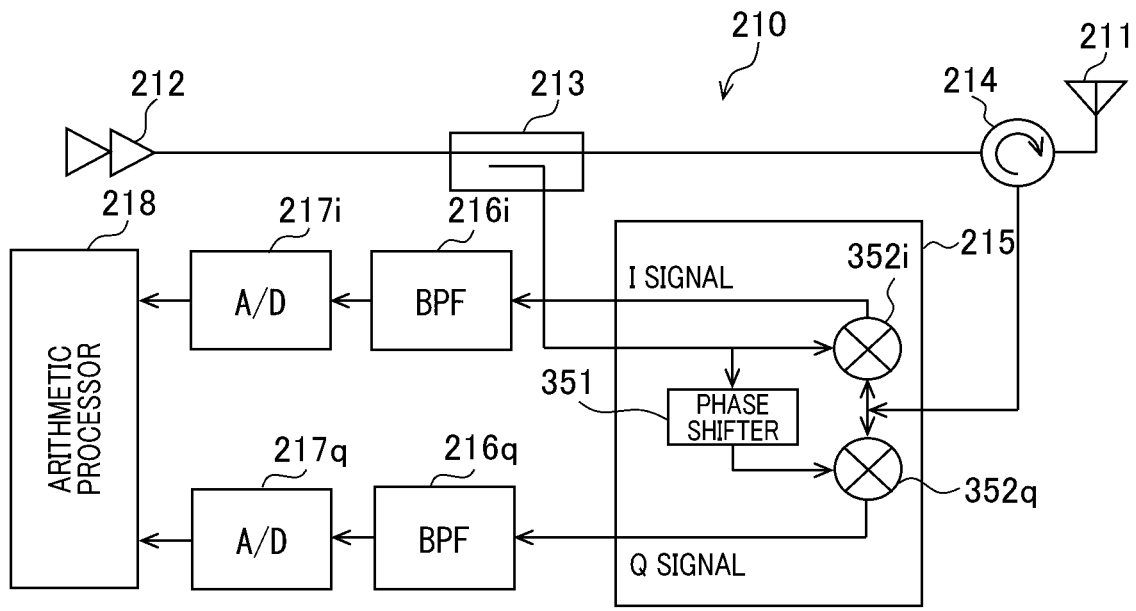
FIG. 39 is a diagram illustrating a configuration of a radio tag reader.

FIG. 39 shows a configuration of the radio tag reader 210. The radio tag reader 210 includes an antenna 211, a transmitter 212, a coupler 213, an antenna duplexer 214, a quadrature demodulator 215, bandpass filters 216$i$ and 216$q$, AD converters 217$i$ and 217$q$, and an arithmetic processor 218.

The antenna 211 used herein is one having a communication range 219 that includes an area of the lane 202 in front of the antenna 211 (see FIG. 38). However, it is difficult to use only the area of the lane 202 as the communication range 219. The communication range 219 resides in an area on the other side of the lane 202 as seen from the radio tag reader 210, or in an area beyond the lane 202 as seen from the radio tag reader 210.

The transmitter 212 generates probe signals corresponding to probe waves and transmits the signals toward radio tags. These signals are branched by the coupler 213 and supplied to the antenna duplexer 214 and the quadrature demodulator 215. The antenna duplexer 214 outputs the signals from the transmitter 212 to the antenna 211. The signals or waves received by the antenna 211 are outputted to the quadrature demodulator 215. The antenna 211 radiates probe waves into the air and receives radio waves from radio tags 205.

The waves received by the antenna 211 are inputted to the quadrature demodulator 215. The quadrature demodulator 215 includes a phase shifter 351 and two mixers 352$i$ and 3521. The phase shifter 351 receives an input of probe signals branched by the coupler 213. One mixer 352$i$ receives inputs of received signals and probe signals. When received signals and probe signals are mixed by the mixer 352$i$, I signals that are same-phase components of baseband signals are obtained. The other mixer 352$q$ receives inputs of received signals and signals that are probe signals whose phases $\phi$ have been shifted by 90 degrees by the phase shifter 351. From this mixer 352$q$, Q signals that are quadrature components of baseband signals are obtained.

The signals obtained by the mixer 352$i$ are inputted to the arithmetic processor 218 via the bandpass filter 216$i$ and the AD converter 217$i$, The signals obtained by the mixer 352$q$ are inputted to the arithmetic processor 218 via the bandpass filter 216$q$ and the AD converter 217$q$.

The arithmetic processor 218 is a computer including a CPU, a ROM and a RAM. The CPU executes programs stored in a recording medium, e.g. the ROM, while using the memory function of the RAM to thereby perform the processes shown in the flow diagrams of FIG. 40 and the subsequent figures. Performing the processes shown in FIG. 40 and the subsequent figures means that methods corresponding to the programs are performed. It should be noted that part or all of the functional blocks provided to tie arithmetic processor 218 may be realized by one or more ICs or the like (i.e. may be realized in the form of hardware). Alternatively, part or all of the functions provided to the arithmetic processor 218 may be realized by combining the CPU implementing software with hardware components.

Processing Performed by the Arithmetic Processor 218

Figure 40:
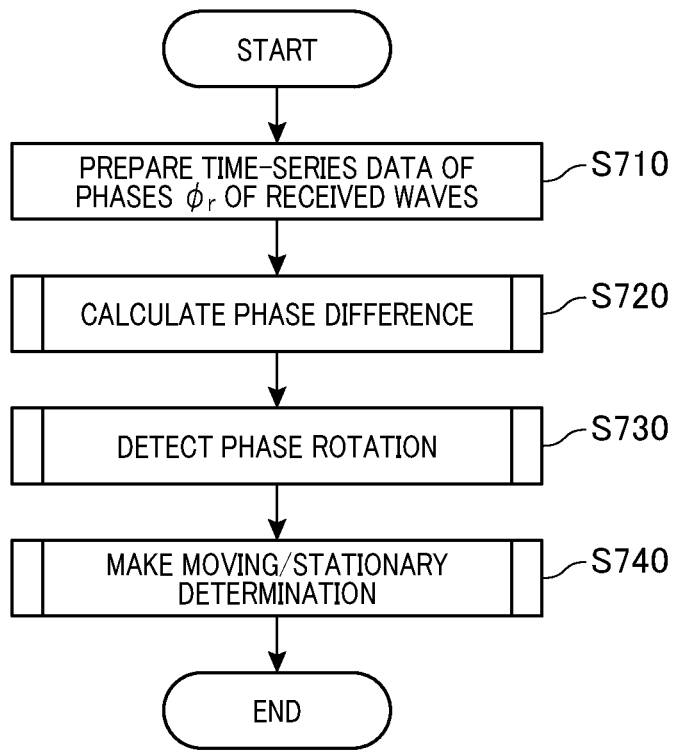
FIG. 40 is a flow diagram illustrating a process performed by a processor according to an eighth embodiment of the present disclosure.

The arithmetic processor 218 sequentially transmits probe waves to detect radio tags 205. For example, the process shown in FIG. 40 is performed every time waves are received, or every time waves are received a predetermined number of times. Reception of waves is determined by determining whether waves having a predetermined amplitude or more have been received, based on the I signal inputted from the AD converter 217$i$ and the Q signal inputted from the AD converter 217$q$.

In FIG. 40, step S710 corresponds to the phase calculation section, step S720 corresponds to the phase difference calculation section, step S730 corresponds to the phase rotation detection section, and step S740 corresponds to the moving/stationary determination section. At step S710, time-series data of phases φ of received waves are prepared. In the time-series data, phases φ of received waves are correlated to the times of acquisition of the received waves. If time-series data of phases φ of received waves have already been prepared, the already prepared time-series data are updated at step S710. Each phase φ of received waves is calculated from Formula 1. In Formula 1, AQ is an amplitude of the Q signal, and AI is an amplitude of the I signal, $$\phi = \tan^{-1}(AQ/AI) \quad \text{Formula 1}$$

In the present embodiment, phase φ is a value in the range of 0° to 180°. In other words, the phase range that can be calculated is 180°. However, calculation may be performed taking phase φ as having a value in the range of 0° to 360°.

Phase φ of the received waves calculated based on Formula 1 is correlated to the time of reception of the waves when preparing or updating the time-series data of phases φ of received waves. The an time-series data are then stored in the RAM or the like of the arithmetic processor 218.

At step S720, a phase difference Δφ is calculated. At step S730, one rotation of the phases of received waves is detected based on the phase differences Δφ calculated at step S720. The processes of steps S720 and S730 are specifically shown in FIG. 41.

Figure 41:
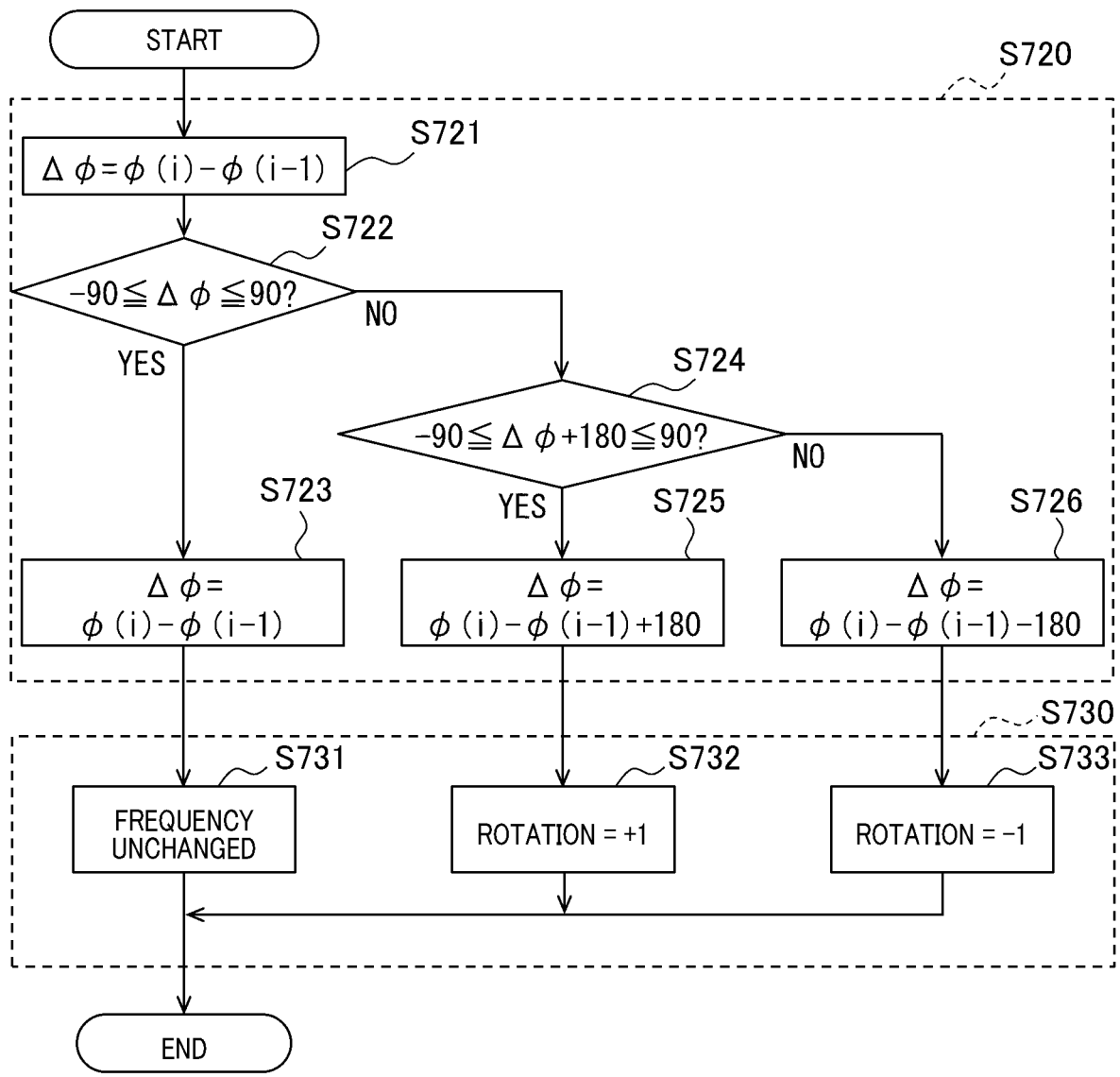
FIG. 41 is a flow diagram specifically illustrating steps S720 and S730 of FIG. 40.

At step S721 of FIG. 41, a phase difference Δφ is calculated by subtracting phase φ(i−1) of the cycle immediately preceding the latest phase φ(i) from the latest phase φ(i), referring to the time-series data prepared at step S710.

The phase difference Δφ calculated at this step S721 is used at steps S722 and S724 described below. Final phase difference Δφ is determined by performing any one of steps S723, S725 and S726. When simplified, the phase difference Δφ calculated at step S721 may be used. However, phases of received waves have a periodicity of 180°. Accordingly, a later phase φ may become smaller than an earlier phase φ. For example, phase φ of 170° at a time point may be reduced to phase φ of 10° at the subsequent time point. Therefore, simply subtracting phase φ(i−1) obtained at an earlier time point from phase φ(i) obtained at a later time point does not necessarily achieve correct calculation of a phase difference Δφ. Therefore, steps S722 to S726 are performed.

At step S722, it is determined whether the phase difference Δφ calculated at step S821 is in the range of −90° to +90°. If the determination is Yes, control proceeds to step S723. At step S723, phase difference Δφ is rendered to be unchanged from the value calculated at step S721.

If the determination at step S722 is No, control proceeds to step S724. At step S724, it is determined whether a value obtained by adding 180 to the phase difference Δφ calculated at step S721 is in the range of −90° to +90°. If the determination is Yes, control proceeds to step S725, and if No, proceeds to step S726.

At step S725, phase difference Δφ is rendered to be a value obtained by adding 180 to the phase difference Δφ calculated at step S721. At step S726, phase difference Δφ is rendered to be a value obtained by subtracting 180 from the phase difference Δφ calculated at step S721.

The determination made at step S722 has a purpose of not only correctly calculating a phase difference Δφ, but also determining whether phases φ have made one rotation. This is specifically described in the following.

Figure 43:
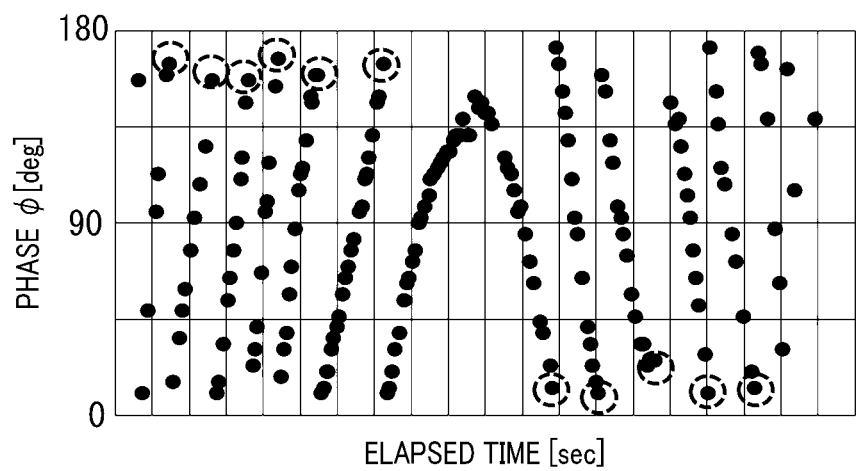
FIG. 43 is a diagram illustrating an example of change of phase ϕ of waves received from the radio tag of FIG. 38.

FIG. 43 shows change of phases φ of waves received from a radio tag 205A affixed to a package 203 which is conveyed by the forklift 204 traveling on the lane 202 in FIG. 38.

in FIG. 43, circles filled in black (black circles) indicate phases φ calculated at respective time points. Each black circle encircled by a broken line refers to an observation point from which the trend of changing phase φ up to then becomes different from the trend of changing phase φ from the subsequent time points onward.

For example, on the left in FIG. 43, the value of phase φ increases up to each black circle encircled by a broken line; however, decreases from the subsequent time point. Each point encircled by a broken line indicates that phases φ have made one rotation and can be referred to as a phase rotation point. In the present embodiment, one rotation of phases φ refers to one calculation range of phase φ. In the present embodiment, the calculation range of phase φ is 0° to 180°. Accordingly, one rotation of phases φ means that the phase φ has changed by 180° or more.

On the left in FIG. 43, phases φ encircled by broken lines are positioned in the vicinity of 160° to 170°. On the right, phases φ encircled by broken lines are positioned in the vicinity of 20° to 30°. Accordingly, in the case of FIG. 43, one rotation of phases φ means that each phase difference Δφ has an absolute value of 140° or more.

Thus, when the example shown in FIG. 43 is referred to, the values to be compared with phase difference Δφ at step S722 may be −130° and +130° rather than −90° and +90°, for determination of one rotation of phases φ.

However, if the period of transmitting probe waves is increased, or if the forklift 204 travels faster, the observation points will become sparse compared to ones shown in FIG. 43. As the observation points become sparser, the position of the radio tag 205 at the time when waves are received will be offset accordingly from the position immediately before or after one rotation of phases Thus, if the values to be compared with phase difference Δφ have large absolute values such as −130° and +130° in the determination made at step S722, rotation of phases φ is not necessarily detected.

If the value to be compared with phase difference Δφ is extremely small, phases c may be erroneously determined to have rotated, although not actually rotated. In particular, it is required to minimize erroneous determination in the case where the received waves are not the radio waves transmitted from a moving tag, but are combined waves of reflected waves and direct waves. The reflected waves in this case are the waves produced as a result of the response waves transmitted from a stationary tag being reflected by a moving object. The direct waves in this case are the response waves transmitted from the stationary tag and directly reached the radio tag reader. The erroneous determination herein refers to a determination that phases a have rotated, whereas such a determination should not be made because the tag is a stationary tag. Thus, the radio tag 205 may be erroneously determined to be moving based on the rotation of phases φ, and this erroneous phase rotation determination may lead to an erroneous determination when determining whether the radio tag 205 is moving. Thus, erroneous phase rotation determination is required to be minimized.

Figure 44:
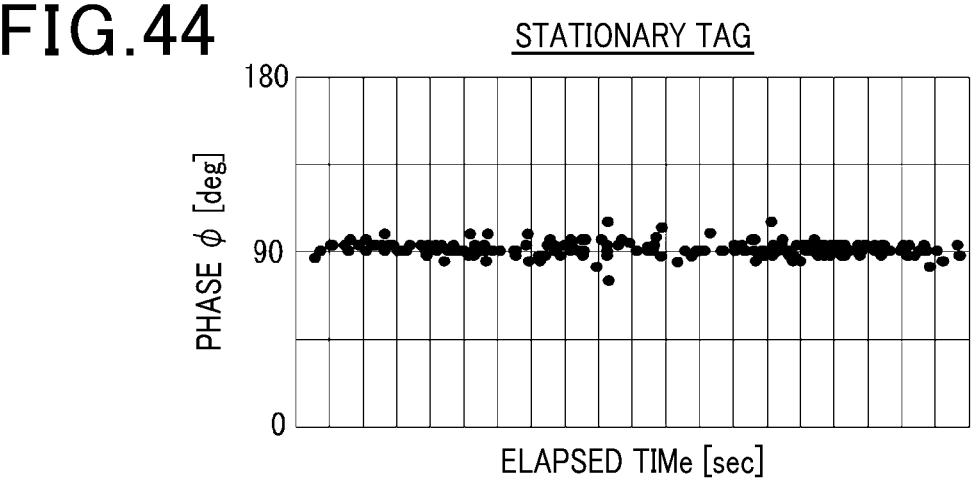
FIG. 44 is a diagram illustrating an example of change of phase of direct waves received from the radio tag of FIG. 38.
Figure 45:
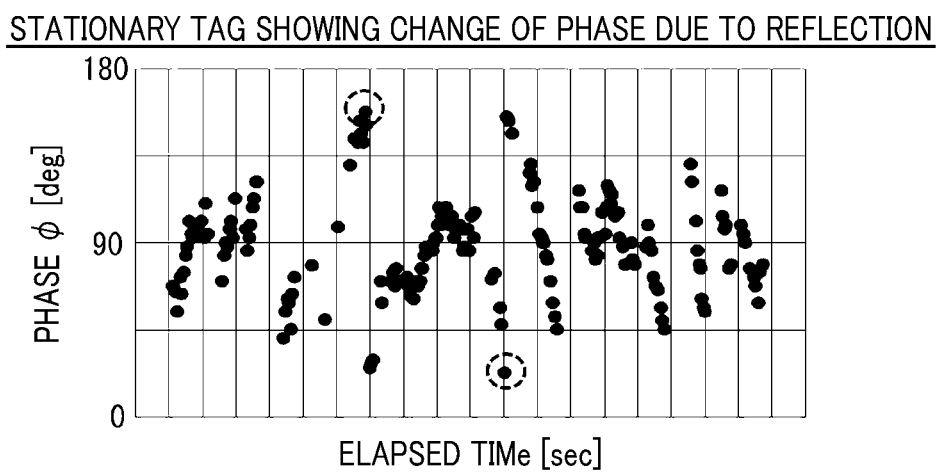
FIG. 45 is a diagram illustrating an example of change of phase ϕ of combined waves received from the radio tag of FIG. 38.

FIGS. 44 and 45 show change of phase φ of waves received from a stationary tag. FIG. 44 shows the case where the waves received from the stationary tag are only direct waves. Specifically, FIG. 44 shows the case where response waves have been transmitted from a radio tag 205 affixed to a package 203 which is located beside the radio tag reader 210 in the situation shown in FIG. 38. More specifically, FIG. 44 shows change of phase of received waves when there is no moving object, e.g. the forklift 204, which reflects the response waves, unlike in FIG. 38. In FIG. 44, phase ϕ hardly changes with time.

FIG. 45 shows the case where the received waves are combined waves of direct waves and reflected waves. In the situation shown in FIG. 38, when a radio tag 205C affixed to a package 203 which is located beside the radio tag reader 210 has transmitted response waves, the radio tag reader 210 receives not only the direct waves but also reflected waves due to passage of the forklift 204, as shown in FIG. 38, across the front of the radio tag reader 210.

Figure 46:
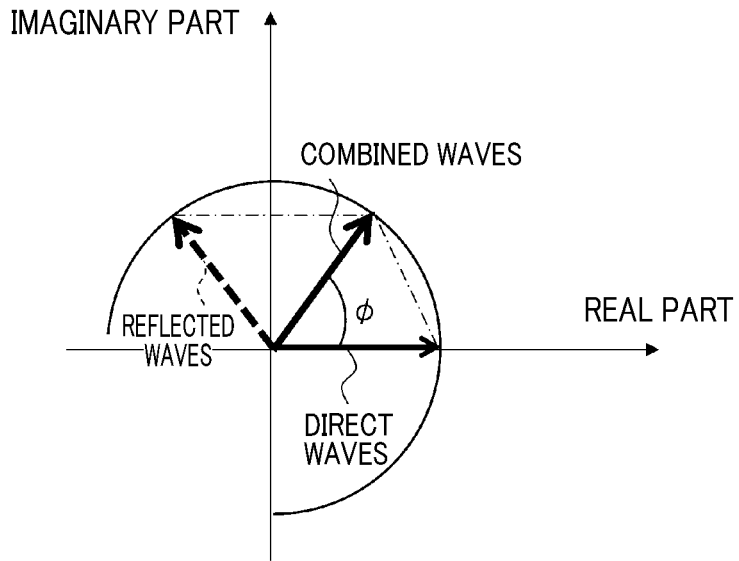
FIG. 46 is a diagram illustrating phases ϕ of combined waves.

Unlike phases ϕ of the direct waves alone shown in FIG. 44, phases ϕ of combined waves greatly vary with time. Moreover, for example, as indicated by the broken-line circles in FIG. 45, the difference from the phase ϕ at the next time point may be great. Therefore, it is required to minimize erroneous determination of a stationary tag as being moving even when the combined waves from a stationary radio tag 205 show such a phase change, Thus, the phase variation range of combined waves has been researched. FIG. 46 is a diagram illustrating phase ϕ of combined waves. As can be seen from FIG. 46, phase ϕ of combined waves, which are a combination of direct waves and reflected waves, varies relative to phase ϕ of direct waves (termed reference phase is hereinafter). It can also be seen that, as the phase ϕ of the reflected waves is offset more from the direct waves, phase of the combined waves becomes larger. However, it will also be understood from FIG. 46 that, as the phase ϕ of the reflected waves is offset more from the phase ϕ of the direct waves, the amplitude of the combined waves becomes smaller.

As shown in FIG. 44, direct waves have phases ϕ around 90°. In the phases ϕ of combined waves shown in FIG. 45, fewer phases ϕ are observed in the range of 0° to 30° or in the range of 150° to 180° where differences from 90° become larger compared to FIG. 43.

As a result, phase differences Δϕ are mostly small even when phases ϕ are rotating. In contrast, as described referring to FIG. 43, if the received waves are direct waves transmitted from a moving tag, phase differences Δϕ during phase rotation become larger. Considering this, in the present embodiment, thresholds are determined so as not to be exceeded by phase difference Δϕ when the received waves are combined waves. The thresholds may specifically be +90° and −90°.

Assuming that the amplitude of reflected waves is equal to that of direct waves and that the phase of the reflected waves is offset by 120° from the phase ϕ of the direct waves, the phase of the combined waves is offset from that of the direct waves by 60° and the amplitude of the direct waves becomes equal to that of the reflected waves. This state is shown in FIG. 46. Accordingly, assuming that the amplitude of the reflected waves is equal to that of the direct waves and that the phase ϕ of the combined waves is in the range of −60° to +60° relative to the phase ϕ of the direct waves, the amplitude of the combined waves becomes equal to or more than that of the direct waves.

However, practically, the reflected waves undergo attenuation due to having a larger path length than that of the direct waves and undergo attenuation at the time of reflection, and thus the amplitude of the reflected waves is smaller than that of the direct waves. If the amplitude of the reflected waves is smaller than that of the direct waves, the combined waves will have an even narrower phase range where the amplitude of the combined waves becomes equal to or more than that of the direct waves. For example, it will be sufficient to consider that the amplitude of the combined waves becomes equal to or more than that of the direct waves, in the range of −45° to +45° relative to the phase j of the direct waves.

In addition, if the phases ϕ of the combined waves have made one rotation, two thresholds do not have to be determined, at step S722, such that phase differences Δϕ each always have a value in the range defined by the two thresholds. If the phases ϕ of the combined waves have made one rotation, phase differences Δϕ each only have to have a value mostly in the range defined by the two thresholds. If the range defined by the two thresholds used at step S722 is excessively large, and if the received waves are direct waves from a moving tag and the phases ϕ have made one rotation, phase differences Δϕ may each also mostly have a value in the range defined by the two thresholds. Considering these, in the present embodiment, the thresholds at step S722 are set to −90° and +90°.

As described above, if the determination at step S722 is Yes, phases ϕ may be determined not to have rotated. Thus, if the determination at step S722 is Yes, phase frequency is rendered to be unchanged at step S731.

If the determination at step S722 is No, phases ϕ may be determined to have made one rotation toward plus side or minus side. If the determination at step S724 is Yes, control proceeds to step S725 and then to step S732 where phase frequency is incremented by 1. If the determination at step S724 is No, control proceeds to step S726 and then to step S733 where phase frequency is decremented by 1.

Referring back to FIG. 40, step S730 is followed by step S740 where a moving/stationary determination process is performed. The process of step S740 is specifically shown in FIG. 42.

Figure 42:
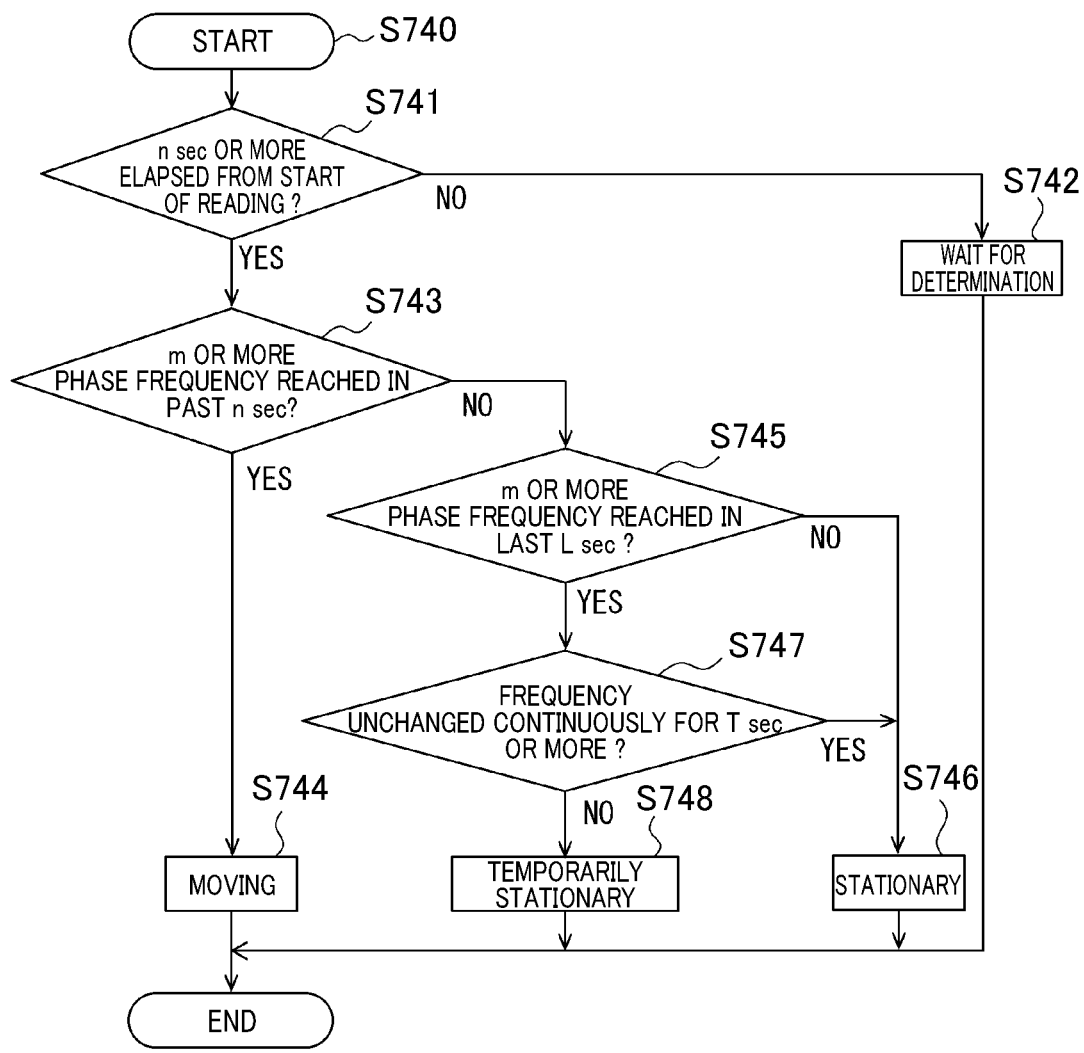
FIG. 42 is a flow diagram specifically illustrating step S740 of FIG. 40.

At step S741 of FIG. 42, it is determined whether n seconds or more, which is a moving/stationary determination period, have elapsed from the point when reading of radio tags 205 has been enabled. The n seconds may, for example, be 4 seconds which are appropriately determined based on the moving velocity of the radio tag 205, the size of the area where the radio tag reader 210 performs reading, and the transmission frequency of the probe signals, so that accurate determination can be made as to whether the radio tag 205 is moving.

If the determination at step S741 is No, control proceeds to step S742 to wait for a determination. If the determination at step S741 is Yes, control proceeds to step S743 where it is determined whether the rotation frequency has reached m or more in the past n seconds. The value m is determined based on experiments. Specifically, the value m is determined such that rotation frequency hardly exceeds m if the received waves are combined waves from a stationary tag, and easily exceeds m if the received waves are direct waves from a moving tag. If the determination at step S743 is Yes, control proceeds to step S744 where the radio tag 205 is determined to be moving.

If the determination at step S743 is No, control proceeds to step S745 where it is determined whether rotation frequency has become m or more in the past L seconds. The L seconds corresponds to a moving/stationary history determination period. Specifically, at step S745, it is determined whether the radio tag 205, for which waves have been received, has been stationary from the beginning or whether it has become stationary after being conveyed. Accordingly, the L seconds may be set to a sufficiently long time, but are set to 8 seconds herein.

If the determination at step S745 is No, control proceeds to step S746 where the radio tag 205 is determined to be stationary. If the determination at step S745 is Yes, control proceeds to step S747 where it is determined whether rotation frequency has been continuously unchanged for T seconds or more. Specifically, it is determined, at step S747, whether the stationary state is temporary. The T seconds are set to be shorter than the n seconds. For example, the T seconds may be set to 2 seconds.

If the determination at step S747 is Yes, control proceeds to step S746 where the radio tag 205 is determined to be stationary. If the determination at step S747 is No, control proceeds to step S748 where the radio tag 205 is determined to be temporarily stationary.

Specific Examples 1

The table of FIG. 47 shows specific examples of radio tags 205A, 205B and 205C in terms of phase frequency and moving/stationary determination. The radio tags 205A, 205B and 205C are ones shown in FIG. 38. The radio tag 205A is affixed to a package 203 which is being conveyed by the forklift 204. The radio tag 205B is affixed to a package 203 which is on the opposite side of the radio tag reader 210 via the lane 202. The radio tag 205C is affixed to a package 203 which is located beside the radio tag reader 210. In the examples of FIG. 47, n=4 and m=4, and transmission frequency of probe waves is set to a value sufficiently shorter than 1 second.

First, the radio tag 205A of FIG. 47 will be described. After lapse of 1 second from a time point of 0 seconds as a reference point, the radio tag 205A has been determined Yes twice at step S722. In the table of FIG. 47, this is indicated by numeral 2 of phase frequency in a cell that is in the column of radio tag 205A and the row of 1 second. In the cell below this cell of phase frequency, a total of phase frequency in the past 4 seconds is indicated. Hereinafter, a total of phase frequency is termed total phase frequency.

At the 1-second point, total phase frequency of the past 4 seconds is equal to the phase frequency 2 during this 1 second period because no phase rotation has been detected earlier. Since only 1 second has elapsed, the determination at step S741 is No. As a result, control waits for a determination at step S742.

At the 2-second point, total phase frequency of the past 4 seconds is 4 because the phase frequency during the subsequent 1 second period has also been 2. However, since 4 seconds have not yet elapsed since the start of receiving waves from the radio tag 205A, control again waits for a determination at step S742.

At the 3-second point, total phase frequency of the past 4 seconds is 5 because the phase frequency during the subsequent 1 second period since lapse of 2 seconds has been 1. The reason why phase frequency at the 3-second point is lower than in the past 2 seconds is that, when the radio tag 205A passes across the front of the radio tag reader 210, there is a time zone when phase rotation cannot be detected based on change of phase difference $\Delta\phi$, as shown in FIG. 43 at the center. At the 3-second point as well, control waits for a determination at step S742.

At the 4-second point, total phase frequency of the past 4 seconds is 6 because the phase frequency at the 4-second point has been −1. Although the phase frequency has a negative value, total phase frequency has increased since the point of 3 seconds because total phase frequency is obtained by increments of an absolute value. With lapse of 4 seconds, the determination at step S741 becomes Yes, and then control proceeds to step S743. Since the total phase frequency of the past 4 seconds is 4 or more, the radio tag 205A is determined to be moving.

At the 5-second point, total phase frequency of the past 4 seconds is 6 because phase frequency at 5-second point has been −2. At the 6-second point, total phase frequency of the past 4 seconds is 6 because phase frequency at the 6-second point has been −2. At the 5- and 6-second points, the radio tag 205A is determined to be moving because the total phase frequency of the past 4 seconds is 4 or more.

The radio tag 205B will be described. Since the radio tag 205B is a stationary tag, no phase rotation is detected at any time point. Consequently, the total phase frequency of the past 4 seconds is 0 at any time point. Thus, control waits for a determination for the radio tag 205B, or the radio tag 205B is determined to be stationary.

The radio tag 205C will be described. The radio tag 205C is also a stationary tag. However, phase rotation is detected once at both 3 and 4-second points. This is because the forklift 204 has passed near the front of the radio tag reader 210 from the point of 3 seconds to the point of 4 seconds and this passage has resulted in producing combined waves of the reflected waves reflected by the forklift 204 and direct waves.

However, as described above, if the received waves are combined waves, there is a limitation in detecting phase rotation on the basis of the phase differences $\Delta\phi$. Accordingly, although phase rotation may be detected, the number of times of detection is low, Thus, at the 4-second point, phase frequency in the past 4 seconds is 2 at the most. Therefore, the determination at step S743 will not be Yes. Consequently, the radio tag 205C is determined to be stationary is at the 4-second point.

The phase frequencies at the 5- and 6-second points both return to 0. This is because the forklift 204 has gone and is no longer present near the radio tag reader 210. Accordingly, the total phase frequencies of the past 4 seconds at the 5- and 6-second points both remain to be 2, and thus the radio tag 205C is determined to be stationary.

As described referring to the specific examples shown in FIG. 47, when the received waves are combined waves, the stationary radio tag 205 will not be erroneously determined to be moving, irrespective of whether phase rotation has been detected, and the moving tag can be correctly determined to be moving, Specific Examples 2

Figure 49:
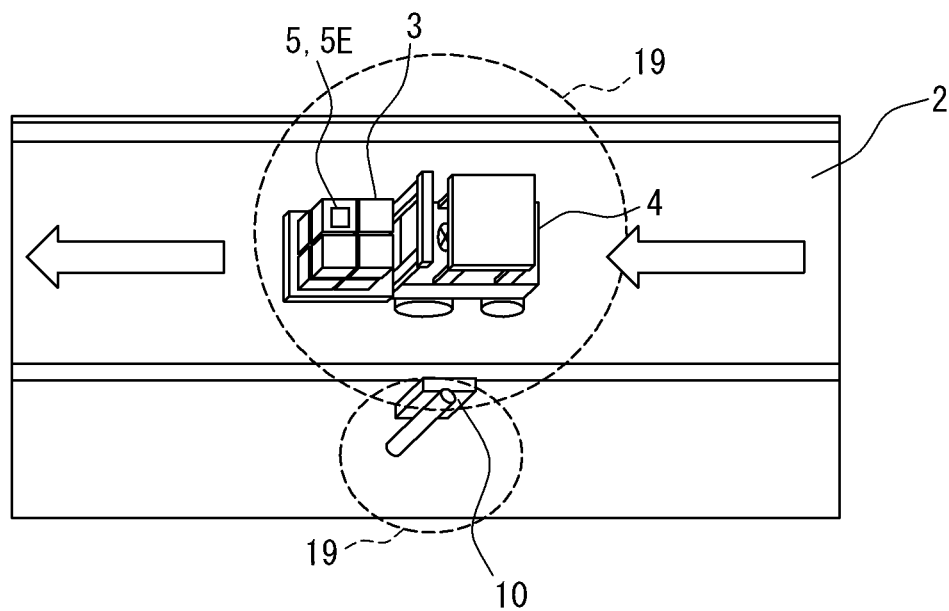
FIG. 49 is a diagram illustrating a moving state of a radio tag in the second specific example.
Figure 50:
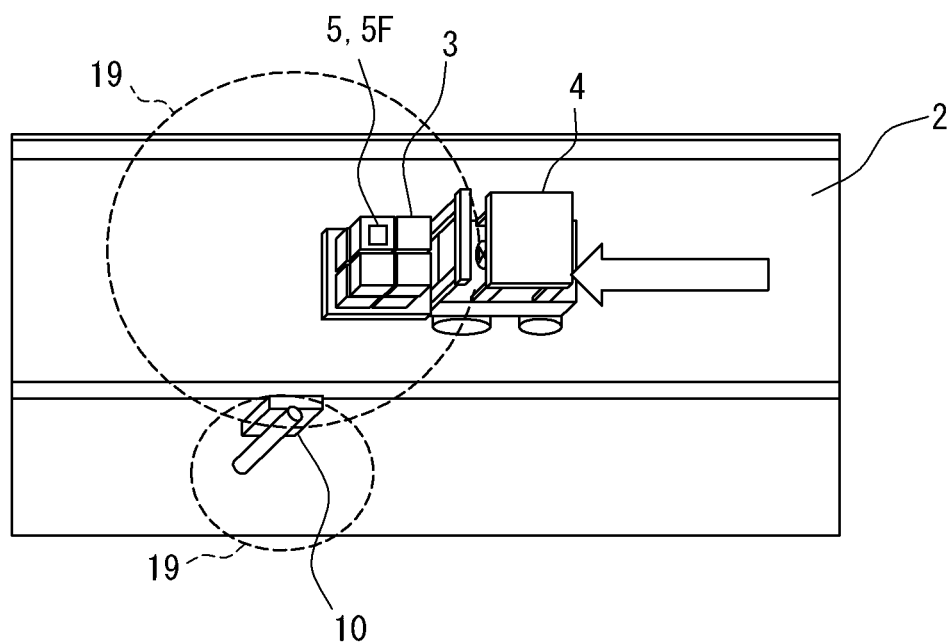
FIG. 50 is a diagram illustrating a moving state of a radio tag in the second specific example.

Other specific examples will be described. These examples involve determining a radio tag as being temporarily stationary. Specifically, these examples show moving/stationary determination for radio tags 205D, 205E and 205F when they travel as shown in FIGS. 48, 49 and 50.

The radio tags 205D, 205E and 205E are respectively affixed to packages 203 which are conveyed by a forklift 204 traveling on a lane 202. In these FIGS. 48, 49 and 50, the forklift 204 stops at respective different positions. In FIG. 49, the forklift 204 stops once at the position shown and then again travels in the arrowed direction. In FIGS. 48 and 50, the forklift 204 remains stopping at the respective positions shown.

FIG. 51 shows these examples of the radio tags 205D, 205E and 205F in terms of change of phase frequency and moving/stationary determination. In FIG. 51, n=4, m=4, L=8 and T=4.

First, the ratio tag 205D of FIG. 51 will be described. The forklift 204 stops at the position shown in FIG. 48 at the 6-second point. Therefore, phase frequency at any of the 1- to 5-second points is 2, while it is 1 at the 6-second point.

Then, phase frequency becomes 0 at the 7- and 8-second points.

Since the phase frequency varies as mentioned above, total phase frequency gradually decreases from 8 at the 5-second point, to 7 at the 6-second point, to 5 at the 7-second point, and to 3 at the 8-second point. Thus, in the process performed at the 8-second point in FIG. 42, the determination at step S743 is No and then control proceeds to step S745. Since the phase frequency in the past 8 seconds is 11, the determination in step S745 is Yes. Since the phase frequency remains unchanged only for 1 second, the determination at step S747 is No. Accordingly, the radio tag 205D is determined to be temporarily stationary at the 8-second point.

The radio tag 205E of FIG. 51 will be described. The forklift 204 stops at the position of FIG. 49 at the 4-second point. Therefore, phase frequency is 2 at any of the 1- to 3-second points, while it is 0 at the 4-second point. However, since the total phase frequency of the past 4 seconds is 5 at the 4-second point, the radio tag 205E is determined to be moving at the 4-second point. The forklift 204 is still stopping at the 5-second point. Therefore, phase frequency at the 5-second point is 0, and total phase frequency of the past 4 seconds is 3 at the 5-second point. Consequently, at the 5-second point, the determination at step S743 is No, the determination at step S745 is Yes, and the determination at step S747 is No. Thus, the radio tag 205E is determined to be temporarily stationary. The forklift 204 starts moving again at the 6-second point and thus phase frequency at the 6-second point is −2. However, since the total phase frequency of the past 4 seconds remains 3 at the 6-second point, the radio tag 205E is still determined to be temporarily stationary at this point. At the 7-second point, the total phase frequency of the past 4 seconds becomes 4, and therefore the radio tag 205E is determined to have started moving again. At the 8-second point as well, the total phase frequency of the past 4 seconds is 4 or more, and therefore the radio tag 205E is determined to be moving.

The radio tag 205F of FIG. 51 will be described. The forklift 204 stops at the position shown in FIG. 50 at the 4-second point. Therefore, phase frequency is 2 at any of the 1- to 3-second points, while it is 0 at the 4-second point. However, since the total phase frequency of the past 4 seconds is 5 at the 4-second point, the radio tag 205F is determined to be moving at the 4-second point. The forklift 204 is still stopped at the subsequent point of 5 seconds. Therefore, phase frequency at the 5-second point is 0, and total phase frequency of the past 4 seconds is 3 at the 5-second point. Consequently, at the 5-second point, the radio tag 205F is determined to be temporarily stationary. The radio tag 205F is also determined to be temporarily stationary at the 6- and 7-second points. At the 8-second point, the radio tag 205F is determined to have stopped because there is no change in phase frequency continuously for 4 seconds.

Summary of the Eighth Embodiment

The radio tag reader 210 described above is ensured to detect phase rotation based on the change of phase difference Δϕ in the phase rotation detection process (step S730). Phase difference Δϕ of combined waves from a stationary tag hardly increases. Therefore, phase rotation, when detected based on the change of phase difference Δϕ, is unlikely to be detected irrespective of receiving combined waves. Accordingly, if combined waves are received from a stationary tag, the number of times of detecting rotation of phases ϕ in a predetermined period is small.

Then, in a phase determination process (step S740), the radio tag 205 is determined to be moving if the number of rotations of phases ϕ is m or more in n seconds. Thus, erroneously determining a stationary tag as being a moving tag is minimized, which would otherwise occur due to the influence of reflected waves. Thus, accuracy is improved in determining whether a radio tag 205 is moving or stationary.

In particular, if phase difference Δϕ is in the range of −90° to +90° (Yes at step S722) in the phase rotation detection process (step S730), phases ϕ are not determined to have rotated (step S731). Specifically, if phase difference Δϕ has an absolute value that is half or less of the phase range of 180° that can be calculated by the radio tag reader 210, phases ϕ are not determined to have rotated. If a moving body that generates reflected waves moves with a moving tag, phase difference Δϕ of combined waves from a stationary tag mostly does not exceed half of the phase range that can be calculated by the radio tag reader 210. In this way, if received waves are combined waves, phase frequency will have a low probability of becoming m or more within n seconds. Thus, accuracy is improved in determining whether a radio tag 205 is moving or stationary.

In the present embodiment, a situation where the radio tag 205 is not determined to be moving does not always lead to a determination that the radio tag 205 is stationary (Yes at step S743). By performing steps S745 and onward, a determination can be made discriminating temporarily stationary tags from stationary tags.

Ninth Embodiment

A ninth embodiment will be described. In the ninth embodiment, unless otherwise described, the components given the same reference numerals as those of the eighth embodiment are identical with or similar to the components that are given the same reference numerals in the earlier embodiments. If only a part of components is described, description of the eighth embodiment is applied to the rest of the components.

Figure 52:
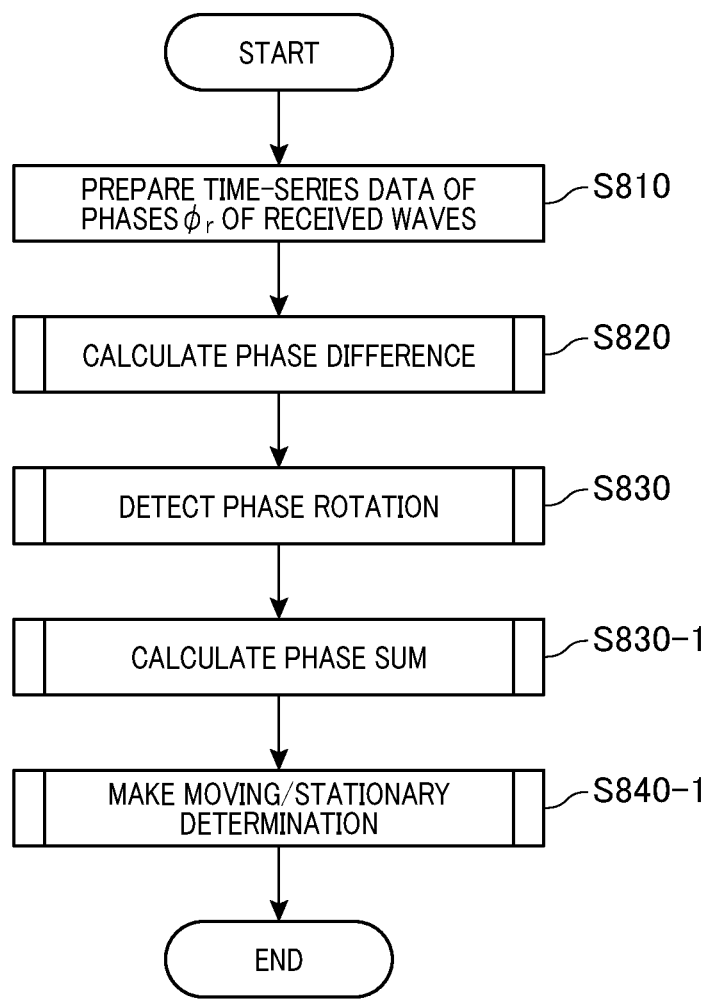
FIG. 52 is a flow diagram illustrating a process performed by an arithmetic processor according to a ninth embodiment of the present disclosure.

In the ninth embodiment, a radio tag reader 210 performs a process shown in FIG. 52 instead of the process shown in FIG. 40. The process shown in FIG. 52 is different from the process of the eighth embodiment in that a phase difference integrated value (termed phase sum hereinafter) is calculated at step S830-1 corresponding to the integration section, after performing step S730 and that a moving/stationary determination process of step S840-1 is performed in place of the moving/stationary determination process of step S740.

The phase sum calculated at step S830-1 is obtained by integrating phase differences Δϕ calculated at step S720. The period of integrating phase differences is n seconds. This period is equivalent to the period of determining whether the radio tag 205 is moving based on phase frequency.

Figure 53:
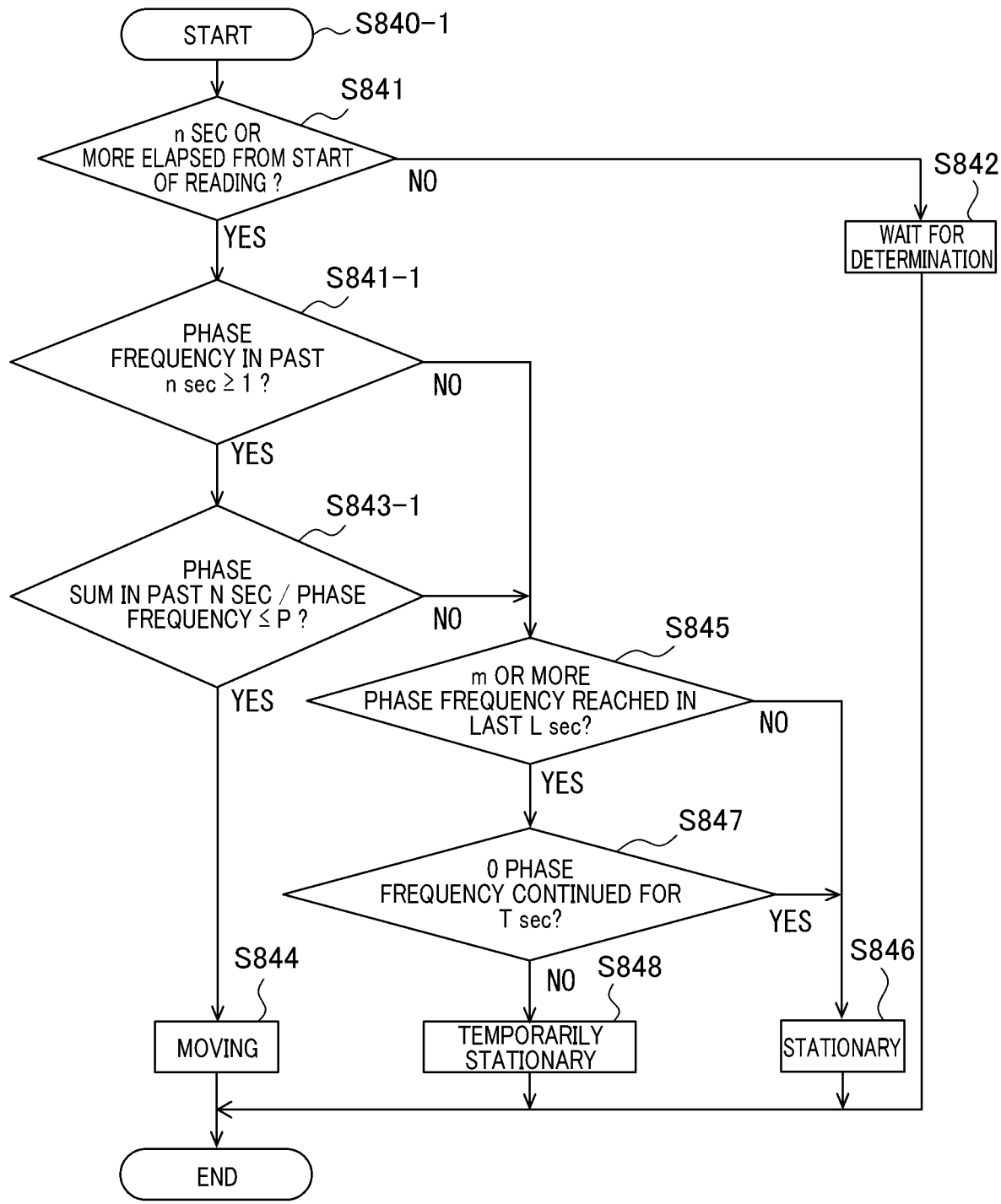
FIG. 53 is a flow diagram specifically illustrating a moving/stationary determination process of step S840-1 of FIG. 52.

The moving/stationary determination process of step S404 is specifically shown in FIG. 53. FIG. 53 is similar to FIG. 42. The difference from FIG. 42 is that, if the determination at step S741 is Yes, a determination is made at step S414 prior to the determination at step S743 and that step S843-1 is performed in place of step S743.

At step S841-1, it is determined whether phase frequency in the past n seconds is one or more. Step S841-1 is pre-processing for performing step S843-1. The pre-processing is performed because, if phase frequency in the past n seconds is 0, the calculation at step S843-1 cannot be performed. If the determination at step S841-1 is No, control proceeds to step S845, and if Yes, proceeds to step S843-1.

At step S843-1, it is determined whether the phase sum of the past n seconds/phase frequency in the past n seconds is not more than a threshold P. If this determination is Yes, control proceeds to step S844 where the radio tag 205 is determined to be moving. If the determination at step S843-1 is No, control proceeds to step S845.

The reason why step S843-1 is performed is specifically described. In the first place, if the position of the radio tag 205 is within a communication range 219 but is far from the radio tag reader 210, the observation points entirely tend to be sparser than in the data shown in the diagram of FIG. 43. In particular, the observation points tend to decrease at horizontal ends of the diagram. In the second place, if the radio tag 205 is located near an end of the communication range, the received waves, whose power is weak, are unlikely to be detected. In particular, in a situation corresponding to the horizontal ends of the diagram, the radio tag 205 may be located closer to an end of the communication range or outside thereof.

If the observation points are made very sparse in the data shown in FIG. 43 and, in particular, if the observation points at both horizontal ends are decreased, the resultant data will be similar to the data shown in FIG. 45. Consequently, it will be even more difficult to distinguish received waves from combined waves from a stationary tag.

In the ninth embodiment, step S843-1 is performed in place of step S743 to accurately distinguish direct waves from a moving tag located inside the communication range 219 but far from the radio tag reader 210, from combined waves from a stationary tag.

If a moving tag is located inside the communication range 219 but is far from the radio tag reader 210, data quantity at both horizontal ends of the diagram particularly decreases compared to the data shown in FIG. 43. In the data of combined waves shown in FIG. 45, the data density at both horizontal ends of the diagram is not so different from the data density near the center of the diagram. This is because combined waves are observed when a moving body that generates reflected waves is located comparatively near the radio tag reader 210 in the communication range 219 and because the reflected waves generated then will have comparatively a long range of exerting a predetermined intensity or more.

Accordingly, the integrated value of phase differences $\Delta\phi$ in the case where the moving tag is located inside the communication range 219 but is located far from the radio tag reader 210 tends to be smaller than the integrated value of phase differences $\Delta\phi$ in the case where the received waves are combined waves. In both cases, phase rotation is detected when a moving body passes near the front of the radio tag reader 210. Therefore, there is not so much difference in phase frequency between both cases.

For this reason, the phase sum of the past n seconds/phase frequency in the past n seconds tends to be smaller in the case where the received waves are direct waves from a moving tag than in the case where the received waves are combined waves from a stationary tag. Thus, by performing step S843-1, an accurate determination can be made as to whether the response waves are from a moving tag or from a stationary tag.

Specific Examples 3

Specific examples will be described. The table of FIG. 54 shows specific examples of radio tags 205A and 205C in terms of change of value resulting from phase sum/total phase frequency of the past 4 seconds. In FIG. 54, both the radio tags 205A and 205C show the same values as those shown in FIG. 47 in terms of phase frequency and total phase frequency of the past 4 seconds. In the table of FIG. 54, sum of 4 seconds in the cell below the cell of phase difference $\Delta\phi$ refers to an integrated value of phase differences $\Delta\phi$ in the past 4 seconds and serves as a numerator in the right cell. In the examples shown in FIG. 54, the threshold P used in step S843-1 is set to 270.

The radio tag 205A of FIG. 54 will be described first. Step S843-1 is not performed unless the determination at step S841 is Yes. Therefore, calculation of phase sum/total phase frequency is not performed until the point of 3 seconds. At the 4-second points onward, step S843-1 is performed.

At the 4-second point, phase sum is 1270 and total phase frequency is 6. Accordingly, phase sum/total phase frequency is 212. Since 212 is smaller than 270, moving/stationary determination made at the 4-second point results in moving. Since phase sum/total phase frequency is also 212 at the 5- and 6-second points, moving/stationary determination made at the 5- and 6-second points both results in moving.

The radio tag 205C will be described. At the 4-second point, phase sum is 910 and total phase frequency is 2. Accordingly, phase sum/total phase frequency is 455. Since 455 is larger than 270, moving/stationary determination made at the 4-second point results in stationary. Since phase sum/total phase frequency is also 455 at the 5- and 6-second points, moving/stationary determination made at the 5- and 6-second points both results in stationary.

Summary of the Ninth Embodiment

At step S843-1 of the ninth embodiment, it is determined whether phase sum of the past 4 seconds/total phase frequency of the past 4 seconds is not less than the threshold P to determine whether the radio tag 205 is moving.

As will be understood from the specific values shown in FIG. 54, in the case where the received waves are direct waves from the radio tag 205A that is a moving tag, "the phase sum/total phase frequency" is smaller compared to the case where the received waves are combined waves from the radio tag 205C that is a stationary tag. Accordingly, comparison of "the phase sum/total phase frequency" with the threshold P can determine whether the radio tag 205 is moving or stationary.

It should be noted that phase sum and total phase frequency both become small if the forklift 204 conveying a package 203 with the radio tag 205A affixed thereto travels on the lane 202, with a side of the forklift 204 far from the radio tag reader 210 being adjacent to the radio tag 2056. In this case as well, "the phase sum/total is phase frequency" will be a small value.

Accordingly, comparison of phase sum total phase frequency with the threshold P can accurately distinguish the case where the received waves are direct waves from a moving tag in the communication range 219 but far from the radio tag reader 210, from the case where the received waves are combined waves from a stationary tag.

Some embodiments have been described so far; however the disclosed technique should not be limited to the embodiments described above. The modifications set forth below should also be in the disclosed range. Furthermore, besides the modifications set forth below, the disclosed technique may be implemented by being modified in various ways in the range not departing from the spirit of the present disclosure.

Modification 1

In the ninth embodiment, phase sum/phase frequency is calculated to contrast phase sum with total phase frequency. However, the mode of contrasting phase sum with total phase frequency is not limited to this. Phase frequency phase sum may be calculated to contrast phase sum with total phase frequency.

Modification 2

The thresholds to be compared with the phase difference $\Delta\phi$ at step S722 of FIG. 41 are not limited to +90° and −90°. For example, the thresholds may be +120° and −120°.

What is claimed is:

1. A wireless tag reader that detects a moving tag and a stationary tag based on phase values of response waves received from a wireless tag, comprising:
    a total number calculation unit that calculates a total number of phase values throughout an angle range of detecting phase values;
    a sum calculation unit that calculates a most frequent sum by calculating a sum of phase values for each angle in every predetermined angle range throughout the angle range of detecting phase values;
    a calculation unit that calculates a phase bias, that is, whether phase values are biased in the predetermined angle range of the most frequent sum, by comparing the total number with the most frequent sum; and
    a selecting unit that selects tags with a low phase bias as being moving tags and selects tags with a high phase bias as being stationary tags.

2. The wireless tag reader according to claim 1, comprising:
    a phase variation calculation unit that calculates a phase variation as an index of a moving state of a wireless tag by cumulatively adding phase differences, each of which is a phase difference between a previous cycle and a present cycle, based on phases of response waves received from a wireless tag, wherein
    the selecting unit determines thresholds using the phase bias and the phase variation to select tags as moving tags and stationary tags.

3. The wireless tag reader according to claim 2, wherein the phase variation calculation unit smooths a phase sum graph prepared by the cumulative addition, then acquires inflection points based on change of gradient, and calculates the phase variation based on a sum of phase variation values between inflection points, including a starting point and an end point.

4. The wireless tag reader according to claim 3, wherein the selecting unit determines a first threshold for reliably determining a tag as being a stationary tag and a second threshold for reliably determining a tag as being a moving tag, based on the phase bias and the phase variation, and reliably selects tags which fall into moving tags and stationary tags; and
    the wireless tag reader includes a determination unit that calculates a third threshold by using at least one of phase variation, velocity or acceleration, distance or angle data, period from first reading to last reading, and reception intensity of one or more tags reliably determined to be moving tags, and uses the third threshold as a basis for determining whether tags, other than the tags reliably selected as moving tags and stationary tags, are moving tags or stationary tags.

5. The wireless tag reader according to claim 4, wherein a moving velocity of each of the moving tags is estimated to correct the phase variation.

6. The wireless tag reader according to claim 4, wherein velocity of each of the moving tags is estimated to correct the third threshold.

7. The wireless tag reader according to claim 4, wherein a distance from an antenna to each of the moving tags is estimated to correct the third threshold.

8. The wireless tag reader according to claim 5, wherein a moving velocity of each of the moving tags is estimated based on tag reading period data of tags reliably determined to be moving tags.

9. The wireless tag reader according to claim 8, wherein a moving velocity of each of the moving tags is estimated based on tag reading period data of a tag having a maximum phase variation among the tags reliably determined to be moving tags.

10. The wireless tag reader according to claim 5, wherein a moving velocity of each of the moving tags is estimated based on an average of estimated moving velocities of a predetermined number of tags having high-order phase variations among the tags reliably determined to be moving tags.

11. The wireless tag reader according to claim 5, wherein a moving velocity of each of the moving tags is estimated based on an average of estimated moving velocities of a predetermined number of tags having high-order velocities exceeding the second threshold.

12. The wireless tag reader according to claim 7, wherein a distance from an antenna to a moving tag is estimated based on data of the tags reliably selected as being moving tags.

13. The wireless tag reader according to claim 12, wherein a distance from the antenna to a moving tag is estimated based on reception intensities of the tags reliably determined to be moving tags.

14. The wireless tag reader according to claim 12, wherein a distance from the antenna to a moving tag is estimated based on a reception intensity of a tag having a maximum phase variation among the tags reliably determined to be moving tags.

15. The wireless tag reader according to claim 12, wherein a distance from the antenna to a moving tag is estimated based on an average of estimated distances of a predetermined number of tags having high-order phase variations among the tags reliably determined to be moving tags.

16. The wireless tag reader according to claim 12, wherein a distance from the antenna to a moving tag is estimated based on an average of estimated velocities of a predetermined number of tags having high-order velocities exceeding the second threshold.

17. The wireless tag reader according to claim 4, wherein when the phase bias is large, the first threshold and the second threshold are increased as criteria for the phase variation.

18. The wireless tag reader according to claim 1, wherein the selecting unit selects tags with a low phase bias as being moving tags from which direct waves have been received, and selects tags with a high phase bias as being stationary tags from which direct waves and reflected waves have been received.

* * * * *